United States Patent
Koo et al.

(10) Patent No.: US 12,273,530 B2
(45) Date of Patent: *Apr. 8, 2025

(54) TRANSFORM-BASED IMAGE CODING METHOD AND TRANSMISSION METHOD THEREFOR

(71) Applicant: LG ELECTRONICS INC., Seoul (KR)

(72) Inventors: Moonmo Koo, Seoul (KR); Seunghwan Kim, Seoul (KR); Jaehyun Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/442,750

(22) Filed: Feb. 15, 2024

(65) Prior Publication Data
US 2024/0251084 A1    Jul. 25, 2024

Related U.S. Application Data

(63) Continuation of application No. 18/128,132, filed on Mar. 29, 2023, now Pat. No. 12,063,368, which is a continuation of application No. 17/699,731, filed on Mar. 21, 2022, now Pat. No. 11,647,201, which is a
(Continued)

(51) Int. Cl.
| | |
|---|---|
| *H04N 7/18* | (2006.01) |
| *G06F 9/48* | (2006.01) |
| *H04N 19/132* | (2014.01) |
| *H04N 19/169* | (2014.01) |
| *H04N 19/176* | (2014.01) |
| *H04N 19/18* | (2014.01) |

(Continued)

(52) U.S. Cl.
CPC ......... *H04N 19/132* (2014.11); *G06F 9/4812* (2013.01); *G06F 9/4881* (2013.01); *H04N 19/176* (2014.11); *H04N 19/18* (2014.11); *H04N 19/1883* (2014.11); *H04N 19/60* (2014.11); *H04N 23/60* (2023.01)

(58) Field of Classification Search
USPC .................................. 375/240.01–240.29
See application file for complete search history.

(56) References Cited

U.S. PATENT DOCUMENTS

| | | |
|---|---|---|
| 2006/0239566 A1 | 10/2006 | Yoshigahara et al. |
| 2011/0194001 A1 | 8/2011 | Eki et al. |

(Continued)

FOREIGN PATENT DOCUMENTS

| | | |
|---|---|---|
| CN | 106105227 A | 11/2016 |
| WO | 18/128323 A1 | 12/2018 |

*Primary Examiner* — Leron Beck
(74) *Attorney, Agent, or Firm* — Bryan Cave Leighton Paisner LLP

(57) ABSTRACT

An image decoding method according to the present document comprises a step of deriving a corrected transform coefficient, wherein the step of deriving the corrected transform coefficient comprises the steps of: determining whether LFNST can be applied to the height and width of a divided sub-partition block when an ISP is applied to a current block; parsing a LFNST index when the LFNST can be applied; and deriving the corrected transform coefficient on the basis of the LFNST index and a LFNST matrix.

3 Claims, 22 Drawing Sheets

Related U.S. Application Data continuation of application No. PCT/KR2020/012665, filed on Sep. 18, 2020.

(60) Provisional application No. 62/903,825, filed on Sep. 21, 2019.

(51) Int. Cl.
*H04N 19/60* (2014.01)
*H04N 23/60* (2023.01)

(56) References Cited

U.S. PATENT DOCUMENTS

2013/0287116 A1* 10/2013 Helle ............... H04N 19/147
  375/240.24
2020/0396455 A1* 12/2020 Liu ................ H04N 19/176

* cited by examiner (a)

| 1 | 2 | 3 | 4 | 5 | 6 | 7 | 8 |
|---|---|---|---|---|---|---|---|
| 9 | 10 | 11 | 12 | 13 | 14 | 15 | 16 |
| 17 | 18 | 19 | 20 | 21 | 22 | 23 | 24 |
| 25 | 26 | 27 | 28 | 29 | 30 | 31 | 32 |
| 33 | 34 | 35 | 36 | | | | |
| 37 | 38 | 39 | 40 | | | | |
| 41 | 42 | 43 | 44 | | | | |
| 45 | 46 | 47 | 48 | | | | |

| 1 | 2 | 3 | 4 |
|---|---|---|---|
| 5 | 6 | 7 | 8 |
| 9 | 10 | 11 | 12 |
| 13 | 14 | 15 | 16 |

(a)

| 1 | 9 | 17 | 25 | 33 | 37 | 41 | 45 |
|---|---|----|----|----|----|----|----|
| 2 | 10 | 18 | 26 | 34 | 38 | 42 | 46 |
| 3 | 11 | 19 | 27 | 35 | 39 | 43 | 47 |
| 4 | 12 | 20 | 28 | 36 | 40 | 44 | 48 |
| 5 | 13 | 21 | 29 | | | | |
| 6 | 14 | 22 | 30 | | | | |
| 7 | 15 | 23 | 31 | | | | |
| 8 | 16 | 24 | 32 | | | | |

| 1 | 5 | 9 | 13 |
|---|---|---|----|
| 2 | 6 | 10 | 14 |
| 3 | 7 | 11 | 15 |
| 4 | 8 | 12 | 16 |

| 1 | 3 | 6 | 10 |
|---|---|---|----|
| 2 | 5 | 9 | 13 |
| 4 | 8 | 12 | 15 |
| 7 | 11 | 14 | 16 |

(a)

| 1 | 3 | 6 | ✕ |
|---|---|---|---|
| 2 | 5 | ✕ | ✕ |
| 4 | 8 | ✕ | ✕ |
| 7 | ✕ | ✕ | ✕ |

(b)

(a) 4x4

(b) 8x4 / 4x8

(c) 4xN / Nx4, when N≥16

(d) 8x8

(e) MxN(M≥8, N≥8, M>8 or N>8)

(a) 4x4

(b) 8x4 / 4x8

(c) 4xN / Nx4, when N≥16

(d) 8x8

(e) MxN(M≥8, N≥8, M>8 or N>8)

4xN / Nx4, when N≥16

(c) 4xN / Nx4, when N≥16

(d) 4xN / Nx4, when N≥16

(b) MxN(M≥8, N≥8, M>8 or N>8)

|   |    |
|---|----|
| 1 | 9  |
| 2 | 10 |
| 3 | 11 |
| 4 | 12 |
| 5 | 13 |
| 6 | 14 |
| 7 | 15 |
| 8 | 16 |

(a)

| 1 | 2  | 3  | 4  | 5  | 6  | 7  | 8  |
|---|----|----|----|----|----|----|----|
| 9 | 10 | 11 | 12 | 13 | 14 | 15 | 16 |

| 1 | 3 | 5 | 7 | 9 | 11 | 13 | 15 |
|---|---|---|---|---|----|----|----|
| 2 | 4 | 6 | 8 | 10 | 12 | 14 | 16 |

| | |
|---|---|
| 1 | 3 |
| 2 | 5 |
| 4 | 7 |
| 6 | 9 |
| 8 | 11 |
| 10 | 13 |
| 12 | 15 |
| 14 | 16 |

TRANSFORM-BASED IMAGE CODING METHOD AND TRANSMISSION METHOD THEREFOR

CROSS-REFERENCE TO RELATED APPLICATIONS

This application is a Continuation of U.S. application Ser. No. 18/128,132, filed Mar. 29, 2023, which is a Continuation of U.S. application Ser. No. 17/699,731, filed Mar. 21, 2022 (now U.S. Pat. No. 11,647,201 issued on May 9, 2023), which is a Continuation Bypass of International Application No. PCT/KR2020/012665, filed on Sep. 18, 2020, which claims the benefit of U.S. Provisional Application No. 62/903,825, filed on Sep. 21, 2019, the contents of which are all hereby incorporated by reference herein in their entirety.

BACKGROUND OF THE DISCLOSURE

Field of the Disclosure

The present disclosure relates to an image coding technique and, more particularly, to a method and an apparatus for coding an image based on transform in an image coding system.

Related Art

Nowadays, the demand for high-resolution and high-quality images/videos such as 4K, 8K or more ultra high definition (UHD) images/videos has been increasing in various fields. As the image/video data becomes higher resolution and higher quality, the transmitted information amount or bit amount increases as compared to the conventional image data. Therefore, when image data is transmitted using a medium such as a conventional wired/wireless broadband line or image/video data is stored using an existing storage medium, the transmission cost and the storage cost thereof are increased.

Further, nowadays, the interest and demand for immersive media such as virtual reality (VR), artificial reality (AR) content or hologram, or the like is increasing, and broadcasting for images/videos having image features different from those of real images, such as a game image is increasing.

Accordingly, there is a need for a highly efficient image/video compression technique for effectively compressing and transmitting or storing, and reproducing information of high resolution and high quality images/videos having various features as described above.

SUMMARY OF THE DISCLOSURE

Technical Objects

A technical aspect of the present disclosure is to provide a method and an apparatus for increasing image coding efficiency.

Another technical aspect of the present disclosure is to provide a method and an apparatus for increasing efficiency in transform index coding.

Still another technical aspect of the present disclosure is to provide an image coding method and apparatus using LFNST.

Still another technical aspect of the present disclosure is to provide a method and apparatus for coding an image for applying an LFNST to a sub-partition transform block.

Technical Solutions

According to an embodiment of the present specification, provided herein is an image decoding method performed by a decoding apparatus. The method may include deriving modified transform coefficients, wherein the step of deriving modified transform coefficients may include, determining whether or not the LFNST is applicable to a height and width of a partitioned subpartition block in case an ISP is applied to the current block, parsing an LFNST index in case the LFNST is applicable, and deriving the modified transform coefficients based on the LFNST index and an LFNST matrix.

When the height and width of the subpartition block are equal to 4 or more, the LFNST index may be parsed.

If the tree-type of the current block is a dual-tree luma or single-tree, when a height and width of the subpartition block for a luma component block of the current block are equal to 4 or more, the LFNST index may be parsed.

Whether or not the LFNST is applicable to a height and width of the current block may be determined based on a tree-type and color format of the current block.

If the ISP is not applied to the current block and the tree-type of the current block is a dual-tree chroma, when a height and width corresponding to a chroma component block of the current block are equal to 4 or more, the LFNST index may be parsed.

If the ISP is not applied to the current block and the tree-type of the current block is a single tree or dual-tree luma, when a height and width corresponding to a luma component block of the current block are equal to 4 or more, the LFNST index may be parsed.

The current block is a coding unit, and when a width and height of the coding unit are equal to or less than a maximum luma transform size that is available for transform, the LFNST index may be parsed.

According to an embodiment of the present specification, provided herein is an image encoding method performed by an encoding apparatus. The method may include deriving modified transform coefficients, wherein the step of deriving modified transform coefficients may include, determining whether or not the LFNST is applicable to a height and width of a partitioned subpartition block in case ISP is applied to the current block, and, herein, in case the LFNST is applicable, an LFNST index may be encoded.

According to still another embodiment of the present disclosure, there may be provided a digital storage medium that stores image data including encoded image information and a bitstream generated according to an image encoding method performed by an encoding apparatus.

According to yet another embodiment of the present disclosure, there may be provided a digital storage medium that stores image data including encoded image information and a bitstream to cause a decoding apparatus to perform the image decoding method.

Effects of the Disclosure

According to the present disclosure, it is possible to increase overall image/video compression efficiency.

According to the present disclosure, it is possible to increase efficiency in transform index coding.

A technical aspect of the present disclosure may provide an image coding method and apparatus using LFNST.

A technical aspect of the present disclosure may provide a method and apparatus for coding an image for applying an LFNST to a sub-partition transform block.

Effects that can be obtained through specific examples of the present specification are not limited to the effects listed above. For example, various technical effects that a person having ordinary skill in the related art can understand or derive from the present specification may exist. Accordingly, specific effects of the present specification are not limited to those explicitly described in the present specification, and can include various effects that can be understood or derived from the technical characteristics of the present specification.

BRIEF DESCRIPTION OF THE DRAWINGS

FIG. 6 is a diagram illustrating a sequence of arranging output data of a forward primary transformation into a one-dimensional vector according to an example.

FIG. 7 is a diagram illustrating a sequence of arranging output data of a forward secondary transform into a two-dimensional vector according to an example.

FIG. 11 is a diagram illustrating zero-out in a block to which 4×4 LFNST is applied according to an example.

FIG. 12 is a diagram illustrating zero-out in a block to which 8×8 LFNST is applied according to an example.

FIG. 13 is a diagram illustrating zero-out in a block to which 8×8 LFNST is applied according to another example.

FIG. 17 is a diagram illustrating an example of transposing a 2×M block according to an embodiment.

FIG. 18 illustrates a scanning order for 8×2 or 2×8 regions according to an embodiment.

DESCRIPTION OF EXEMPLARY EMBODIMENTS

Figure 1:
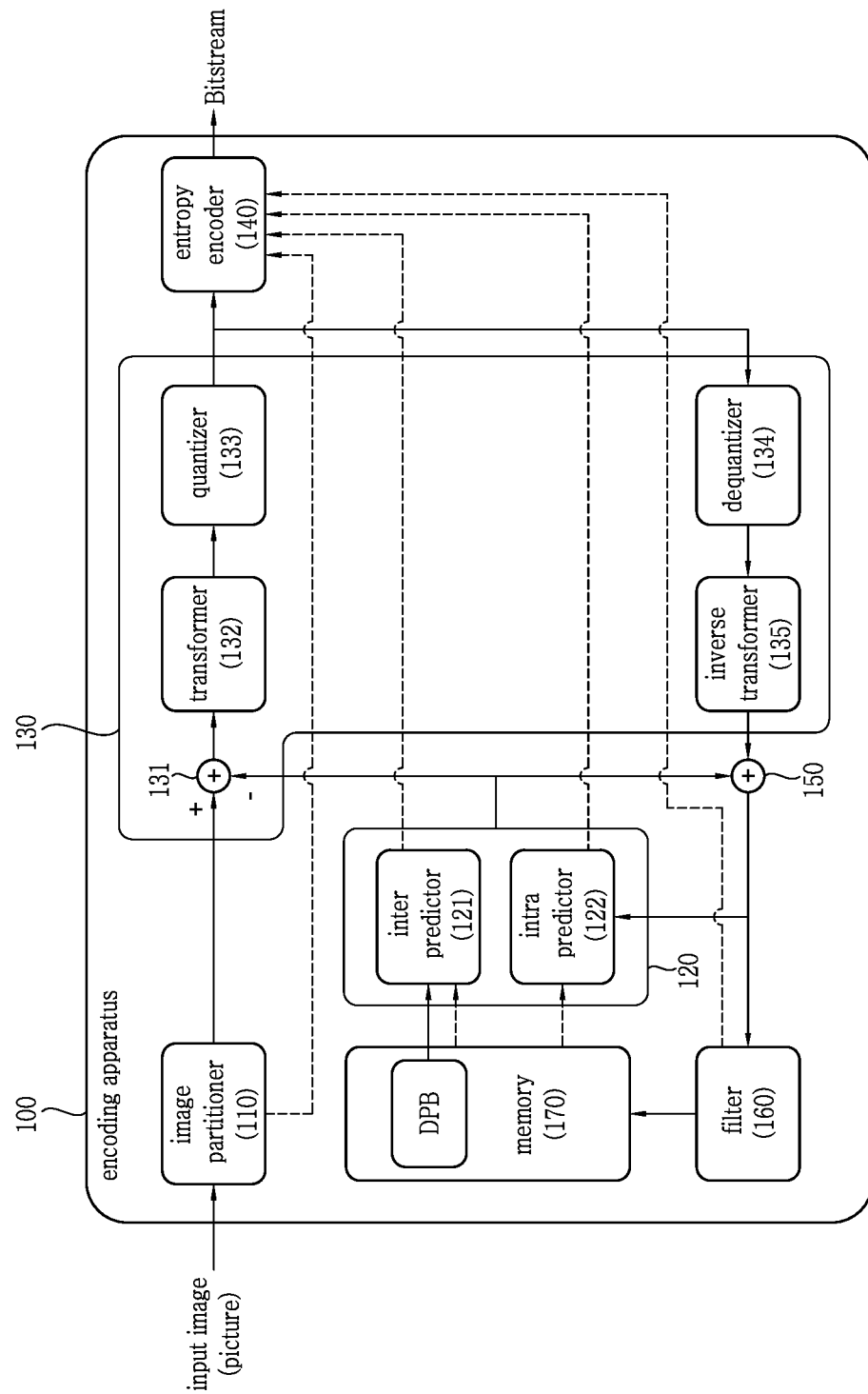
FIG. 1 is a diagram schematically illustrating a configuration of a video/image encoding apparatus to which the present disclosure can be applied.

While the present disclosure may be susceptible to various modifications and include various embodiments, specific embodiments thereof have been shown in the drawings by way of example and will now be described in detail. However, this is not intended to limit the present disclosure to the specific embodiments disclosed herein. The terminology used herein is for the purpose of describing specific embodiments only, and is not intended to limit technical idea of the present disclosure. The singular forms may include the plural forms unless the context clearly indicates otherwise. The terms such as "include" and "have" are intended to indicate that features, numbers, steps, operations, elements, components, or combinations thereof used in the following description exist, and thus should not be understood as that the possibility of existence or addition of one or more different features, numbers, steps, operations, elements, components, or combinations thereof is excluded in advance.

Meanwhile, each component on the drawings described herein is illustrated independently for convenience of description as to characteristic functions different from each other, and however, it is not meant that each component is realized by a separate hardware or software. For example, any two or more of these components may be combined to form a single component, and any single component may be divided into plural components. The embodiments in which components are combined and/or divided will belong to the scope of the patent right of the present disclosure as long as they do not depart from the essence of the present disclosure.

Hereinafter, preferred embodiments of the present disclosure will be explained in more detail while referring to the attached drawings. In addition, the same reference signs are used for the same components on the drawings, and repeated descriptions for the same components will be omitted.

This document relates to video/image coding. For example, the method/example disclosed in this document may relate to a VVC (Versatile Video Coding) standard (ITU-T Rec. H.266), a next-generation video/image coding standard after VVC, or other video coding related standards (e.g., HEVC (High Efficiency Video Coding) standard (ITU-T Rec. H.265), EVC (essential video coding) standard, AVS2 standard, etc.).

In this document, a variety of embodiments relating to video/image coding may be provided, and, unless specified to the contrary, the embodiments may be combined to each other and be performed.

In this document, a video may mean a set of a series of images over time. Generally, a picture means a unit representing an image at a specific time zone, and a slice/tile is a unit constituting a part of the picture. The slice/tile may include one or more coding tree units (CTUs). One picture may be constituted by one or more slices/tiles. One picture may be constituted by one or more tile groups. One tile group may include one or more tiles.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component. Alternatively, the sample may refer to a pixel value in the spatial domain, or when this pixel value is converted to the frequency domain, it may refer to a transform coefficient in the frequency domain.

A unit may represent the basic unit of image processing. The unit may include at least one of a specific region and information related to the region. One unit may include one luma block and two chroma (e.g., cb, cr) blocks. The unit and a term such as a block, an area, or the like may be used in place of each other according to circumstances. In a general case, an M×N block may include a set (or an array) of samples (or sample arrays) or transform coefficients consisting of M columns and N rows.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C."

Further, in the document, the term "or" should be interpreted to indicate "and/or." For instance, the expression "A or B" may include 1) only A, 2) only B, and/or 3) both A and B. In other words, the term "or" in this document should be interpreted to indicate "additionally or alternatively."

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "prediction (intra prediction)", it may mean that "intra prediction" is proposed as an example of "prediction". In other words, the "prediction" of the present disclosure is not limited to "intra prediction", and "intra prediction" may be proposed as an example of "prediction". In addition, when indicated as "prediction (i.e., intra prediction)", it may also mean that "intra prediction" is proposed as an example of "prediction".

Technical features individually described in one figure in the present disclosure may be individually implemented or may be simultaneously implemented.

FIG. 1 is a diagram schematically illustrating a configuration of a video/image encoding apparatus to which the present disclosure can be applied. Hereinafter, the term that is referred to as the video encoding apparatus may include an image encoding apparatus.

Referring to FIG. 1, the encoding apparatus 100 may include an image partitioner 110, a predictor 120, a residual processor 130, an entropy encoder 140, an adder 150, a filter 160, and a memory 170. The predictor 120 may include an inter predictor 121 and an intra predictor 122. The residual processor 130 may include a transformer 132, a quantizer 133, a dequantizer 134, and an inverse transformer 135. The residual processor 130 may further include a subtractor 131. The adder 150 may be referred to as a reconstructor or reconstructed block generator. The image partitioner 110, the predictor 120, the residual processor 130, the entropy encoder 140, the adder 150, and the filter 160, which are described above, may be configured by one or more hardware components (e.g., encoder chipsets or processors) according to an embodiment. Further, the memory 170 may include a decoded picture buffer (DPB) and may be configured by a digital storage medium. The hardware component may further include the memory 170 as an internal/external component.

The image partitioner 110 may partition an input image (or a picture or a frame) inputted to the encoding apparatus 100 into one or more processing units. As one example, the processing unit may be referred to as a coding unit (CU). In this case, starting with a coding tree unit (CTU) or the largest coding unit (LCU), the coding unit may be recursively partitioned according to the Quad-tree binary-tree ternary-tree (QTBTTT) structure. For example, one coding unit may be divided into a plurality of coding units of a deeper depth based on the quad-tree structure, the binary-tree structure, and/or the ternary structure. In this case, for example, the quad-tree structure may be applied first and the binary-tree structure and/or the ternary structure may be applied later on. Alternatively, the binary-tree structure may be applied first. The coding procedure according to the present disclosure may be performed based on the final coding unit, which is not further partitioned. In this case, the maximum coding unit may be used directly as a final coding unit based on coding efficiency according to the image characteristic. Alternatively, the coding unit may be recursively partitioned into coding units of a further deeper depth as needed, so that the coding unit of an optimal size may be used as a final coding unit. Here, the coding procedure may include procedures such as prediction, transform, and reconstruction, which will be described later on. As another example, the processing unit may further include a prediction unit (PU) or a transform unit (TU). In this case, the prediction unit and the transform unit may be split or partitioned from the above-described final coding unit. The prediction unit may be a unit of sample prediction, and the transform unit may be a unit for deriving a transform coefficient and/or a unit for deriving a residual signal from a transform coefficient.

The units and terms, such as a block, an area, or the like, may be interchangeably used depending upon the circumstances. In general cases, an M×N block may represent a set of samples or transform coefficients consisting of M columns and N rows. The sample may generally represent a pixel or a value of a pixel, and may represent only a pixel/pixel value of a luma component, or only a pixel/pixel value of a chroma component. The sample may be used as a term corresponding to a pixel or a pel of one picture (or image).

The encoding apparatus 100 subtracts a prediction signal (predicted block, prediction sample array) that is outputted from the inter predictor 121 or intra predictor 122 from an input image signal (original block, original sample array) to generate a residual signal (residual block, residual sample array), and the generated residual signal is transmitted to the transformer 132. In this case, as shown in the drawing, a unit that subtracts a prediction signal (prediction block, prediction sample array) from on inputted image signal (original block, original sample array) within the encoding apparatus 100 may be referred to as a subtractor 131. The predictor may perform prediction on a processing target block (hereinafter, referred to as 'current block') and may generate a predicted block including prediction samples for the current block. The predictor may determine whether intra prediction or inter prediction is applied on a current block or CU basis. As discussed later on, in the description of each prediction mode, the predictor may generate various information related to prediction, such as prediction mode information, and may transmit the generated information to the entropy encoder 140. The information on the prediction may be encoded in the entropy encoder 140 and outputted in the form of a bitstream.

The intra predictor 122 may predict the current block by referring to samples in a current picture. The referred samples may be located in a neighboring region of the current block or in a distant region apart from the current block according to the prediction mode. In the intra prediction, prediction modes may include a plurality of non-directional modes and a plurality of directional modes. The non-directional modes may include, for example, a DC mode and a planar mode. The directional mode may include, for example, 33 directional prediction modes or 65 directional prediction modes according to the degree of detail of the prediction direction. However, this is merely an example, and more or less directional prediction modes may be used depending on the configuration. The intra predictor 122 may determine the prediction mode applied to the current block by using the prediction mode applied to the neighboring block.

The inter predictor 121 may derive a predicted block for the current block based on a reference block (reference sample array) specified by a motion vector on a reference picture. At this time, in order to reduce the amount of motion information transmitted in the inter prediction mode, the motion information may be predicted in block, subblock, or sample units based on correlation of motion information between the neighboring block and the current block. The motion information may include a motion vector and a reference picture index. The motion information may further include information on inter prediction direction (L0 prediction, L1 prediction, Bi prediction, and so on). In case of inter prediction, the neighboring block may include a spatial neighboring block existing in the current picture and a temporal neighboring block existing in the reference picture. The reference picture including the reference block and the reference picture including the temporal neighboring block may be the same or different from one another. The temporal neighboring block may be referred to as a collocated reference block, a collocated CU (colCU), and the like, and the reference picture including the temporal neighboring block may be referred to as a collocated picture (colPic). For example, the inter predictor 121 may configure a motion information candidate list based on neighboring blocks and generate information indicating which candidate is used to derive a motion vector and/or a reference picture index of the current block. Inter prediction may be performed based on various prediction modes. For example, in case of a skip mode and a merge mode, the inter predictor 121 may use motion information of the neighboring block as motion information of the current block. In the skip mode, unlike the merge mode, the residual signal may not be transmitted. In case of the motion information prediction (motion vector prediction, MVP) mode, the motion vector of the neighboring block may be used as a motion vector predictor, and the motion vector of the current block may be indicated by signaling a motion vector difference.

The predictor 120 may generate a prediction signal based on various prediction methods. For example, the predictor may apply intra prediction or inter prediction for prediction on one block and may also apply intra prediction and inter prediction at the same time. This may be referred to as combined inter and intra prediction (CIIP). Further, the predictor may be based on an intra block copy (IBC) prediction mode, or a palette mode in order to perform prediction on a block. The IBC prediction mode or palette mode may be used for content image/video coding in games, or the like, such as screen content coding (SCC). Although the IBC basically performs prediction in a current picture, the prediction may be performed similarly to inter prediction in that a reference block is derived in a current block. That is, the IBC may use at least one of inter prediction techniques described in the present disclosure. The palette mode may be viewed as an example of intra coding or intra prediction. In case the palette mode is applied, a sample value within a picture may be signaled based on information related to a palette table and a palette index.

The prediction signal generated through the predictor (including the inter predictor 121 and/or the intra predictor 122) may be used to generate a reconstructed signal or to generate a residual signal. The transformer 132 may generate transform coefficients by applying a transform technique to the residual signal. For example, the transform technique may include at least one of a discrete cosine transform (DCT), a discrete sine transform (DST), a Karhunen-Loève transform (KLT), a graph-based transform (GBT), or a conditionally non-linear transform (CNT). Here, the GBT means a transform that is obtained from a graph when relationship information between pixels is represented by the graph. The CNT refers to a transform that is obtained based on a prediction signal generated using all previously reconstructed pixels. In addition, the transform process may be applied to square pixel blocks having the same size or may be applied to non-square blocks having varying sizes.

The quantizer 133 may quantize the transform coefficients and transmit the quantized transform coefficients to the entropy encoder 140, and the entropy encoder 140 may encode the quantized signal (information on the quantized transform coefficients) and may output the encoded signal in a bitstream. The information on the quantized transform coefficients may be referred to as residual information. The quantizer 133 may rearrange block type quantized transform coefficients into a one-dimensional vector form based on a coefficient scan order, and generate information on the quantized transform coefficients based on the quantized transform coefficients of the one-dimensional vector form. The entropy encoder 140 may perform various encoding methods such as, for example, exponential Golomb, context-adaptive variable length coding (CAVLC), context-adaptive binary arithmetic coding (CABAC), and the like. The entropy encoder 140 may encode information necessary for video/image reconstruction other than quantized transform coefficients (e.g., values of syntax elements, and so on) together or separately. Encoded information (e.g., encoded video/image information) may be transmitted or stored on a unit basis of a network abstraction layer (NAL) in the form of a bitstream. The video/image information may further include information on various parameter sets such as an adaptation parameter set (APS), a picture parameter set (PPS), a sequence parameter set (SPS), a video parameter set (VPS) or the like. Further, the video/image information may further include general constraint information. In the present disclosure, information and/or syntax elements which are transmitted/signaled to the decoding apparatus from the encoding apparatus may be included in video/image information. The video/image information may be encoded through the above-described encoding procedure and included in the bitstream. The bitstream may be transmitted through a network, or stored in a digital storage medium. Here, the network may include a broadcast network, a communication network and/or the like, and the digital storage medium may include various storage media such as USB, SD, CD, DVD, Blu-ray, HDD, SSD, and the like. A transmitter (not shown) that transmits a signal outputted from the entropy encoder 140 and/or a storage (not shown) that stores the signal may be configured as an internal/external element of the encoding apparatus 100, or the transmitter may be included in the entropy encoder 140.

Quantized transform coefficients outputted from the quantizer 133 may be used to generate a prediction signal. For example, by applying dequantization and inverse transform to quantized transform coefficients through the dequantizer 134 and the inverse transformer 135, the residual signal (residual block or residual samples) may be reconstructed. The adder 155 adds the reconstructed residual signal to a prediction signal outputted from the inter predictor 121 or the intra predictor 122, so that a reconstructed signal (reconstructed picture, reconstructed block, reconstructed sample array) can be generated. When there is no residual for a processing target block, as in a case where the skip mode is applied, the predicted block may be used as a reconstructed block. The adder 150 may be referred to as a reconstructor or a reconstructed block generator. The generated reconstructed signal may be used for intra prediction of a next processing target block in the current block, and as described later on, the generated reconstructed signal may be used for inter prediction of a next picture through filtering.

Meanwhile, in the picture encoding and/or reconstructing process, luma mapping with chroma scaling (LMCS) may be applied.

The filter 160 may improve subjective/objective video quality by applying the filtering to the reconstructed signal. For example, the filter 160 may generate a modified reconstructed picture by applying various filtering methods to the reconstructed picture, and the filter 160 may store the modified reconstructed picture in the memory 170, more specifically, in the DPB of the memory 170. The various filtering methods may include, for example, deblocking filtering, sample adaptive offset, an adaptive loop filter, a bilateral filter, or the like. As discussed later on in the description of each filtering method, the filter 160 may generate various information related to filtering and transmit the generated information to the entropy encoder 140. The information on the filtering may be encoded in the entropy encoder 140 and outputted in the form of a bitstream.

The modified reconstructed picture that is transmitted to the memory 170 may be used as a reference picture in the inter predictor 121. In doing so, the encoding apparatus may avoid prediction mismatch in the encoding apparatus 100 and a decoding apparatus when the inter prediction is applied, and may also improve coding efficiency.

The memory 170 DPB may store the modified reconstructed picture in order to use it as a reference picture in the inter predictor 121. The memory 170 may store motion information of a block in the current picture, from which motion information has been derived (or encoded) and/or motion information of blocks in an already (or previously) reconstructed picture. The stored motion information may be transmitted to the inter predictor 121 so as to be utilized as motion information of a neighboring block or motion information of a temporal neighboring block. The memory 170 may store reconstructed samples of reconstructed blocks in the current picture and may transmit the reconstructed samples to the intra predictor 122.

Figure 2:
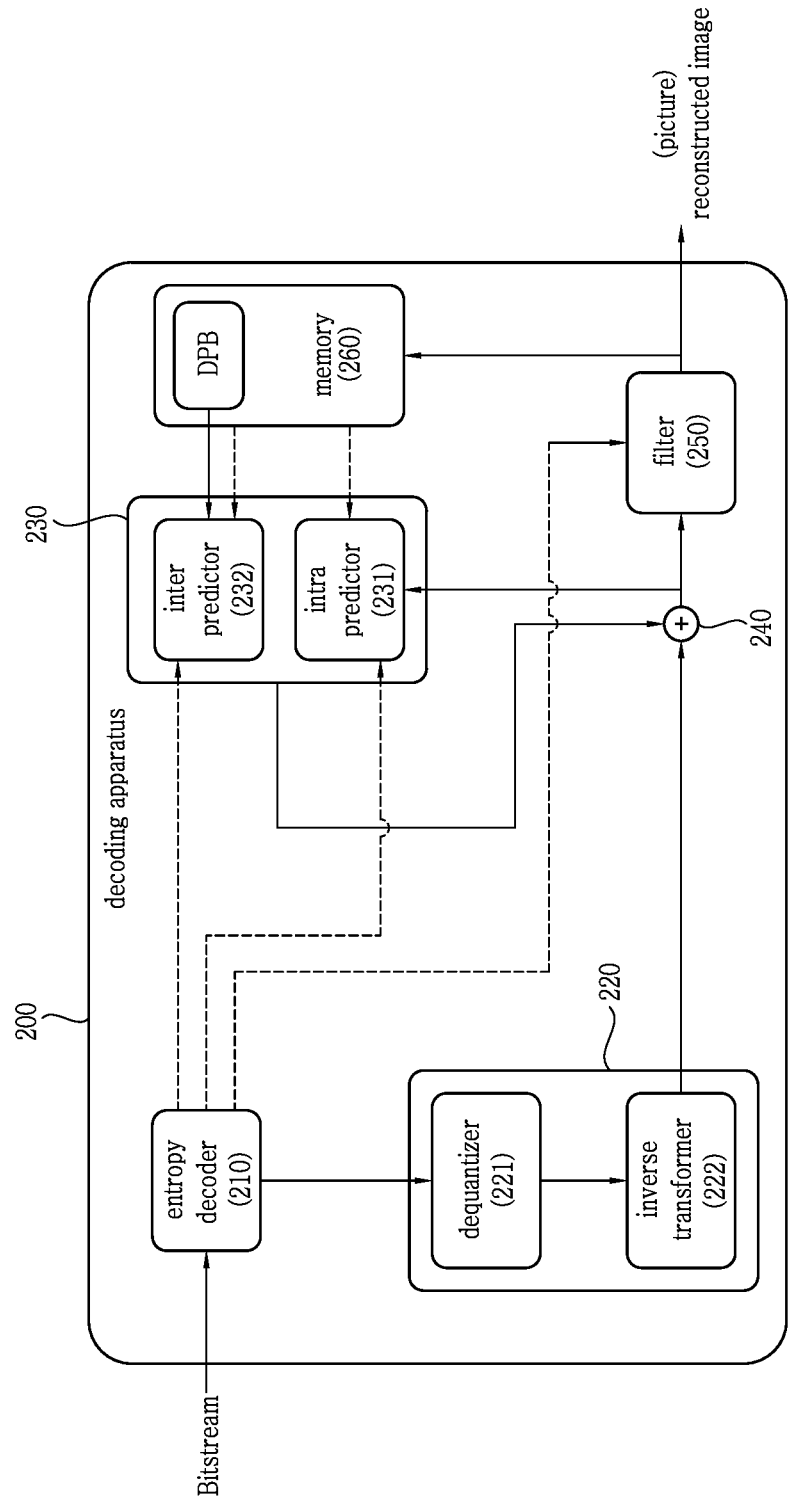
FIG. 2 is a diagram schematically illustrating a configuration of a video/image decoding apparatus to which the present disclosure can be applied.

FIG. 2 is a diagram schematically illustrating a configuration of a video/image decoding apparatus to which the present disclosure can be applied.

Referring to FIG. 2, the video decoding apparatus 200 may include an entropy decoder 210, a residual processor 220, a predictor 230, an adder 240, a filter 250, and a memory 260. The predictor 230 may include an inter predictor 231 and an intra predictor 232. The residual processor 220 may include a dequantizer 221 and an inverse transformer 222. The entropy decoder 210, the residual processor 220, the predictor 230, the adder 240, and the filter 250, which are described above, may be configured by one or more hardware components (e.g., decoder chipsets or processors) according to an embodiment. Further, the memory 260 may include a decoded picture buffer (DPB) and may be configured by a digital storage medium. The hardware component may further include the memory 260 as an internal/external component.

When a bitstream including video/image information is input, the decoding apparatus 200 may reconstruct an image correspondingly to a process by which video/image information has been processed in the encoding apparatus of FIG. 1. For example, the decoding apparatus 200 may derive units/blocks based on information related to block partition obtained from the bitstream. The decoding apparatus 200 may perform decoding by using a processing unit applied in the encoding apparatus. Therefore, the processing unit of decoding may be, for example, a coding unit, which may be partitioned along the quad-tree structure, the binary-tree structure, and/or the ternary-tree structure from a coding tree unit or a largest coding unit. One or more transform units may be derived from the coding unit. And, the reconstructed image signal decoded and outputted through the decoding apparatus 200 may be reproduced through a reproducer.

The decoding apparatus 200 may receive a signal outputted from the encoding apparatus of FIG. 1 in the form of a bitstream, and the received signal may be decoded through the entropy decoder 210. For example, the entropy decoder 210 may parse the bitstream to derive information (e.g., video/image information) required for image reconstruction (or picture reconstruction). The video/image information may further include information on various parameter sets such as an adaptation parameter set (APS), a picture parameter set (PPS), a sequence parameter set (SPS), a video parameter set (VPS), or the like. Further, the video/image information may further include general constraint information. The decoding apparatus may decode a picture further based on information on the parameter set and/or the general constraint information. In the present disclosure, signaled/received information and/or syntax elements, which will be described later on, may be decoded through the decoding procedure and obtained from the bitstream. For example, the entropy decoder 210 may decode information in the bitstream based on a coding method such as exponential Golomb encoding, CAVLC, CABAC, or the like, and may output a value of a syntax element necessary for image reconstruction and quantized values of a transform coefficient regarding a residual. More specifically, a CABAC entropy decoding method may receive a bin corresponding to each syntax element in a bitstream, determine a context model using decoding target syntax element information and decoding information of neighboring and decoding target blocks, or information of symbol/bin decoded in a previous step, predict bin generation probability according to the determined context model and perform arithmetic decoding of the bin to generate a symbol corresponding to each syntax element value. Here, the CABAC entropy decoding method may update the context model using information of a symbol/bin decoded for a context model of the next symbol/bin after determination of the context model. Information on prediction among information decoded in the entropy decoder 210 may be provided to the predictor (inter predictor 232 and intra predictor 231), and residual values, i.e., quantized transform coefficients, on which entropy decoding has been performed in the entropy decoder 210, and related parameter information may be inputted to the residual processor 220. The residual processor 220 may derive a residual signal (residual block, residual samples, residual sample array). Further, information on filtering among information decoded in the entropy decoder 210 may be provided to the filter 250. Meanwhile, a receiver (not shown) that receives a signal outputted from the encoding apparatus may further configure the decoding apparatus 200 as an internal/external element, and the receiver may be a component of the entropy decoder 210. Meanwhile, the decoding apparatus according to the present disclosure may be referred to as a video/image/picture coding apparatus, and the decoding apparatus may be classified as an information decoder (video/image/picture information decoder) and a sample decoder (video/image/picture sample decoder). The information decoder may include the entropy decoder 210, and the sample decoder may include at least one of the dequantizer 221, the inverse transformer 222, the adder 240, the filter 250, the memory 260, the inter predictor 232, and the intra predictor 231.

The dequantizer 221 may output transform coefficients by dequantizing the quantized transform coefficients. The dequantizer 221 may rearrange the quantized transform coefficients in the form of a two-dimensional block. In this case, the rearrangement process may perform rearrangement based on an order of coefficient scanning, which is performed in the encoding apparatus. The dequantizer 221 may perform dequantization on the quantized transform coefficients using quantization parameter (e.g., quantization step size information) and obtain transform coefficients.

The inverse transformer 222 obtains a residual signal (residual block, residual sample array) by performing inverse transform on transform coefficients.

The predictor may perform prediction on the current block and generate a predicted block including prediction samples for the current block. The predictor may determine whether intra prediction or inter prediction is applied to the current block based on the information on prediction outputted from the entropy decoder 210, and, more specifically, the predictor may determine an intra/inter prediction mode.

The predictor 220 may generate a prediction signal based on various prediction methods. For example, the predictor may apply intra prediction or inter prediction for prediction on one block, and may also apply intra prediction and inter prediction at the same time. This may be referred to as combined inter and intra prediction (CIIP). In addition, the predictor may perform intra block copy (IBC) for prediction on a block. The intra block copy may be used for content image/video coding in games, or the like, such as screen content coding (SCC). Although the IBC basically performs prediction in a current block, the prediction may be performed similarly to inter prediction in that a reference block is derived in a current block. That is, the IBC may use at least one of inter prediction techniques described in the present disclosure. The palette mode may be viewed as an example of intra coding or intra prediction. In case the palette mode is applied, a sample value within a picture may be signaled based on information related to a palette table and a palette index.

The intra predictor 231 may predict the current block by referring to the samples in the current picture. The referred samples may be located in a neighboring region of the current block or in a distant region apart from the current block according to the prediction mode. In the intra prediction, prediction modes may include a plurality of non-directional modes and a plurality of directional modes. The intra predictor 231 may determine the prediction mode applied to the current block by using the prediction mode applied to the neighboring block.

The inter predictor 232 may derive a predicted block for the current block based on a reference block (reference sample array) specified by a motion vector on a reference picture. At this time, in order to reduce the amount of motion information transmitted in the inter prediction mode, the motion information may be predicted in block, subblock, or sample units based on correlation of motion information between the neighboring block and the current block. The motion information may include a motion vector and a reference picture index. The motion information may further include information on inter prediction direction (L0 prediction, L1 prediction, Bi prediction, and so on). In the case of inter prediction, the neighboring block may include a spatial neighboring block existing in the current picture and a temporal neighboring block existing in the reference picture. For example, the inter predictor 232 may configure a motion information candidate list based on neighboring blocks and derive a motion vector and/or a reference picture index of the current block based on received candidate selection information. Inter prediction may be performed based on various prediction modes, and the information on prediction may include information indicating an inter prediction mode for the current block.

The adder 240 may generate a reconstructed signal (reconstructed picture, reconstructed block, reconstructed sample array) by adding the obtained residual signal to the prediction signal (predicted block, prediction sample array) that is outputted from the predictor (including the inter predictor 232 and/or the intra predictor 231). When there is no residual for a processing target block, as in a case where the skip mode is applied, the predicted block may be used as a reconstructed block.

The adder 240 may be referred to as a reconstructor or a reconstructed block generator. The generated reconstructed signal may be used for intra prediction of a next processing target block in the current block, and, as described later on, the generated reconstructed signal may be outputted through filtering or be used for inter prediction of a next picture.

Meanwhile, in the picture decoding process, luma mapping with chroma scaling (LMCS) may be applied.

The filter 250 may improve subjective/objective video quality by applying the filtering to the reconstructed signal. For example, the filter 250 may generate a modified reconstructed picture by applying various filtering methods to the reconstructed picture, and may transmit the modified reconstructed picture in the memory 260, more specifically, in the DPB of the memory 260. The various filtering methods may include, for example, deblocking filtering, sample adaptive offset, an adaptive loop filter, a bilateral filter, or the like.

The (modified) reconstructed picture that is stored in the DPB of the memory 260 may be used as a reference picture in the inter predictor 232. The memory 260 may store motion information of a block in the current picture, from which motion information has been derived (or decoded), and/or motion information of blocks in an already (or previously) reconstructed picture. The stored motion information may be transmitted to the inter predictor 232 so as to be utilized as motion information of a neighboring block or motion information of a temporal neighboring block. The memory 260 may store reconstructed samples of reconstructed blocks in the current picture and may transmit the reconstructed samples to the intra predictor 231.

In this specification, the embodiments described in each of the filter 250, the inter predictor 232, and the intra predictor 231 of the decoding apparatus 200 may be identically or correspondingly applied to the filter 160, the inter predictor 121, and the intra predictor 122 of the encoding apparatus 100, respectively.

As described above, prediction is performed in order to increase compression efficiency in performing video coding. In doing so, a predicted block including prediction samples for a current block, which is a coding target block, may be generated. Here, the predicted block includes prediction samples in a space domain (or pixel domain). The predicted block may be identically derived in the encoding apparatus and the decoding apparatus, and the encoding apparatus may increase image coding efficiency by signaling, to the decoding apparatus, not an original sample value of an original block itself but information on residual (residual information) between the original block and the predicted block. The decoding apparatus may derive a residual block including residual samples based on the residual information, generate a reconstructed block including reconstructed samples by adding the residual block to the predicted block, and generate a reconstructed picture including reconstructed blocks.

The residual information may be generated through transform and quantization procedures. For example, the encoding apparatus may derive a residual block between the original block and the predicted block, derive transform coefficients by performing a transform procedure on residual samples (residual sample array) included in the residual block, and derive quantized transform coefficients by performing a quantization procedure on the transform coefficients, so that it can signal related residual information to the decoding apparatus (through a bitstream). Here, the residual information may include value information, position information, a transform technique, transform kernel, a quantization parameter, or the like, of the quantized transform coefficients. The decoding apparatus may perform a quantization/dequantization procedure and derive the residual samples (or residual sample block) based on residual information. The decoding apparatus may generate a reconstructed block based on a predicted block and the residual block. The encoding apparatus may derive a residual block by dequantizing/inverse transforming quantized transform coefficients for reference for inter prediction of a next picture, and may generate a reconstructed picture based on the derived residual block.

Figure 3:
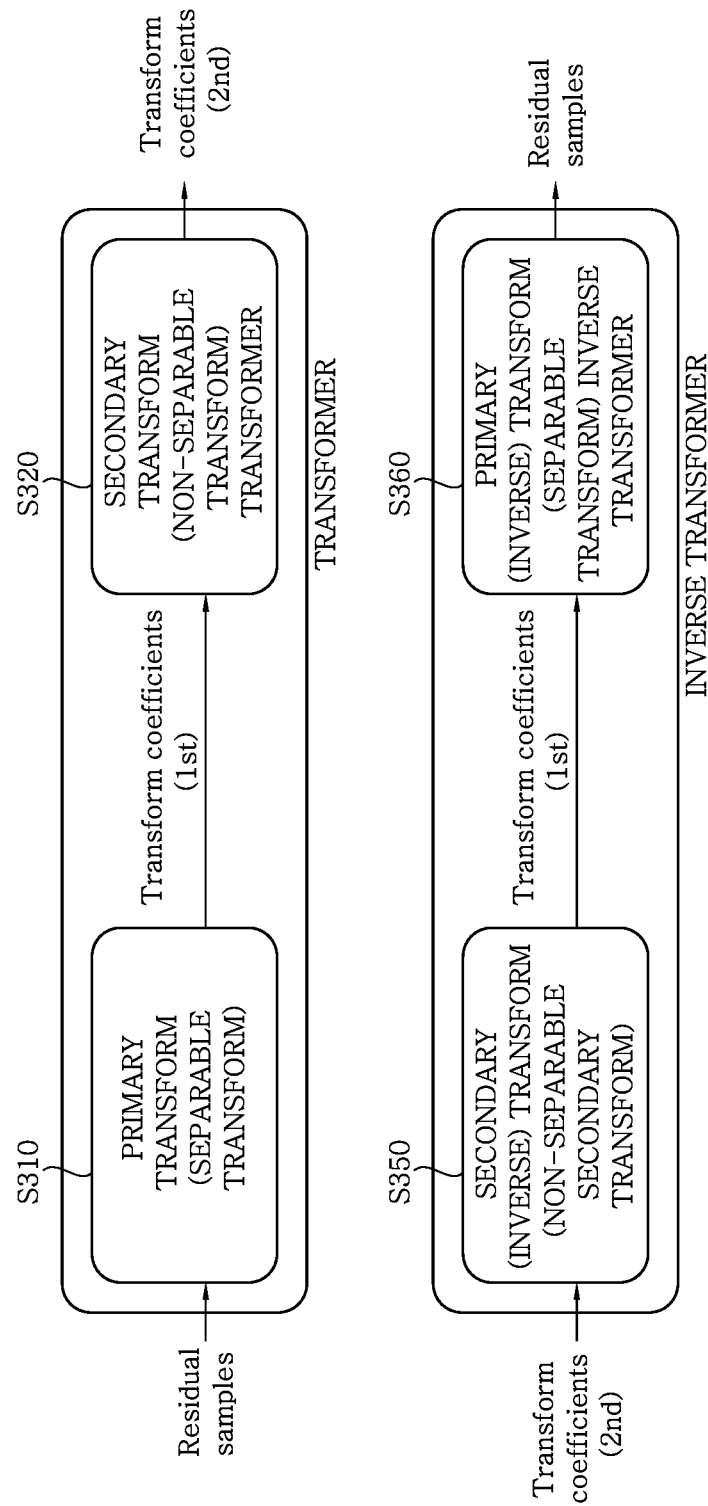
FIG. 3 schematically illustrates a multiple transform scheme according to an embodiment of the present document.

FIG. 3 schematically illustrates a multiple transform technique according to an embodiment of the present disclosure.

Referring to FIG. 3, a transformer may correspond to the transformer in the encoding apparatus of foregoing FIG. 1, and an inverse transformer may correspond to the inverse transformer in the encoding apparatus of foregoing FIG. 1, or to the inverse transformer in the decoding apparatus of FIG. 2.

The transformer may derive (primary) transform coefficients by performing a primary transform based on residual samples (residual sample array) in a residual block (S310). This primary transform may be referred to as a core transform. Herein, the primary transform may be based on multiple transform selection (MTS), and when a multiple transform is applied as the primary transform, it may be referred to as a multiple core transform.

The multiple core transform may represent a method of transforming additionally using discrete cosine transform (DCT) type 2 and discrete sine transform (DST) type 7, DCT type 8, and/or DST type 1. That is, the multiple core transform may represent a transform method of transforming a residual signal (or residual block) of a space domain into transform coefficients (or primary transform coefficients) of a frequency domain based on a plurality of transform kernels selected from among the DCT type 2, the DST type 7, the DCT type 8 and the DST type 1. Herein, the primary transform coefficients may be called temporary transform coefficients from the viewpoint of the transformer.

In other words, when the conventional transform method is applied, transform coefficients might be generated by applying transform from a space domain to a frequency domain for a residual signal (or residual block) based on the DCT type 2. Unlike to this, when the multiple core transform is applied, transform coefficients (or primary transform coefficients) may be generated by applying transform from a space domain to a frequency domain for a residual signal (or residual block) based on the DCT type 2, the DST type 7, the DCT type 8, and/or DST type 1. Herein, the DCT type 2, the DST type 7, the DCT type 8, and the DST type 1 may be called a transform type, transform kernel or transform core. These DCT/DST transform types can be defined based on basis functions.

When the multiple core transform is performed, a vertical transform kernel and a horizontal transform kernel for a target block may be selected from among the transform kernels, a vertical transform may be performed on the target block based on the vertical transform kernel, and a horizontal transform may be performed on the target block based on the horizontal transform kernel. Here, the horizontal transform may indicate a transform for horizontal components of the target block, and the vertical transform may indicate a transform for vertical components of the target block. The vertical transform kernel/horizontal transform kernel may be adaptively determined based on a prediction mode and/or a transform index for the target block (CU or subblock) including a residual block.

Further, according to an example, if the primary transform is performed by applying the MTS, a mapping relationship for transform kernels may be set by setting specific basis functions to predetermined values and combining basis functions to be applied in the vertical transform or the horizontal transform. For example, when the horizontal transform kernel is expressed as trTypeHor and the vertical direction transform kernel is expressed as trType Ver, a trTypeHor or trType Ver value of 0 may be set to DCT2, a trTypeHor or trType Ver value of 1 may be set to DST7, and a trTypeHor or trType Ver value of 2 may be set to DCT8.

In this case, MTS index information may be encoded and signaled to the decoding apparatus to indicate any one of a plurality of transform kernel sets. For example, an MTS index of 0 may indicate that both trTypeHor and trType Ver values are 0, an MTS index of 1 may indicate that both trTypeHor and trType Ver values are 1, an MTS index of 2 may indicate that the trTypeHor value is 2 and the trType Ver value. Is 1, an MTS index of 3 may indicate that the trTypeHor value is 1 and the trType Ver value is 2, and an MTS index of 4 may indicate that both trTypeHor and trType Ver values are 2.

In one example, transform kernel sets according to MTS index information are illustrated in the following table.

TABLE 1

| tu_mts_idx[ x0 ][ y0 ] | 0 | 1 | 2 | 3 | 4 |
|---|---|---|---|---|---|
| trTypeHor | 0 | 1 | 2 | 1 | 2 |
| trTypeVer | 0 | 1 | 1 | 2 | 2 |

The transformer may perform a secondary transform based on the (primary) transform coefficients to derive modified (secondary) transform coefficients (S320). The primary transform is a transform from a spatial domain to a frequency domain, and the secondary transform refers to transforming into a more compact expression using a correlation existing between (primary) transform coefficients. The secondary transform may include a non-separable transform. In this case, the secondary transform may be referred to as a non-separable secondary transform (NSST) or a mode-dependent non-separable secondary transform (MDNSST). The NSST may represent a transform that secondarily transforms (primary) transform coefficients derived through the primary transform based on a non-separable transform matrix to generate modified transform coefficients (or secondary transform coefficients) for a residual signal. Here, the transform may be applied at once without separating (or independently applying a horizontal/vertical transform) a vertical transform and a horizontal transform to the (primary) transform coefficients based on the non-separable transform matrix. In other words, the NSST is not separately applied to the (primary) transform coefficients in a vertical direction and a horizontal direction, and may represent, for example, a transform method of rearranging two-dimensional signals (transform coefficients) into a one-dimensional signal through a specific predetermined direction (e.g., row-first direction or column-first direction) and then generating modified transform coefficients (or secondary transform coefficients) based on the non-separable transform matrix. For example, a row-first order is to dispose in a line in order of a 1st row, a 2nd row, . . . , an Nth row for M×N blocks, and a column-first order is to dispose in a line in order of a 1st column, a 2nd column, . . . , an Mth column for M×N blocks. The NSST may be applied to a top-left region of a block (hereinafter, referred to as a transform coefficient block) configured with (primary) transform coefficients. For example, when both a width W and height H of the transform coefficient block are 8 or more, an 8×8 NSST may be applied to the top-left 8×8 region of the transform coefficient block. Further, while both the width (W) and height (H) of the transform coefficient block are 4 or more, when the width (W) or height (H) of the transform coefficient block is smaller than 8, 4×4 NSST may be applied to the top-left min(8,W)×min(8,H) region of the transform coefficient block. However, the embodiment is not limited thereto, and for example, even if only the condition that the width W or the height H of the transform coefficient block is 4 or greater is satisfied, the 4×4 NSST may be applied to the top-left end min(8,W)×min(8,H) region of the transform coefficient block.

Specifically, for example, if a 4×4 input block is used, the non-separable secondary transform may be performed as follows.

The 4×4 input block X may be represented as follows.

$$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix}$$ [Equation 1]

If the X is represented in the form of a vector, the vector X may be represented as below.

$$\vec{X} = [x_{00}\ x_{01}\ x_{02}\ x_{03}\ x_{10}\ x_{11}\ x_{12}\ x_{13}\ x_{20}\ x_{21}\ x_{22}\ x_{23}\ x_{30}\ x_{31}\ x_{32}\ x_{33}]^T$$ [Equation 2]

In Equation 2, the vector $\vec{X}$ is a one-dimensional vector obtained by rearranging the two-dimensional block X of Equation 1 according to the row-first order.

In this case, the secondary non-separable transform may be calculated as below.

$$\vec{F} = T \cdot \vec{X}$$ [Equation 3]

In this equation, $\vec{F}$ represents a transform coefficient vector, and T represents a 16×16 (non-separable) transform matrix.

Through foregoing Equation 3, a 16×1 transform coefficient vector $\vec{F}$ may be derived, and the $\vec{F}$ may be reorganized into a 4×4 block through a scan order (horizontal, vertical, diagonal and the like). However, the above-described calculation is an example, and hypercube-Givens transform (HyGT) or the like may be used for the calculation of the non-separable secondary transform in order to reduce the computational complexity of the non-separable secondary transform.

Meanwhile, in the non-separable secondary transform, a transform kernel (or transform core, transform type) may be selected to be mode dependent. In this case, the mode may include the intra prediction mode and/or the inter prediction mode.

As described above, the non-separable secondary transform may be performed based on an 8×8 transform or a 4×4 transform determined based on the width (W) and the height (H) of the transform coefficient block. The 8×8 transform refers to a transform that is applicable to an 8×8 region included in the transform coefficient block when both W and H are equal to or greater than 8, and the 8×8 region may be a top-left 8×8 region in the transform coefficient block. Similarly, the 4×4 transform refers to a transform that is applicable to a 4×4 region included in the transform coefficient block when both W and H are equal to or greater than 4, and the 4×4 region may be a top-left 4×4 region in the transform coefficient block. For example, an 8×8 transform kernel matrix may be a 64×64/16×64 matrix, and a 4×4 transform kernel matrix may be a 16×16/8×16 matrix.

Here, to select a mode-dependent transform kernel, two non-separable secondary transform kernels per transform set for a non-separable secondary transform may be configured for both the 8×8 transform and the 4×4 transform, and there may be four transform sets. That is, four transform sets may be configured for the 8×8 transform, and four transform sets may be configured for the 4×4 transform. In this case, each of the four transform sets for the 8×8 transform may include two 8×8 transform kernels, and each of the four transform sets for the 4×4 transform may include two 4×4 transform kernels.

However, as the size of the transform, that is, the size of a region to which the transform is applied, may be, for example, a size other than 8×8 or 4×4, the number of sets may be n, and the number of transform kernels in each set may be k.

The transform set may be referred to as an NSST set or an LFNST set. A specific set among the transform sets may be selected, for example, based on the intra prediction mode of the current block (CU or subblock). A low-frequency non-separable transform (LFNST) may be an example of a reduced non-separable transform, which will be described later, and represents a non-separable transform for a low frequency component.

For reference, for example, the intra prediction mode may include two non-directional (or non-angular) intra prediction modes and 65 directional (or angular) intra prediction modes. The non-directional intra prediction modes may include a planar intra prediction mode of No. 0 and a DC intra prediction mode of No. 1, and the directional intra prediction modes may include 65 intra prediction modes of Nos. 2 to 66. However, this is an example, and this document may be applied even when the number of intra prediction modes is different. Meanwhile, in some cases, intra prediction mode No. 67 may be further used, and the intra prediction mode No. 67 may represent a linear model (LM) mode.

Figure 4:
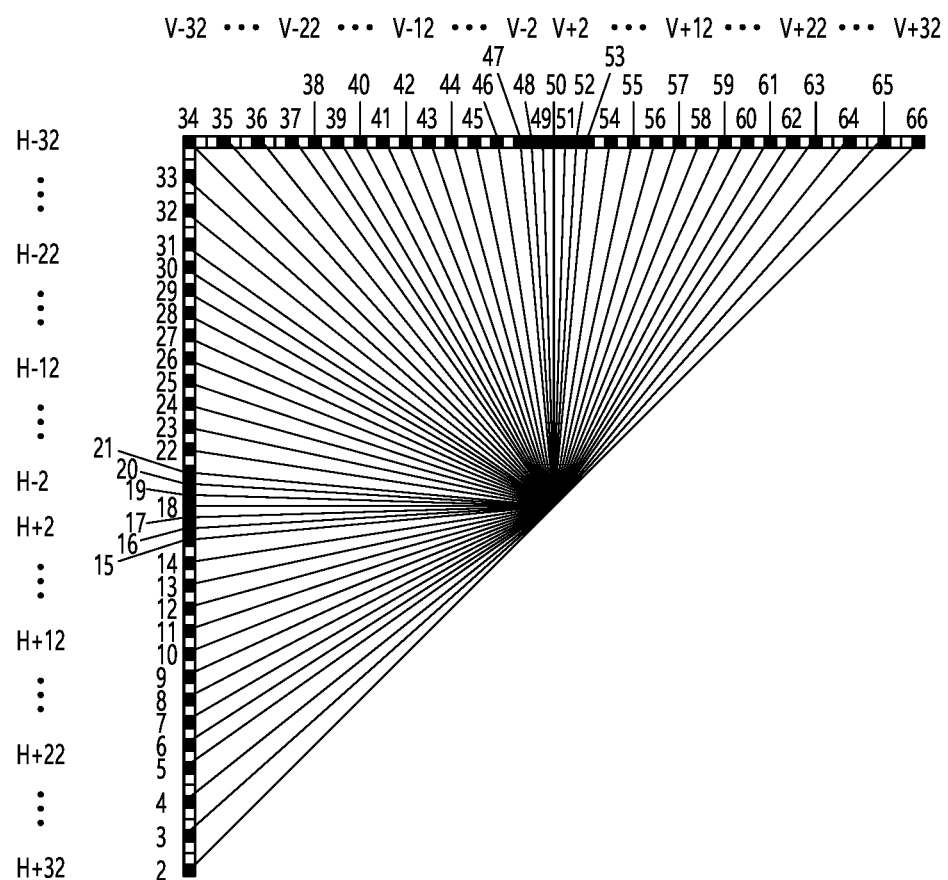
FIG. 4 exemplarily shows intra directional modes of 65 prediction directions.

FIG. 4 exemplarily shows intra directional modes of 65 prediction directions.

Figure 5:
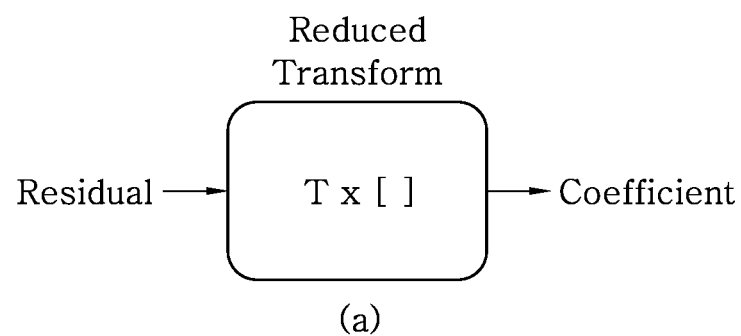
FIG. 5 is a diagram for explaining RST according to an embodiment of the present.
Figure 5:
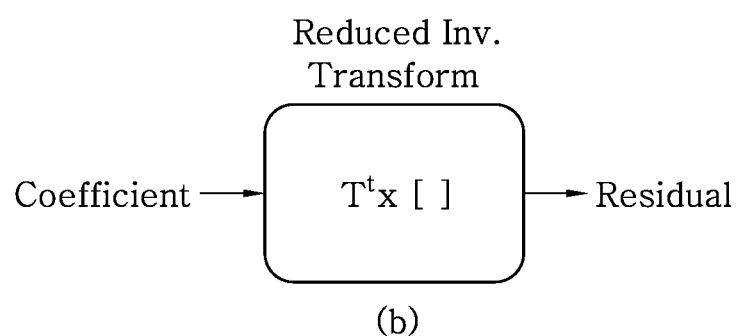

Referring to FIG. 4, on the basis of intra prediction mode 34 having a left upward diagonal prediction direction, the intra prediction modes may be divided into intra prediction modes having horizontal directionality and intra prediction modes having vertical directionality. In FIG. 5, H and V denote horizontal directionality and vertical directionality, respectively, and numerals −32 to 32 indicate displacements in 1/32 units on a sample grid position. These numerals may represent an offset for a mode index value. Intra prediction modes 2 to 33 have the horizontal directionality, and intra prediction modes 34 to 66 have the vertical directionality. Strictly speaking, intra prediction mode 34 may be considered as being neither horizontal nor vertical, but may be classified as belonging to the horizontal directionality in determining a transform set of a secondary transform. This is because input data is transposed to be used for a vertical direction mode symmetrical on the basis of intra prediction mode 34, and an input data alignment method for a horizontal mode is used for intra prediction mode 34. Transposing input data means that rows and columns of two-dimensional M×N block data are switched into N×M data. Intra prediction mode 18 and intra prediction mode 50 may represent a horizontal intra prediction mode and a vertical intra prediction mode, respectively, and intra prediction mode 2 may be referred to as a right upward diagonal intra prediction mode because intra prediction mode 2 has a left reference pixel and performs prediction in a right upward direction. Likewise, intra prediction mode 34 may be referred to as a right downward diagonal intra prediction mode, and intra prediction mode 66 may be referred to as a left downward diagonal intra prediction mode.

According to an example, the four transform sets according to the intra prediction mode may be mapped, for example, as shown in the following table.

TABLE 2

| 1fnstPredModeIntra | lfnstTrSetIdx |
|---|---|
| 1fnstPredModeIntra < 0 | 1 |
| 0 <= lfnstPredModeIntra <= 1 | 0 |
| 2 <= lfnstPredModeIntra <= 12 | 1 |
| 13 <= lfnstPredModeIntra <= 23 | 2 |
| 24 <= lfnstPredModeIntra <= 44 | 3 |
| 45 <= lfnstPredModeIntra <= 55 | 2 |
| 56 <= lfnstPredModeIntra <= 80 | 1 |
| 81 <= lfnstPredModeIntra <= 83 | 0 |

As shown in Table 2, any one of the four transform sets, that is, lfnstTrSetIdx, may be mapped to any one of four indexes, that is, 0 to 3, according to the intra prediction mode.

When it is determined that a specific set is used for the non-separable transform, one of k transform kernels in the specific set may be selected through a non-separable secondary transform index. An encoding apparatus may derive a non-separable secondary transform index indicating a specific transform kernel based on a rate-distortion (RD) check and may signal the non-separable secondary transform index to a decoding apparatus. The decoding apparatus may select one of the k transform kernels in the specific set based on the non-separable secondary transform index. For example, lfnst index value 0 may refer to a first non-separable secondary transform kernel, lfnst index value 1 may refer to a second non-separable secondary transform kernel, and lfnst index value 2 may refer to a third non-separable secondary transform kernel. Alternatively, lfnst index value 0 may indicate that the first non-separable secondary transform is not applied to the target block, and lfnst index values 1 to 3 may indicate the three transform kernels.

The transformer may perform the non-separable secondary transform based on the selected transform kernels, and may obtain modified (secondary) transform coefficients. As described above, the modified transform coefficients may be derived as transform coefficients quantized through the quantizer, and may be encoded and signaled to the decoding apparatus and transferred to the dequantizer/inverse transformer in the encoding apparatus.

Meanwhile, as described above, if the secondary transform is omitted, (primary) transform coefficients, which are an output of the primary (separable) transform, may be derived as transform coefficients quantized through the quantizer as described above, and may be encoded and signaled to the decoding apparatus and transferred to the dequantizer/inverse transformer in the encoding apparatus.

The inverse transformer may perform a series of procedures in the inverse order to that in which they have been performed in the above-described transformer. The inverse transformer may receive (dequantized) transformer coefficients, and derive (primary) transform coefficients by performing a secondary (inverse) transform (S350), and may obtain a residual block (residual samples) by performing a primary (inverse) transform for the (primary) transform coefficients (S360). In this connection, the primary transform coefficients may be called modified transform coefficients from the viewpoint of the inverse transformer. As described above, the encoding apparatus and the decoding apparatus may generate the reconstructed block based on the residual block and the predicted block, and may generate the reconstructed picture based on the reconstructed block.

The decoding apparatus may further include a secondary inverse transform application determinator (or an element to determine whether to apply a secondary inverse transform) and a secondary inverse transform determinator (or an element to determine a secondary inverse transform). The secondary inverse transform application determinator may determine whether to apply a secondary inverse transform. For example, the secondary inverse transform may be an NSST, an RST, or an LFNST and the secondary inverse transform application determinator may determine whether to apply the secondary inverse transform based on a secondary transform flag obtained by parsing the bitstream. In another example, the secondary inverse transform application determinator may determine whether to apply the secondary inverse transform based on a transform coefficient of a residual block.

The secondary inverse transform determinator may determine a secondary inverse transform. In this case, the secondary inverse transform determinator may determine the secondary inverse transform applied to the current block based on an LFNST (NSST or RST) transform set specified according to an intra prediction mode. In an embodiment, a secondary transform determination method may be determined depending on a primary transform determination method. Various combinations of primary transforms and secondary transforms may be determined according to the intra prediction mode. Further, in an example, the secondary inverse transform determinator may determine a region to which a secondary inverse transform is applied based on the size of the current block.

Meanwhile, as described above, if the secondary (inverse) transform is omitted, (dequantized) transform coefficients may be received, the primary (separable) inverse transform may be performed, and the residual block (residual samples) may be obtained. As described above, the encoding apparatus and the decoding apparatus may generate the reconstructed block based on the residual block and the predicted block, and may generate the reconstructed picture based on the reconstructed block.

Meanwhile, in the present disclosure, a reduced secondary transform (RST) in which the size of a transform matrix (kernel) is reduced may be applied in the concept of NSST in order to reduce the amount of computation and memory required for the non-separable secondary transform.

Meanwhile, the transform kernel, the transform matrix, and the coefficient constituting the transform kernel matrix, that is, the kernel coefficient or the matrix coefficient, described in the present disclosure may be expressed in 8 bits. This may be a condition for implementation in the decoding apparatus and the encoding apparatus, and may reduce the amount of memory required to store the transform kernel with a performance degradation that can be reasonably accommodated compared to the existing 9 bits or 10 bits. In addition, the expressing of the kernel matrix in 8 bits may allow a small multiplier to be used, and may be more suitable for single instruction multiple data (SIMD) instructions used for optimal software implementation.

In the present specification, the term "RST" may mean a transform which is performed on residual samples for a target block based on a transform matrix whose size is reduced according to a reduced factor. In the case of performing the reduced transform, the amount of computation required for transform may be reduced due to a reduction in the size of the transform matrix. That is, the RST may be used to address the computational complexity issue occurring at the non-separable transform or the transform of a block of a great size. RST may be referred to as various terms, such as reduced transform, reduced secondary transform, reduction transform, simplified transform, simple transform, and the like, and the name which RST may be referred to as is not limited to the listed examples. Alternatively, since the RST is mainly performed in a low frequency region including a non-zero coefficient in a transform block, it may be referred to as a Low-Frequency Non-Separable Transform (LFNST). The transform index may be referred to as an LFNST index.

Meanwhile, when the secondary inverse transform is performed based on RST, the inverse transformer 135 of the encoding apparatus 100 and the inverse transformer 222 of the decoding apparatus 200 may include an inverse reduced secondary transformer which derives modified transform coefficients based on the inverse RST of the transform coefficients, and an inverse primary transformer which derives residual samples for the target block based on the inverse primary transform of the modified transform coefficients. The inverse primary transform refers to the inverse transform of the primary transform applied to the residual. In the present disclosure, deriving a transform coefficient based on a transform may refer to deriving a transform coefficient by applying the transform.

FIG. 5 is a diagram illustrating an RST according to an embodiment of the present disclosure.

In the present disclosure, a "target block" may refer to a current block to be coded, a residual block, or a transform block.

In the RST according to an example, an N-dimensional vector may be mapped to an R-dimensional vector located in another space, so that the reduced transform matrix may be determined, where R is less than N. N may mean the square of the length of a side of a block to which the transform is applied, or the total number of transform coefficients corresponding to a block to which the transform is applied, and the reduced factor may mean an R/N value. The reduced factor may be referred to as a reduced factor, reduction factor, simplified factor, simple factor or other various terms. Meanwhile, R may be referred to as a reduced coefficient, but according to circumstances, the reduced factor may mean R. Further, according to circumstances, the reduced factor may mean the N/R value.

In an example, the reduced factor or the reduced coefficient may be signaled through a bitstream, but the example is not limited to this. For example, a predefined value for the reduced factor or the reduced coefficient may be stored in each of the encoding apparatus 100 and the decoding apparatus 200, and in this case, the reduced factor or the reduced coefficient may not be signaled separately.

The size of the reduced transform matrix according to an example may be R×N less than N×N, the size of a conventional transform matrix, and may be defined as in Equation 4 below.

$$T_{R \times N} = \begin{bmatrix} t_{11} & t_{12} & t_{13} & \cdots & t_{1N} \\ t_{21} & t_{22} & t_{23} & \cdots & t_{2N} \\ \vdots & & & \ddots & \vdots \\ t_{R1} & t_{R2} & t_{R3} & \cdots & t_{RN} \end{bmatrix} \quad \text{[Equation 4]}$$

The matrix T in the Reduced Transform block shown in (a) of FIG. 5 may mean the matrix $T_{R \times N}$ of Equation 4. As shown in (a) of FIG. 5, when the reduced transform matrix $T_{R \times N}$ is multiplied to residual samples for the target block, transform coefficients for the target block may be derived.

In an example, if the size of the block to which the transform is applied is 8×8 and R=16 (i.e., R/N=16/64=¼), then the RST according to (a) of FIG. 5 may be expressed as a matrix operation as shown in Equation 5 below. In this case, memory and multiplication calculation can be reduced to approximately ¼ by the reduced factor.

In the present disclosure, a matrix operation may be understood as an operation of multiplying a column vector by a matrix, disposed on the left of the column vector, to obtain a column vector.

$$\begin{bmatrix} t_{1,1} & t_{1,2} & t_{1,3} & \cdots & t_{1,64} \\ t_{2,1} & t_{2,2} & t_{2,3} & \cdots & t_{2,64} \\ \vdots & & & \ddots & \vdots \\ t_{16,1} & t_{16,2} & t_{16,3} & \cdots & t_{16,64} \end{bmatrix} \times \begin{bmatrix} r_1 \\ r_2 \\ \vdots \\ r_{64} \end{bmatrix} \quad \text{[Equation 5]}$$

In Equation 5, $r_1$ to $r_{64}$ may represent residual samples for the target block and may be specifically transform coefficients generated by applying a primary transform. As a result of the calculation of Equation 5 transform coefficients ci for the target block may be derived, and a process of deriving ci may be as in Equation 6.

$$\text{for } i \text{ from to } R: \quad \text{[Equation 6]}$$
$$c_i = 0$$
$$\text{for } j \text{ from 1 to } N$$
$$c_i \mathrel{+}= t_{ij} * r_j$$

As a result of the calculation of Equation 6, transform coefficients $c_1$ to $C_R$ for the target block may be derived. That is, when R=16, transform coefficients $c_1$ to $c_{16}$ for the target block may be derived. If, instead of RST, a regular transform is applied and a transform matrix of 64×64 (N×N) size is multiplied to residual samples of 64×1 (N×1) size, then only 16 (R) transform coefficients are derived for the target block because RST was applied, although 64 (N) transform coefficients are derived for the target block. Since the total number of transform coefficients for the target block is reduced from N to R, the amount of data transmitted by the encoding apparatus 100 to the decoding apparatus 200 decreases, so efficiency of transmission between the encoding apparatus 100 and the decoding apparatus 200 can be improved.

When considered from the viewpoint of the size of the transform matrix, the size of the regular transform matrix is 64×64 (N×N), but the size of the reduced transform matrix is reduced to 16×64 (R×N), so memory usage in a case of performing the RST can be reduced by an R/N ratio when compared with a case of performing the regular transform. In addition, when compared to the number of multiplication calculations N×N in a case of using the regular transform matrix, the use of the reduced transform matrix can reduce the number of multiplication calculations by the R/N ratio (R×N).

In an example, the transformer 132 of the encoding apparatus 100 may derive transform coefficients for the target block by performing the primary transform and the RST-based secondary transform for residual samples for the target block. These transform coefficients may be transferred to the inverse transformer of the decoding apparatus 200, and the inverse transformer 222 of the decoding apparatus 200 may derive the modified transform coefficients based on the inverse reduced secondary transform (RST) for the transform coefficients, and may derive residual samples for the target block based on the inverse primary transform for the modified transform coefficients.

The size of the inverse RST matrix $T_{N \times R}$ according to an example is N×R less than the size N×N of the regular inverse transform matrix, and is in a transpose relationship with the reduced transform matrix $T_{R \times N}$ shown in Equation 4.

The matrix T' in the Reduced Inv. Transform block shown in (b) of FIG. 5 may mean the inverse RST matrix $T_{R \times N}^T$ (the superscript T means transpose). When the inverse RST matrix $T_{R \times N}^T$ is multiplied to the transform coefficients for the target block as shown in (b) of FIG. 5, the modified transform coefficients for the target block or the residual samples for the current block may be derived. The inverse RST matrix $T_{R \times N}^T$ may be expressed as $(T_{R \times N})^T_{N \times R}$.

More specifically, when the inverse RST is applied as the secondary inverse transform, the modified transform coefficients for the target block may be derived when the inverse RST matrix TRENT is multiplied to the transform coefficients for the target block. Meanwhile, the inverse RST may be applied as the inverse primary transform, and in this case, the residual samples for the target block may be derived when the inverse RST matrix $T_{R \times N}^T$ is multiplied to the transform coefficients for the target block.

In an example, if the size of the block to which the inverse transform is applied is 8×8 and R=16 (i.e., R/N=16/64=1/4), then the RST according to (b) of FIG. 5 may be expressed as a matrix operation as shown in Equation 7 below.

$$\begin{bmatrix} t_{1,1} & t_{2,1} & & t_{16,1} \\ t_{1,2} & t_{2,2} & & t_{16,2} \\ t_{1,3} & t_{2,3} & \cdots & t_{16,3} \\ \vdots & \vdots & & \vdots \\ & & \ddots & \vdots \\ t_{1,64} & t_{2,64} & \cdots & t_{16,64} \end{bmatrix} \times \begin{bmatrix} c_1 \\ c_2 \\ \vdots \\ c_{16} \end{bmatrix} \quad \text{[Equation 7]}$$

In Equation 7, $c_1$ to $c_{16}$ may represent the transform coefficients for the target block. As a result of the calculation of Equation 7, $r_i$ representing the modified transform coefficients for the target block or the residual samples for the target block may be derived, and the process of deriving $r_i$ may be as in Equation 8.

$$\text{For } i \text{ from 1 to } N \quad \text{[Equation 8]}$$
$$r_i = 0$$
$$\text{for } j \text{ from 1 to } R$$
$$r_i \mathrel{+}= t_{ji} * c_j$$

As a result of the calculation of Equation 8, $r_1$ to $r_N$ representing the modified transform coefficients for the target block or the residual samples for the target block may be derived. When considered from the viewpoint of the size of the inverse transform matrix, the size of the regular inverse transform matrix is 64×64 (N×N), but the size of the reduced inverse transform matrix is reduced to 64×16 (R×N), so memory usage in a case of performing the inverse RST can be reduced by an R/N ratio when compared with a case of performing the regular inverse transform. In addition, when compared to the number of multiplication calculations N×N in a case of using the regular inverse transform matrix, the use of the reduced inverse transform matrix can reduce the number of multiplication calculations by the R/N ratio (N×R).

A transform set configuration shown in Table 2 may also be applied to an 8×8 RST. That is, the 8×8 RST may be applied according to a transform set in Table 2. Since one transform set includes two or three transforms (kernels) according to an intra prediction mode, it may be configured to select one of up to four transforms including that in a case where no secondary transform is applied. In a transform where no secondary transform is applied, it may be considered to apply an identity matrix. Assuming that indexes 0, 1, 2, and 3 are respectively assigned to the four transforms (e.g., index 0 may be allocated to a case where an identity matrix is applied, that is, a case where no secondary transform is applied), a transform index or an Ifnst index as a syntax element may be signaled for each transform coefficient block, thereby designating a transform to be applied. That is, for a top-left 8×8 block, through the transform index, it is possible to designate an 8×8 RST in an RST configuration, or to designate an 8×8 lfnst when the LFNST is applied. The 8×8 lfnst and the 8×8 RST refer to transforms applicable to an 8×8 region included in the transform coefficient block when both W and H of the target block to be transformed are equal to or greater than 8, and the 8×8 region may be a top-left 8×8 region in the transform coefficient block. Similarly, a 4×4 lfnst and a 4×4 RST refer to transforms applicable to a 4×4 region included in the transform coefficient block when W and H of the target block to are equal to or greater than 4, and the 4×4 region may be a top-left 4×4 region in the transform coefficient block.

According to an embodiment of the present disclosure, for a transform in an encoding process, only 48 pieces of data may be selected and a maximum 16×48 transform kernel matrix may be applied thereto, rather than applying a 16×64 transform kernel matrix to 64 pieces of data forming an 8×8 region. Here, "maximum" means that m has a maximum value of 16 in an m×48 transform kernel matrix for generating m coefficients. That is, when an RST is performed by applying an m×48 transform kernel matrix (m≤16) to an 8×8 region, 48 pieces of data are input and m coefficients are generated. When m is 16, 48 pieces of data are input and 16 coefficients are generated. That is, assuming that 48 pieces of data form a 48×1 vector, a 16×48 matrix and a 48×1 vector are sequentially multiplied, thereby generating a 16×1 vector. Here, the 48 pieces of data forming the 8×8 region may be properly arranged, thereby forming the 48×1 vector. For example, a 48×1 vector may be constructed based on 48 pieces of data constituting a region excluding the bottom right 4×4 region among the 8×8 regions. Here, when a matrix operation is performed by applying a maximum 16×48 transform kernel matrix, 16 modified transform coefficients are generated, and the 16 modified transform coefficients may be arranged in a top-left 4×4 region according to a scanning order, and a top-right 4×4 region and a bottom-left 4×4 region may be filled with zeros.

For an inverse transform in a decoding process, the transposed matrix of the foregoing transform kernel matrix may be used. That is, when an inverse RST or LFNST is performed in the inverse transform process performed by the decoding apparatus, input coefficient data to which the inverse RST is applied is configured in a one-dimensional vector according to a predetermined arrangement order, and a modified coefficient vector obtained by multiplying the one-dimensional vector and a corresponding inverse RST matrix on the left of the one-dimensional vector may be arranged in a two-dimensional block according to a predetermined arrangement order.

In summary, in the transform process, when an RST or LFNST is applied to an 8×8 region, a matrix operation of 48 transform coefficients in top-left, top-right, and bottom-left regions of the 8×8 region excluding the bottom-right region among transform coefficients in the 8×8 region and a 16×48 transform kernel matrix. For the matrix operation, the 48 transform coefficients are input in a one-dimensional array. When the matrix operation is performed, 16 modified transform coefficients are derived, and the modified transform coefficients may be arranged in the top-left region of the 8×8 region.

On the contrary, in the inverse transform process, when an inverse RST or LFNST is applied to an 8×8 region, 16 transform coefficients corresponding to a top-left region of the 8×8 region among transform coefficients in the 8×8 region may be input in a one-dimensional array according to a scanning order and may be subjected to a matrix operation with a 48×16 transform kernel matrix. That is, the matrix operation may be expressed as (48×16 matrix)*(16×1 transform coefficient vector)=(48×1 modified transform coefficient vector). Here, an n×1 vector may be interpreted to have the same meaning as an n×1 matrix and may thus be expressed as an n×1 column vector. Further, * denotes matrix multiplication. When the matrix operation is performed, 48 modified transform coefficients may be derived, and the 48 modified transform coefficients may be arranged in top-left, top-right, and bottom-left regions of the 8×8 region excluding a bottom-right region.

When a secondary inverse transform is based on an RST, the inverse transformer 135 of the encoding apparatus 100 and the inverse transformer 222 of the decoding apparatus 200 may include an inverse reduced secondary transformer to derive modified transform coefficients based on an inverse RST on transform coefficients and an inverse primary transformer to derive residual samples for the target block based on an inverse primary transform for the modified transform coefficients. The inverse primary transform refers to the inverse transform of a primary transform applied to a residual. In the present disclosure, deriving a transform coefficient based on a transform may refer to deriving the transform coefficient by applying the transform.

The above-described non-separated transform, the LFNST, will be described in detail as follows. The LFNST may include a forward transform by the encoding apparatus and an inverse transform by the decoding apparatus.

The encoding apparatus receives a result (or a part of a result) derived after applying a primary (core) transform as an input, and applies a forward secondary transform (secondary transform).

$$y = G^T x \qquad \text{[Equation 9]}$$

In Equation 9, x and y are inputs and outputs of the secondary transform, respectively, and G is a matrix representing the secondary transform, and transform basis vectors are composed of column vectors. In the case of an inverse LFNST, when the dimension of the transformation matrix G is expressed as [number of rows x number of columns], in the case of an forward LFNST, the transposition of matrix G becomes the dimension of GT.

For the inverse LFNST, the dimensions of matrix G are [48×16], [48×8], [16×16], [16×8], and the [48×8] matrix and the [16×8] matrix are partial matrices that sampled 8 transform basis vectors from the left of the [48×16] matrix and the [16×16] matrix, respectively.

On the other hand, for the forward LFNST, the dimensions of matrix GT are [16×48], [8×48], [16×16], [8×16], and the [8×48] matrix and the [8×16] matrix are partial matrices obtained by sampling 8 transform basis vectors from the top of the [16×48] matrix and the [16×16] matrix, respectively.

Therefore, in the case of the forward LFNST, a [48×1] vector or [16×1] vector is possible as an input x, and a [16×1] vector or a [8×1] vector is possible as an output y. In video coding and decoding, the output of the forward primary transform is two-dimensional (2D) data, so to construct the [48×1] vector or the [16×1] vector as the input x, a one-dimensional vector must be constructed by properly arranging the 2D data that is the output of the forward transformation.

FIG. 6 is a diagram illustrating a sequence of arranging output data of a forward primary transformation into a one-dimensional vector according to an example. The left diagrams of (a) and (b) of FIG. 6 show the sequence for constructing a [48×1] vector, and the right diagrams of (a) and (b) of FIG. 6 shows the sequence for constructing a [16×1] vector. In the case of the LFNST, a one-dimensional vector x can be obtained by sequentially arranging 2D data in the same order as in (a) and (b) of FIG. 6.

The arrangement direction of the output data of the forward primary transform may be determined according to an intra prediction mode of the current block. For example, when the intra prediction mode of the current block is in the horizontal direction with respect to the diagonal direction, the output data of the forward primary transform may be arranged in the order of (a) of FIG. 6, and when the intra prediction mode of the current block is in the vertical direction with respect to the diagonal direction, the output data of the forward primary transform may be arranged in the order of (b) of FIG. 6.

According to an example, an arrangement order different from the arrangement orders of (a) and (b) FIG. 6 may be applied, and in order to derive the same result (y vector) as when the arrangement orders of (a) and (b) FIG. 6 is applied, the column vectors of the matrix G may be rearranged according to the arrangement order. That is, it is possible to rearrange the column vectors of G so that each element constituting the x vector is always multiplied by the same transform basis vector.

Since the output y derived through Equation 9 is a one-dimensional vector, when two-dimensional data is required as input data in the process of using the result of the forward secondary transformation as an input, for example, in the process of performing quantization or residual coding, the output y vector of Equation 9 must be properly arranged as 2D data again.

Figure 7:
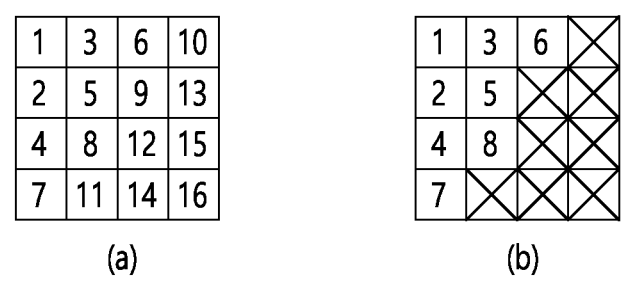

FIG. 7 is a diagram illustrating a sequence of arranging output data of a forward secondary transform into a two-dimensional block according to an example.

In the case of the LFNST, output values may be arranged in a 2D block according to a predetermined scan order. (a) of FIG. 7 shows that when the output y is a [16×1] vector, the output values are arranged at 16 positions of the 2D block according to a diagonal scan order. (b) of FIG. 7 shows that when the output y is a [8×1] vector, the output values are arranged at 8 positions of the 2D block according to the diagonal scan order, and the remaining 8 positions are filled with zeros. X in (b) of FIG. 7 indicates that it is filled with zero.

Figure 8:
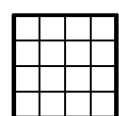
FIG. 8 is a diagram illustrating a block shape to which LFNST is applied.
Figure 8:
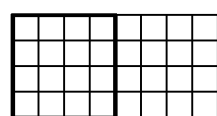
Figure 8:
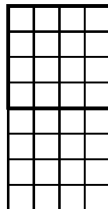
Figure 8:
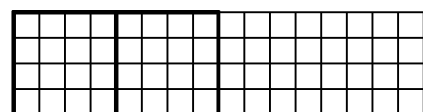
Figure 8:
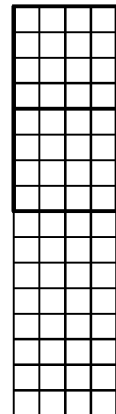
Figure 8:
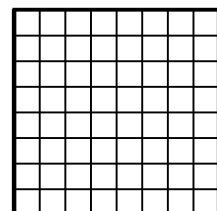
Figure 8:
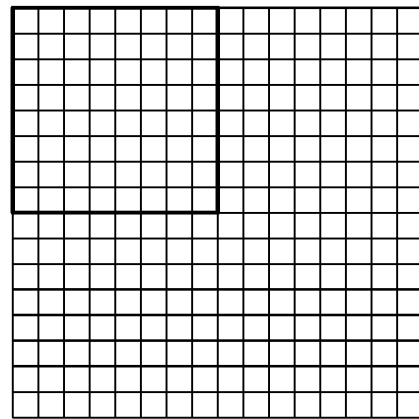

According to another example, since the order in which the output vector y is processed in performing quantization or residual coding may be preset, the output vector y may not be arranged in the 2D block as shown in FIG. 8. However, in the case of the residual coding, data coding may be performed in 2D block (e.g., 4×4) units such as CG (Coefficient Group), and in this case, the data are arranged according to a specific order as in the diagonal scan order of FIG. 7.

Meanwhile, the decoding apparatus may configure the one-dimensional input vector y by arranging two-dimensional data output through a dequantization process or the like according to a preset scan order for the inverse transformation. The input vector y may be output as the output vector x by the following equation.

$$x = Gy \qquad \text{[Equation 10]}$$

In the case of the inverse LFNST, an output vector x can be derived by multiplying an input vector y, which is a [16×1] vector or a [8×1] vector, by a G matrix. For the inverse LFNST, the output vector x can be either a [48×1] vector or a [16×1] vector.

The output vector x is arranged in a two-dimensional block according to the order shown in FIG. 6 and is arranged as two-dimensional data, and this two-dimensional data becomes input data (or a part of input data) of the inverse primary transformation.

Accordingly, the inverse secondary transformation is the opposite of the forward secondary transformation process as a whole, and in the case of the inverse transformation, unlike in the forward direction, the inverse secondary transformation is first applied, and then the inverse primary transformation is applied.

In the inverse LFNST, one of 8 [48×16] matrices and 8 [16×16] matrices may be selected as the transformation matrix G. Whether to apply the [48×16] matrix or the [16×16] matrix depends on the size and shape of the block.

In addition, 8 matrices may be derived from four transform sets as shown in Table 2 above, and each transform set may consist of two matrices. Which transform set to use among the 4 transform sets is determined according to the intra prediction mode, and more specifically, the transform set is determined based on the value of the intra prediction mode extended by considering the Wide Angle Intra Prediction (WAIP). Which matrix to select from among the two matrices constituting the selected transform set is derived through index signaling. More specifically, 0, 1, and 2 are possible as the transmitted index value, 0 may indicate that the LFNST is not applied, and 1 and 2 may indicate any one of two transform matrices constituting a transform set selected based on the intra prediction mode value.

Meanwhile, as described above, which transform matrix of the [48×16] matrix and the [16×16] matrix is applied to the LFNST is determined by the size and shape of the transform target block.

FIG. 8 is a diagram illustrating a block shape to which the LFNST is applied. (a) of FIG. 8 shows 4×4 blocks, (b) shows 4×8 and 8×4 blocks, (c) shows 4×N or N×4 blocks in which N is 16 or more, (d) shows 8×8 blocks, (e) shows M×N blocks where M≥8, N≥8, and N>8 or M>8.

In FIG. 8, blocks with thick borders indicate regions to which the LFNST is applied. For the blocks of (a) and (b) of FIG. 8, the LFNST is applied to the top-left 4×4 region, and for the block of (c) of FIG. 8, the LFNST is applied individually the two top-left 4×4 regions are continuously arranged. In (a), (b), and (c) of FIG. 8, since the LFNST is applied in units of 4×4 regions, this LFNST will be hereinafter referred to as "4×4 LFNST". Based on the matrix dimension for G, a [16×16] or [16×8] matrix may be applied.

More specifically, the [16×8] matrix is applied to the 4×4 block (4×4 TU or 4×4 CU) of (a) of FIG. 8 and the [16×16] matrix is applied to the blocks in (b) and (c) of FIG. 8. This is to adjust the computational complexity for the worst case to 8 multiplications per sample.

With respect to (d) and (e) of FIG. 8, the LFNST is applied to the top-left 8×8 region, and this LFNST is hereinafter referred to as "8×8 LFNST". As a corresponding transformation matrix, a [48×16] matrix or [48×8] matrix may be applied. In the case of the forward LFNST, since the [48×1] vector (x vector in Equation 9) is input as input data, all sample values of the top-left 8×8 region are not used as input values of the forward LFNST. That is, as can be seen in the left order of (a) of FIG. 6 or the left order of (b) of FIG. 6, the [48×1] vector may be constructed based on samples belonging to the remaining 3 4×4 blocks while leaving the bottom-right 4×4 block as it is.

The [48×8] matrix may be applied to an 8×8 block (8×8 TU or 8×8 CU) in (d) of FIG. 8, and the [48×16] matrix may be applied to the 8×8 block in (c) of FIG. 8. This is also to adjust the computational complexity for the worst case to 8 multiplications per sample.

Depending on the block shape, when the corresponding forward LFNST (4×4 LFNST or 8×8 LFNST) is applied, 8 or 16 output data (y vector in Equation 9, [8×1] or [16×1] vector) is generated. In the forward LFNST, the number of output data is equal to or less than the number of input data due to the characteristics of the matrix G$^T$.

Figure 9:
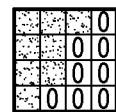
FIG. 9 is a diagram illustrating a disposition of output data of a forward LFNST according to an embodiment.
Figure 9:
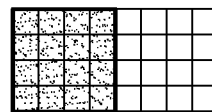
Figure 9:
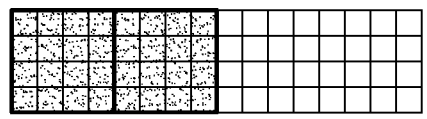
Figure 9:
Figure 9:
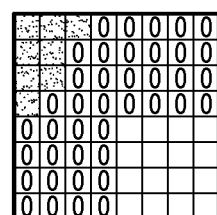
Figure 9:
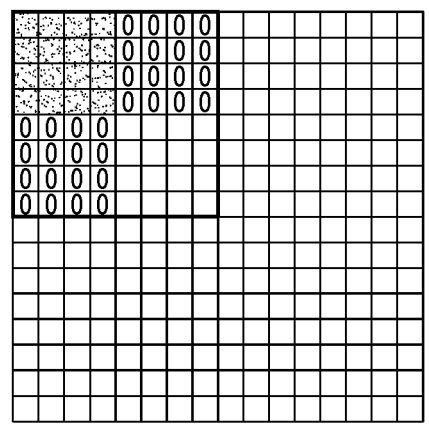

FIG. 9 is a diagram illustrating an arrangement of output data of a forward LFNST according to an example, and shows a block in which output data of the forward LFNST is arranged according to a block shape.

The shaded area at the top-left of the block shown in FIG. 9 corresponds to the area where the output data of the forward LFNST is located, the positions marked with 0 indicate samples filled with a value of 0, and the remaining area represents regions that are not changed by the forward LFNST. In the area not changed by the LFNST, the output data of the forward primary transform remains unchanged.

As described above, since the dimension of the transform matrix applied varies according to the shape of the block, the number of output data also varies. As FIG. 9, the output data of the forward LFNST may not completely fill the top-left 4×4 block. In the case of (a) and (d) of FIG. 9, a [16×8] matrix and a [48×8] matrix are applied to the block indicated by a thick line or a partial region inside the block, respectively, and a [8×1] vector as the output of the forward LFNST is generated. That is, according to the scan order shown in (b) of FIG. 7, only 8 output data may be filled as shown in (a) and (d) of FIG. 9, and 0 may be filled in the remaining 8 positions. In the case of the LFNST applied block of (d) of FIG. 8, as shown in (d) of FIG. 9, two 4×4 blocks in the top-right and bottom-left adjacent to the top-left 4×4 block are also filled with a value of 0.

As described above, basically, by signaling the LFNST index, whether to apply the LFNST and the transform matrix to be applied are specified. As shown FIG. 9, when the LFNST is applied, since the number of output data of the forward LFNST may be equal to or less than the number of input data, a region filled with a zero value occurs as follows.

1) As shown in (a) of FIG. 9, samples from the 8th and later positions in the scan order in the top-left 4×4 block, that is, samples from the 9th to the 16th.
2) As shown in (d) and (c) of FIG. 9, when the [48×16] matrix or the [48×8] matrix is applied, two 4×4 blocks adjacent to the top-left 4×4 block or the second and third 4×4 blocks in the scan order.

Therefore, if non-zero data exists by checking the areas 1) and 2), it is certain that the LFNST is not applied, so that the signaling of the corresponding LFNST index can be omitted.

According to an example, for example, in the case of LFNST adopted in the VVC standard, since signaling of the LFNST index is performed after the residual coding, the encoding apparatus may know whether there is the non-zero data (significant coefficients) for all positions within the TU or CU block through the residual coding. Accordingly, the encoding apparatus may determine whether to perform signaling on the LFNST index based on the existence of the non-zero data, and the decoding apparatus may determine whether the LFNST index is parsed. When the non-zero data does not exist in the area designated in 1) and 2) above, signaling of the LFNST index is performed.

Since a truncated unary code is applied as a binarization method for the LFNST index, the LFNST index consists of up to two bins, and 0, 10, and 11 are assigned as binary codes for possible LFNST index values of 0, 1, and 2, respectively. In the case of the LFNST currently adopted for VVC, a context-based CABAC coding is applied to the first bin (regular coding), and a bypass coding is applied to the second bin. The total number of contexts for the first bin is 2, when (DCT-2, DCT-2) is applied as a primary transform pair for the horizontal and vertical directions, and a luma component and a chroma component are coded in a dual tree type, one context is allocated and another context applies for the remaining cases. The coding of the LFNST index is shown in a table as follows.

TABLE 3

| | binIdx | | | | | |
|---|---|---|---|---|---|---|
| Syntax element | 0 | 1 | 2 | 3 | 4 | >=5 |
| lfnst_idx[ ][ ] | ( tu_mts_idx[ x0 ][ y0 ] = = 0 && treeType != SINGLE_TREE ) ? 1 : 0 | bypass | na | na | na | na |

Meanwhile, for the adopted LFNST, the following simplification methods may be applied.

(i) According to an example, the number of output data for the forward LFNST may be limited to a maximum of 16.

In the case of (c) of FIG. 8, the 4×4 LFNST may be applied to two 4×4 regions adjacent to the top-left, respectively, and in this case, a maximum of 32 LFNST output data may be generated. when the number of output data for forward LFNST is limited to a maximum of 16, in the case of 4×N/N×4 (N>16) blocks (TU or CU), the 4×4 LFNST is only applied to one 4×4 region in the top-left, the LFNST may be applied only once to all blocks of FIG. 8. Through this, the implementation of image coding may be simplified.

Figure 10:
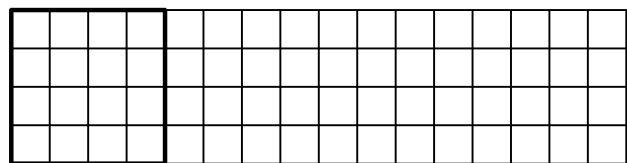
FIG. 10 is a diagram illustrating that the number of output data for a forward LFNST is limited to a maximum of 16 according to an example.
Figure 10:
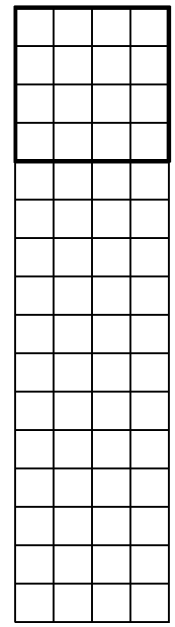

FIG. 10 shows that the number of output data for the forward LFNST is limited to a maximum of 16 according to an example. As FIG. 10, when the LFNST is applied to the most top-left 4×4 region in a 4×N or N×4 block in which N is 16 or more, the output data of the forward LFNST becomes 16 pieces.

(ii) According to an example, zero-out may be additionally applied to a region to which the LFNST is not applied. In this document, the zero-out may mean filling values of all positions belonging to a specific region with a value of 0. That is, the zero-out can be applied to a region that is not changed due to the LFNST and maintains the result of the forward primary transformation. As described above, since the LFNST is divided into the 4×4 LFNST and the 8×8 LFNST, the zero-out can be divided into two types ((ii)-(A) and (ii)-(B)) as follows.

Figure 11:
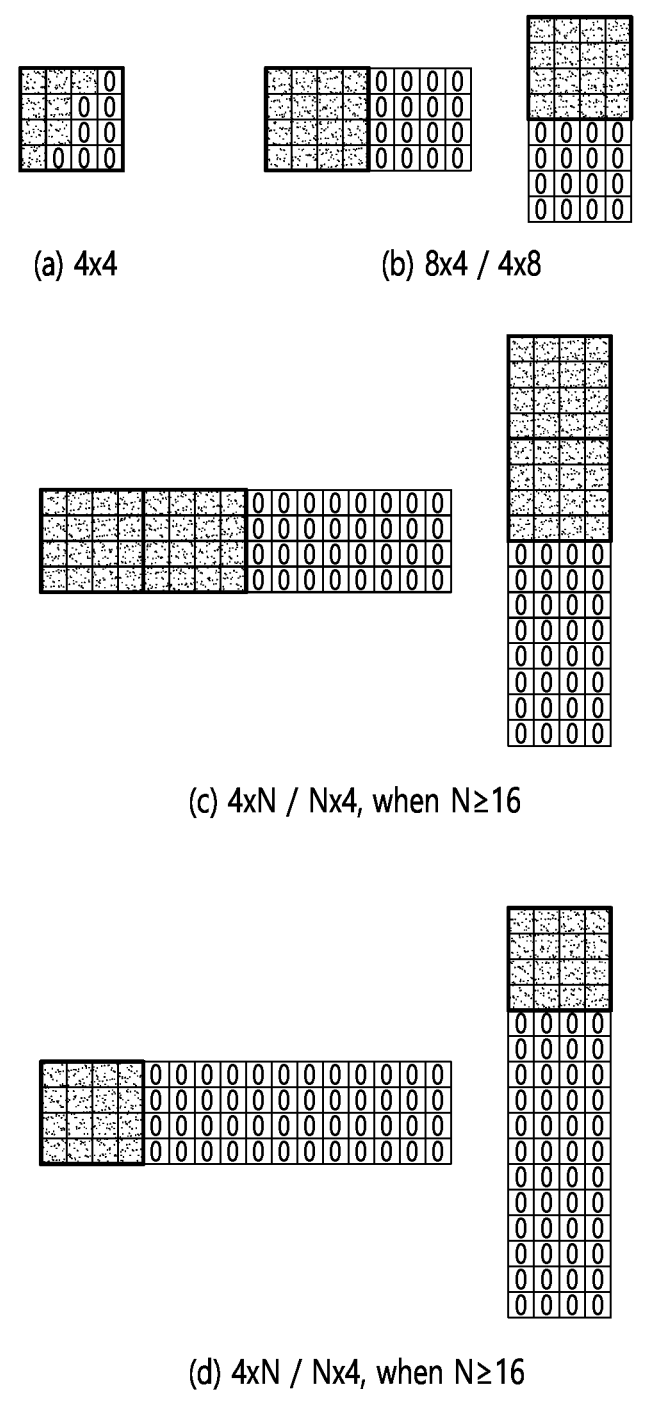

(ii)-(A) When the 4×4 LFNST is applied, a region to which the 4×4 LFNST is not applied may be zeroed out. FIG. 11 is a diagram illustrating the zero-out in a block to which the 4×4 LFNST is applied according to an example.

As shown in FIG. 11, with respect to a block to which the 4×4 LFNST is applied, that is, for all of the blocks in (a), (b) and (c) of FIG. 9, the whole region to which the LFNST is not applied may be filled with zeros.

On the other hand, (d) of FIG. 11 shows that when the maximum value of the number of the output data of the forward LFNST is limited to 16 as shown in FIG. 10, the zero-out is performed on the remaining blocks to which the 4×4 LFNST is not applied.

Figure 12:
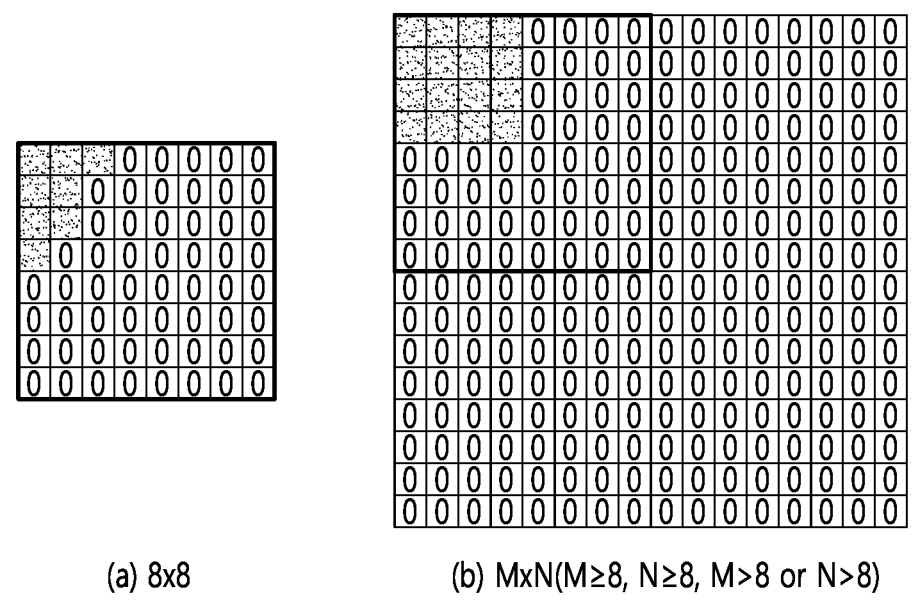

(ii)-(B) When the 8×8 LFNST is applied, a region to which the 8×8 LFNST is not applied may be zeroed out. FIG. 12 is a diagram illustrating the zero-out in a block to which the 8×8 LFNST is applied according to an example.

As shown in FIG. 12, with respect to a block to which the 8×8 LFNST is applied, that is, for all of the blocks in (d) and (c) of FIG. 9, the whole region to which the LFNST is not applied may be filled with zeros.

(iii) Due to the zero-out presented in (ii) above, the area filled with zeros may be not same when the LFNST is applied. Accordingly, it is possible to check whether the non-zero data exists according to the zero-out proposed in (ii) over a wider area than the case of the LFNST of FIG. 9.

For example, when (ii)-(B) is applied, after checking whether the non-zero data exists where the area filled with zero values in (d) and (c) of FIG. 9 in addition to the area filled with 0 additionally in FIG. 12, signaling for the LFNST index can be performed only when the non-zero data does not exist.

Of course, even if the zero-out proposed in (ii) is applied, it is possible to check whether the non-zero data exists in the same way as the existing LFNST index signaling. That is, after checking whether the non-zero data exists in the block filled with zeros in FIG. 9, the LFNST index signaling may be applied. In this case, the encoding apparatus only performs the zero out and the decoding apparatus does not assume the zero out, that is, checking only whether the non-zero data exists only in the area explicitly marked as 0 in FIG. 9, may perform the LFNST index parsing.

Figure 13:
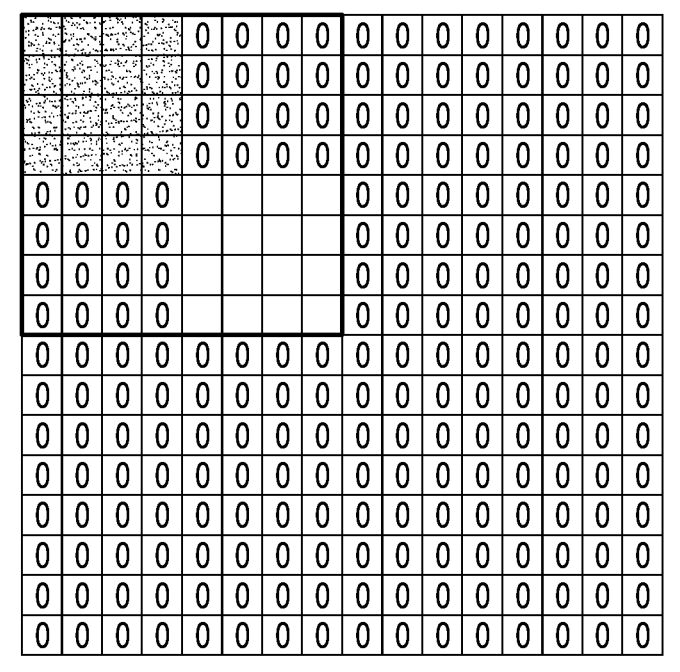

Alternatively, according to another example, the zero-out may be performed as shown in FIG. 13. FIG. 13 is a diagram illustrating the zero-out in a block to which the 8×8 LFNST is applied according to another example.

As shown in FIGS. 11 and 12, the zero-out may be applied to all regions other than the region to which the LFNST is applied, or the zero-out may be applied only to a partial region as shown in FIG. 13. The zero-out is applied only to regions other than the top-left 8×8 region of FIG. 13, the zero-out may not be applied to the bottom-right 4×4 block within the top-left 8×8 region.

Various embodiments in which combinations of the simplification methods ((i), (ii)-(A), (ii)-(B), (iii)) for the LFNST are applied may be derived. Of course, the combinations of the above simplification methods are not limited to the following an embodiment, and any combination may be applied to the LFNST.

EMBODIMENT

Limit the number of output data for forward LFNST to a maximum of 16→(i)

When the 4×4 LFNST is applied, all areas to which the 4×4 LFNST is not applied are zero-out→(ii)-(A)

When the 8×8 LFNST is applied, all areas to which the 8×8 LFNST is not applied are zero-out→(ii)-(B)

After checking whether the non-zero data exists also the existing area filled with zero value and the area filled with zeros due to additional zero outs ((ii)-(A), (ii)-(B)), the LFNST index is signaled only when the non-zero data does not exist→(iii)

In the case of the Embodiment, when the LFNST is applied, an area in which the non-zero output data can exist is limited to the inside of the top-left 4×4 area. In more detail, in the case of (a) of FIG. 11 and (a) of FIG. 12, the 8th position in the scan order is the last position where non-zero data can exist. In the case of (b) and (c) of FIG. 11 and (b) of FIG. 12, the 16th position in the scan order (i.e., the position of the bottom-right edge of the top-left 4×4 block) is the last position where data other than 0 may exist.

Therefore, when the LFNST is applied, after checking whether the non-zero data exists in a position where the residual coding process is not allowed (at a position beyond the last position), it can be determined whether the LFNST index is signaled.

In the case of the zero-out method proposed in (ii), since the number of data finally generated when both the primary transform and the LFNST are applied, the amount of computation required to perform the entire transformation process can be reduced. That is, when the LFNST is applied, since zero-out is applied to the forward primary transform output data existing in a region to which the LFNST is not applied, there is no need to generate data for the region that become zero-out during performing the forward primary transform. Accordingly, it is possible to reduce the amount of computation required to generate the corresponding data. The additional effects of the zero-out method proposed in (ii) are summarized as follows.

First, as described above, the amount of computation required to perform the entire transform process is reduced.

In particular, when (ii)-(B) is applied, the amount of calculation for the worst case is reduced, so that the transform process can be lightened. In other words, in general, a large amount of computation is required to perform a large-size primary transformation. By applying (ii)-(B), the number of data derived as a result of performing the forward LFNST can be reduced to 16 or less. In addition, as the size of the entire block (TU or CU) increases, the effect of reducing the amount of transform operation is further increased.

Second, the amount of computation required for the entire transform process can be reduced, thereby reducing the power consumption required to perform the transform.

Third, the latency involved in the transform process is reduced.

The secondary transformation such as the LFNST adds a computational amount to the existing primary transformation, thus increasing the overall delay time involved in performing the transformation. In particular, in the case of intra prediction, since reconstructed data of neighboring blocks is used in the prediction process, during encoding, an increase in latency due to a secondary transformation leads to an increase in latency until reconstruction. This can lead to an increase in overall latency of intra prediction encoding.

However, if the zero-out suggested in (ii) is applied, the delay time of performing the primary transform can be greatly reduced when LFNST is applied, the delay time for the entire transform is maintained or reduced, so that the encoding apparatus can be implemented more simply.

In the conventional intra prediction, a block to be currently encoded is regarded as one encoding unit and encoding was performed without splitting. However, intra sub-partitions (ISP) coding means performing intra prediction encoding by dividing a block to be currently encoded in a horizontal direction or a vertical direction. In this case, a reconstructed block may be generated by performing encoding/decoding in units of divided blocks, and the reconstructed block may be used as a reference block of the next divided block. According to an embodiment, in ISP coding, one coding block may be divided into two or four sub-blocks and coded, and in ISP, in one sub-block, intra prediction is performed with reference to a reconstructed pixel value of a sub-block located at the adjacent left side or adjacent upper side. Hereinafter, "coding" may be used as a concept including both coding performed by an encoding apparatus and decoding performed by a decoding apparatus.

Table 4 represents the number of sub-blocks divided according to block sizes when ISP is applied, and sub-partitions divided according to ISP may be referred to as transform blocks (TUs).

TABLE 4

| Block size (CU) | Number of divisions |
|---|---|
| 4×4 | Not available |
| 4×8, 8×4 | 2 |
| All other cases | 4 |

The ISP is to divide a block predicted as luma intra into two or four sub-partitions in a vertical direction or a horizontal direction according to the size of the block. For example, the minimum block size to which the ISP can be applied is 4×8 or 8×4. When the block size is greater than 4×8 or 8×4, the block is divided into 4 sub-partitions.

Figure 14:
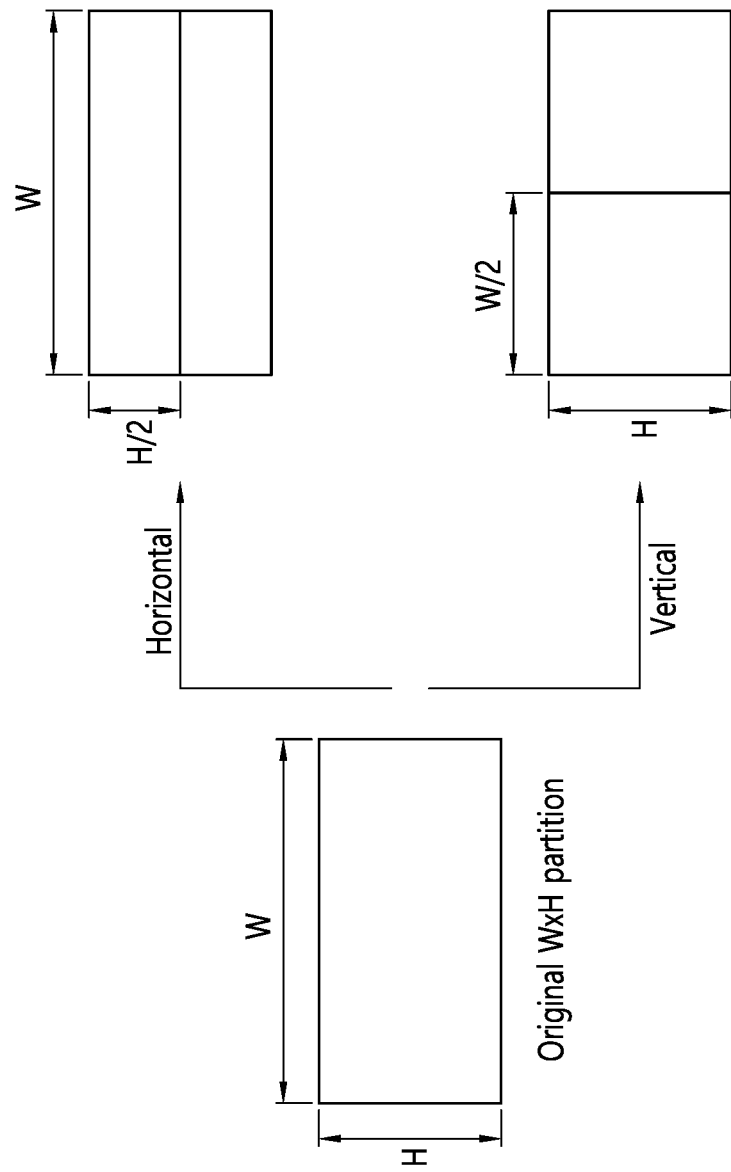
FIG. 14 is a diagram illustrating an example of a sub-block into which one coding block is divided.
Figure 15:
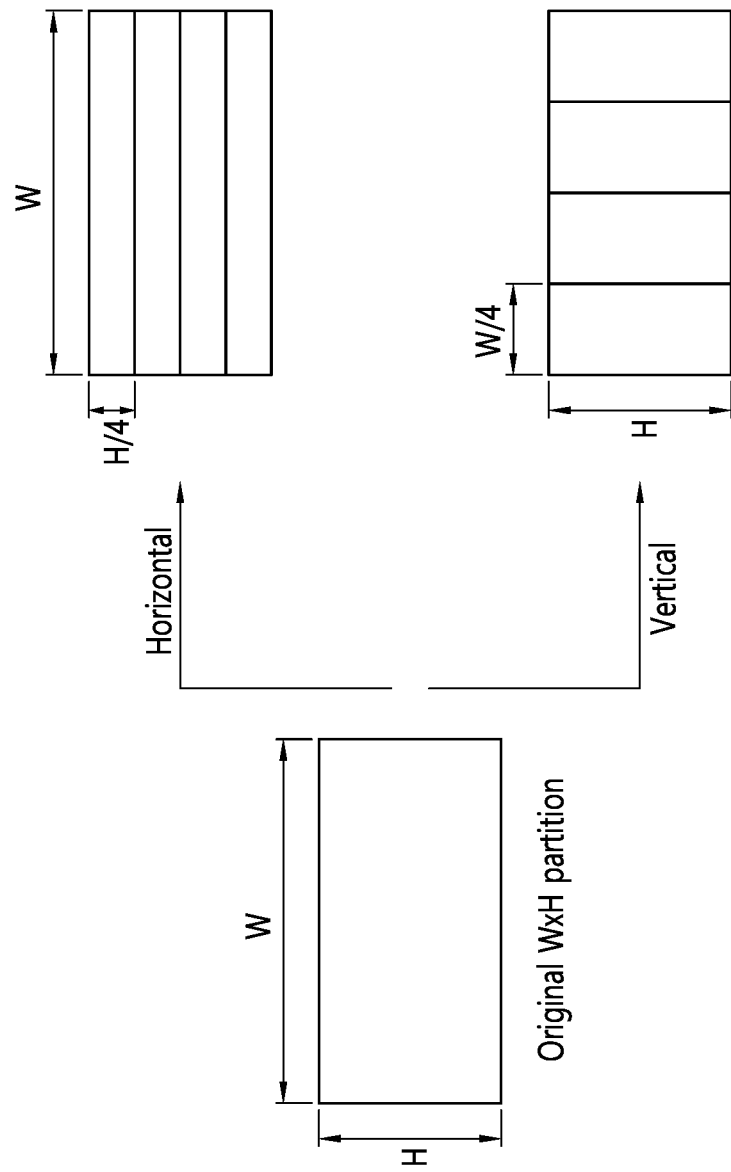
FIG. 15 is a diagram illustrating another example of a sub-block into which one coding block is divided.

FIGS. 14 and 15 illustrate an example of a sub-block into which one coding block is divided, and more specifically, FIG. 14 illustrates an example of division of a case in which a coding block (width (W) X height (H)) is 4×8 blocks or 8×4 blocks, and FIG. 15 illustrates an example of division of a case in which a coding block is not 4×8 blocks, 8×4 blocks, or 4×4 blocks.

When ISP is applied, sub-blocks are sequentially coded, for example, horizontally or vertically, from left to right or from top to bottom according to a division type, and after a reconstruction process is performed via inverse transform and intra prediction for one sub-block, coding for the next sub-block may be performed. For the leftmost or uppermost subblock, a reconstructed pixel of the already coded coding block is referred to, as in a conventional intra prediction method. Further, when each side of a subsequent internal sub-block is not adjacent to a previous sub-block, in order to derive reference pixels adjacent to the corresponding side, reconstructed pixels of an already coded adjacent coding block are referred to, as in a conventional intra prediction method.

In the ISP coding mode, all sub-blocks may be coded with the same intra prediction mode, and a flag indicating whether to use ISP coding and a flag indicating whether to divide (horizontally or vertically) in which direction may be signaled. As illustrated in FIGS. 14 and 15, the number of sub-blocks may be adjusted to 2 or 4 according to a block shape, and when the size (width×height) of one sub-block is less than 16, it may be restricted so that division into the corresponding sub-block is not allowed or the ISP coding itself is not applied.

In the case of the ISP prediction mode, one coding unit is divided into two or four partition blocks, that is, sub-blocks and predicted, and the same intra prediction mode is applied to the divided two or four partition blocks.

As described above, in the division direction, the horizontal direction (when an M×N coding unit having horizontal and vertical lengths of M and N, respectively, is divided in the horizontal direction, if the M×N coding unit is divided into two, the M×N coding unit is divided into M×(N/2) blocks, and if the M×N coding unit is divided into four blocks, the M×N coding unit is divided into M×(N/4) blocks) and the vertical direction (when an M×N coding unit is divided in a vertical direction, if the M×N coding unit is divided into two, and the M×N coding unit is divided into (M/2)×N blocks, and if the M×N coding unit is divided into four, the M×N coding unit is divided into (M/4)×N blocks) are both possible. When the M×N coding unit is divided in the horizontal direction, partition blocks are coded in a top-down order, and when the M×N coding unit is divided in the vertical direction, partition blocks are coded in order from left to right. The currently coded partition block may be predicted with reference to the reconstructed pixel values of the upper (left) partition block in the case of horizontal (vertical) direction division.

A transform may be applied to a residual signal generated by the ISP prediction method in units of partition blocks. Multiple transform selection (MTS) technology based on a DST-7/DCT-8 combination as well as the existing DCT-2 may be applied to a primary transform (core transform) based on a forward direction, and a forward low frequency non-separable transform (LFNST) may be applied to transform coefficients generated according to the primary transform to generate a final modified transform coefficient.

That is, an LFNST may be applied to partition blocks divided by applying an ISP prediction mode, and the same intra prediction mode is applied to the divided partition blocks, as described above. Accordingly, when the LFNST set derived based on the intra prediction mode is selected, the derived LFNST set may be applied to all partition blocks. That is, because the same intra prediction mode is applied to all partition blocks, the same LFNST set may be applied to all partition blocks.

According to an embodiment, an LFNST may be applied only to transform blocks having both a horizontal length and a vertical length of 4 or more. Therefore, when the horizontal or vertical length of the divided partition block according to the ISP prediction method is less than 4, the LFNST is not applied and an LFNST index is not signaled. Further, when the LFNST is applied to each partition block, the corresponding partition block may be regarded as one transform block. When the ISP prediction method is not applied, the LFNST may be applied to the coding block.

A method of applying an LFNST to each partition block will be described in detail.

According to an embodiment, after a forward LFNST is applied to individual partition blocks, only maximum 16 (8 or 16) coefficients are left in the top-left 4×4 region in transform coefficient scanning order, and then zero out in which the remaining positions and regions are all filled with a value of 0 may be applied.

Alternatively, according to an embodiment, when a length of one side of the partition block is 4, the LFNST is applied only to the top-left 4×4 region, and when a length of all sides of the partition block, that is, the width and height is 8 or more, the LFNST may be applied to the remaining 48 coefficients, except for a bottom-right 4×4 region inside a top-left 8×8 region.

Alternatively, according to an embodiment, in order to adjust computational complexity of the worst case to 8 multiplications per sample, when each partition block is 4×4 or 8×8, only 8 transform coefficients may be output after applying the forward LFNST. That is, when the partition block is 4×4, an 8×16 matrix may be applied as a transform matrix, and when the partition block is 8×8, an 8×48 matrix may be applied as a transform matrix.

In the current VVC standard, LFNST index signaling is performed in units of coding units. Therefore, in the ISP prediction mode and when an LFNST is applied to all partition blocks, the same LFNST index value may be applied to the corresponding partition blocks. That is, when the LFNST index value is transmitted once at a coding unit level, the corresponding LFNST index may be applied to all partition blocks in the coding unit. As described above, the LFNST index value may have values of 0, 1, and 2, where 0 represents a case in which an LFNST is not applied, and 1 and 2 indicate two transform matrices existing in one LFNST set when an LFNST is applied.

As described above, the LFNST set is determined by the intra prediction mode, and in the case of the ISP prediction mode, because all partition blocks in the coding unit are predicted in the same intra prediction mode, the partition blocks may refer to the same LFNST set.

As another example, LFNST index signaling is still performed in units of a coding unit, but in the case of the ISP prediction mode, whether to uniformly apply an LFNST to all partition blocks is not determined, and for each partition block, whether to apply the LFNST index value signaled at a coding unit level or whether not to apply the LFNST may be determined through a separate condition. Here, a separate condition may be signaled in the form of a flag for each partition block through a bitstream, and when a flag value is 1, an LFNST index value signaled at the coding unit level is applied, and when a flag value is 0, the LFNST may not be applied.

In a coding unit to which the ISP mode is applied, an example of applying an LFNST when a length of one side of the partition block is less than 4 is described as follows.

First, when the size of the partition block is N×2 (2×N), an LFNST may be applied to the top-left M×2 (2×M) region (where M≤N). For example, when M=8, the top-left region becomes 8×2 (2×8) and thus a region in which 16 residual signals exist may be an input of a forward LFNST, and an R×16 (R≤16) forward transform matrix may be applied.

Here, the forward LFNST matrix may be a separate additional matrix other than the matrix included in the current VVC standard. Further, for complexity control of the worst case, an 8×16 matrix in which only upper 8 row vectors of a 16×16 matrix are sampled may be used for transformation. The complexity control method will be described in detail later.

Second, when the size of the partition block is N×1 (1×N), an LFNST may be applied to a top-left M×1 (1×M) region (where M≤N). For example, when M=16, the top-left region becomes 16×1 (1×16) and thus a region in which 16 residual signals exist may be an input of the forward LFNST, and an R×16 (R≤16) forward transform matrix may be applied.

Here, the corresponding forward LFNST matrix may be a separate additional matrix other than the matrix included in the current VVC standard. Further, for complexity control of the worst case, an 8×16 matrix in which only the upper 8 row vectors of the 16×16 matrix are sampled may be used for transformation. The complexity control method will be described in detail later.

The first embodiment and the second embodiment may be applied simultaneously, or either one of the two embodiments may be applied. In particular, in the case of the second embodiment, because a primary transform is considered in an LFNST, it was observed through experiments that compression performance improvement that could be obtained in the existing LFNST is relatively small compared to an LFNST index signaling cost. However, in the case of the first embodiment, compression performance improvement similar to that which could be obtained from the conventional LFNST was observed. That is, in the case of ISP, it may be checked through experiments that the application of LFNST for 2×N and N×2 contributes to an actual compression performance.

In an LFNST in the current VVC, symmetry between intra prediction modes is applied. The same LFNST set is applied to two directional modes disposed around a mode 34 (prediction in a 45 degree diagonal direction to the bottom-right), for example, the same LFNST set is applied to a mode 18 (horizontal direction prediction mode) and a mode 50 (vertical direction prediction mode). However, in modes 35 to 66, when a forward LFNST is applied, input data is transposed and then an LFNST is applied.

VVC supports a wide angle intra prediction (WAIP) mode, and an LFNST set is derived based on the modified intra prediction mode in consideration of the WAIP mode. For modes extended by WAIP, the LFNST set is determined by using symmetry, as in the general intra prediction direction mode. For example, because a mode −1 is symmetric with a mode 67, the same LFNST set is applied, and because a mode −14 is symmetric with a mode 80, the same LFNST set is applied. Modes 67 to 80 apply an LFNST transform after transposing input data before applying a forward LFNST.

In the case of the LFNST applied to the top-left M×2 (M×1) block, because the block to which the LFNST is applied is non-square, the symmetry to the LFNST cannot be applied. Therefore, instead of applying the symmetry based on the intra prediction mode, as in the LFNST of Table 2, the symmetry between the M×2 (M×1) block and the 2×M (1×M) block may be applied.

Figure 16:
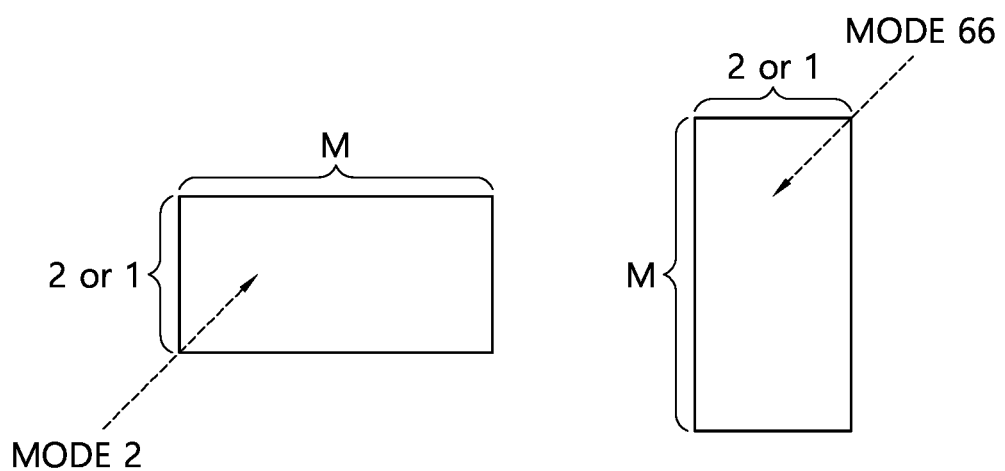
FIG. 16 is a diagram illustrating symmetry between an M×2 (M×1) block and a 2×M (1×M) block according to an embodiment.

FIG. 16 is a diagram illustrating symmetry between M×2 (M×1) blocks and 2×M (1×M) blocks according to an embodiment.

As illustrated in FIG. 16, because it may be regarded that a mode 2 in the M×2 (M×1) block is symmetric with a mode 66 in the 2×M (1×M) block, the same LFNST set may be applied to the 2×M (1×M) block and the M×2 (M×1) block.

In this case, in order to apply the LFNST set applied to the M×2 (M×1) block to the 2×M (1×M) block, the LFNST set is selected based on the mode 2 instead of the mode 66. That is, before applying the forward LFNST, after transposing input data of the 2×M (1×M) block, the LFNST may be applied.

FIG. 17 is a diagram illustrating an example of transposing a 2×M block according to an embodiment.

(a) of FIG. 17 is a diagram illustrating that an LFNST may be applied by reading input data in column-first order for a 2×M block, and (b) of FIG. 17 is a diagram illustrating that an LFNST may be applied by reading input data in row-first order for an M×2 (M×1) block. A method of applying an LFNST to the top-left M×2 (M×1) or 2×M (M×1) block is described as follows.

1. First, as illustrated in (a) and (b) of FIG. 17, input data is arranged to configure an input vector of the forward LFNST. For example, referring to FIG. 16, for an M×2 block predicted in a mode 2, the order in (b) of FIG. 17 is followed, and for a 2×M block predicted in a mode 66, the input data are arranged in order of (a) of FIG. 17 and then the LFNST set for the mode 2 may be applied.

2. For the M×2 (M×1) block, the LFNST set is determined based on a modified intra prediction mode in consideration of WAIP. As described above, a preset mapping relationship is established between the intra prediction mode and the LFNST set, which may be represented by a mapping table as shown in table 2.

For a 2×M (1×M) block, a symmetric mode around a prediction mode (mode 34 in the case of the VVC standard) in a 45 degree diagonal direction downward from the modified intra prediction mode in consideration of WAIP is obtained, and then the LFNST set is determined based on the corresponding symmetric mode and the mapping table. A symmetrical mode (y) around the mode 34 may be derived through the following equation. The mapping table will be described in more detail below.

$$\text{if } 2 \le x \le 66, y = 68 - x, \quad \text{[Equation 11]}$$
$$\text{otherwise } (x \le -1 \text{ or } x \ge 67), y = 66 - x$$

3. When a forward LFNST is applied, transform coefficients may be derived by multiplying input data prepared in a process 1 by an LFNST kernel. An LFNST kernel may be selected from an LFNST set determined in a process 2 and a predetermined LFNST index.

For example, when M=8 and a 16×16 matrix is applied as the LFNST kernel, 16 transform coefficients may be generated by multiplying the matrix by 16 input data. The generated transform coefficients may be arranged in the top-left 8×2 or 2×8 region in scanning order used in the VVC standard.

FIG. 18 illustrates scanning order for 8×2 or 2×8 regions according to an embodiment. All regions other than the top-left 8×2 or 2×8 region may be filled with zero values (zero-out) or the existing transform coefficients to which a primary transform is applied may be maintained as they are. The predetermined LFNST index may be one of the LFNST index values (0, 1, 2) attempted when calculating an RD cost while changing the LFNST index value in an encoding process.

In the case (e.g., 8 multiplications/samples) of a configuration that adjusts computational complexity for the worst case to a certain level or less, for example, after generating only 8 transform coefficients by multiplying an 8×16 matrix that takes only the upper 8 rows of the 16×16 matrix, 8 transform coefficients may be disposed in scanning order of FIG. 18, and zero-out may be applied to the remaining coefficient regions. The complexity control for the worst case will be described later.

4. When applying an inverse LFNST, a preset number (e.g., 16) of transform coefficients are set as input vectors, and the LFNST set obtained from a process 2 and the LFNST kernel (e.g., 16×16 matrix) derived from the parsed LFNST index are selected and then by multiplying the LFNST kernel and the corresponding input vector, the output vector may be derived.

In the case of an M×2 (M×1) block, the output vectors may be disposed in row-first order of (b) of FIG. 17, and in the case of the 2×M (1×M) block, the output vectors may be disposed in column-first order of (a) of FIG. 17.

The remaining regions, except for a region in which the corresponding output vector is disposed within the top-left M×2 (M×1) or 2×M (M×2) region and a region other than the top-left M×2 (M×1) or 2×M (M×2) region in the partition block may be all zero-out with zero values or may be configured to maintain reconstructed transform coefficients as they are through residual coding and inverse quantization processes.

Figure 20:
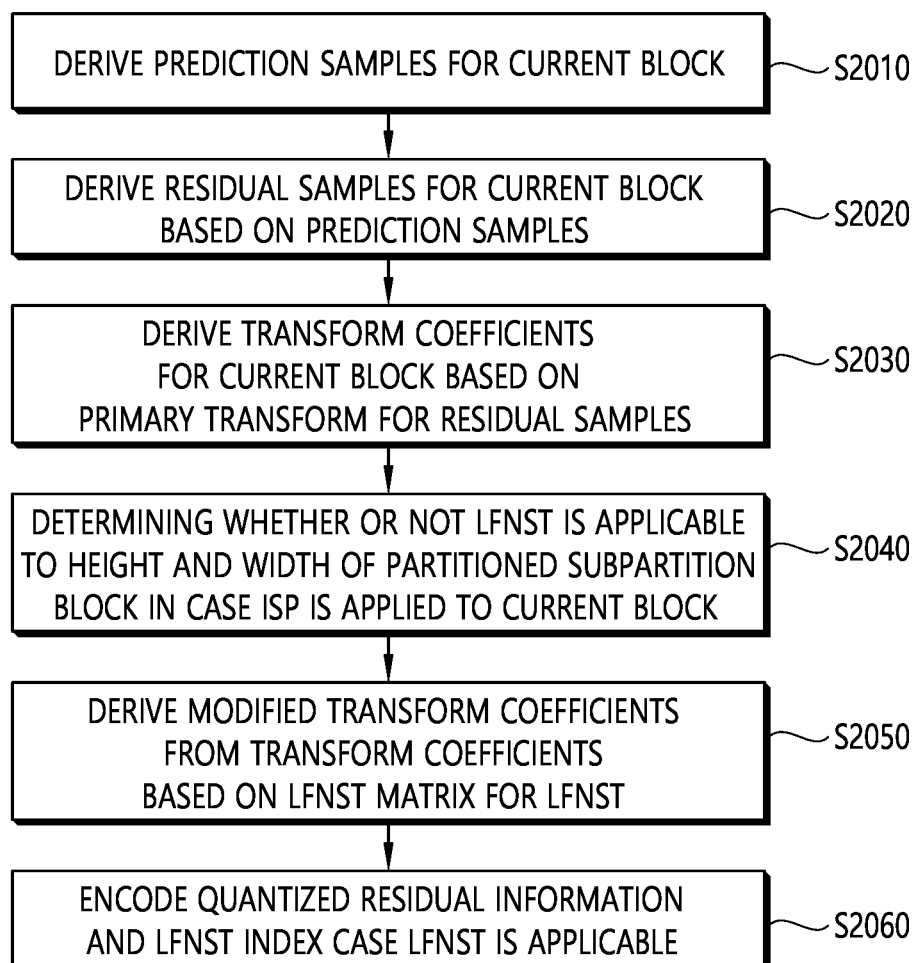
FIG. 20 is a flowchart illustrating a method of encoding an image according to an embodiment.

When configuring the input vector, as in No. 3, input data may be arranged in scanning order of FIG. 20, and in order to control computational complexity for the worst case to a certain level or less, an input vector may be configured by reducing the number of input data (e.g., 8 instead of 16).

For example, when M=8, if 8 input data are used, only the left 16×8 matrix may be taken from the corresponding 16×16 matrix and multiplied to obtain 16 output data. The complexity control for the worst case will be described later.

In the above embodiment, when applying LFNST, a case in which symmetry is applied between an M×2 (M×1) block and a 2×M (1×M) block is presented, but according to another example, different LFNST sets may be applied to each of two block shapes.

Hereinafter, various examples of an LFNST set configuration for the ISP mode and a mapping method using the intra prediction mode will be described.

In the case of an ISP mode, the LFNST set configuration may be different from the existing LFNST set. In other words, kernels different from the existing LFNST kernels may be applied, and a mapping table different from the mapping table between an intra prediction mode index applied to the current VVC standard and the LFNST set may be applied. A mapping table applied to the current VVC standard may be the same as that of Table 2.

In Table 2, a preModeIntra value means an intra prediction mode value changed in consideration of WAIP, and an lfnstTrSetIdx value is an index value indicating a specific LFNST set. Each LFNST set is configured with two LFNST kernels.

When the ISP prediction mode is applied, if both a horizontal length and a vertical length of each partition block are equal to or greater than 4, the same kernels as the LFNST kernels applied in the current VVC standard may be applied, and the mapping table may be applied as it is. A mapping table and LFNST kernels different from the current VVC standard may be applied.

When the ISP prediction mode is applied, when a horizontal length or a vertical length of each partition block is less than 4, a mapping table and LFNST kernels different from those in the current VVC standard may be applied. Hereinafter, Tables 5 to 7 represent mapping tables between an intra prediction mode value (intra prediction mode value changed in consideration of WAIP) and an LFNST set, which may be applied to an M×2 (M×1) block or a 2×M (1×M) block.

TABLE 5

| predModeIntra | lfnstTrSetIdx |
|---|---|
| predModeIntra < 0 | 1 |
| 0 <= predModeIntra <= 1 | 0 |
| 2 <= predModeIntra <= 12 | 1 |
| 13 <= predModeIntra <= 23 | 2 |
| 24 <= predModeIntra <= 34 | 3 |
| 35 <= predModeIntra <= 44 | 4 |
| 45 <= predModeIntra <= 55 | 5 |
| 56 <= predModeIntra <= 66 | 6 |
| 67 <= predModeIntra <= 80 | 6 |
| 81 <= predModeIntra <= 83 | 0 |

TABLE 6

| predModeIntra | lfnstTrSetIds |
|---|---|
| predModeIntra < 0 | 1 |
| 0 <= predModeIntra <= 1 | 0 |
| 2 <= predModeIntra <= 23 | 1 |
| 24 <= predModeIntra <= 44 | 2 |
| 45 <= predModeIntra <= 66 | 3 |
| 67 <= predModeIntra <= 80 | 3 |
| 81 <= predModeIntra <= 83 | 0 |

TABLE 7

| predModeIntra | lfnstTrSetIdx |
|---|---|
| predModeIntra < 0 | 1 |
| 0 <= predModeIntra <= 1 | 0 |
| 2 <= predModeIntra <= 80 | 1 |
| 81 <= predModeIntra <= 83 | 0 |

A first mapping table of Table 5 is configured with seven LFNST sets, a mapping table of Table 6 is configured with four LFNST sets, and a mapping table of Table 7 is configured with two LFNST sets. As another example, when it is configured with one LFNST set, an lfnstTrSetIdx value may be fixed to 0 with respect to the preModeIntra value.

Hereinafter, a method of maintaining the computational complexity for the worst case when LFNST is applied to the ISP mode will be described.

In the case of an ISP mode, when LFNST is applied, in order to maintain the number of multiplications per sample (or per coefficient, per position) to a certain value or less, the application of LFNST may be limited. According to the size of the partition block, the number of multiplications per sample (or per coefficient, per position) may be maintained to 8 or less by applying LFNST as follows.

1. When both a horizontal length and a vertical length of the partition block are 4 or more, the same method as a calculation complexity control method for the worst case for LFNST in the current VVC standard may be applied.

That is, when the partition block is a 4×4 block, instead of a 16×16 matrix, an 8×16 matrix obtained by sampling the top 8 rows from a 16×16 matrix may be applied in a forward direction, and a 16×8 matrix obtained by sampling the left 8 columns from a 16×16 matrix may be applied in a reverse direction. Further, when the partition block is 8×8 blocks, in the forward direction, instead of a 16×48 matrix, an 8×48 matrix obtained by sampling the top 8 rows from a 16×48 matrix is applied, and in the reverse direction, instead of a 48×16 matrix, a 48×8 matrix obtained by sampling the left 8 columns from a 48×16 matrix may be applied.

In the case of a 4×N or N×4 (N>4) block, when a forward transform is performed, 16 coefficients generated after applying a 16×16 matrix to only the top-left 4×4 block may be disposed in the top-left 4×4 region, and other regions may be filled with a value of 0. Further, when performing an inverse transform, 16 coefficients located in the top-left 4×4 block are disposed in scanning order to form an input vector, and then 16 output data may be generated by multiplying the 16×16 matrix. The generated output data may be disposed in the top-left 4×4 region, and the remaining regions, except for the top-left 4×4 region, may be filled with a value of 0.

In the case of an 8×N or N×8 (N>8) block, when the forward transform is performed, 16 coefficients generated after applying the 16×48 matrix to only an ROI region (the remaining regions excluding bottom-right 4×4 blocks from the top-left 8×8 blocks) inside the top-left 8×8 blocks may be disposed in the top-left 4×4 region, and all other regions may be filled with a value of 0. Further, when performing an inverse transform, 16 coefficients located in the top-left 4×4 block are disposed in scanning order to form an input vector, and then 48 output data may be generated by multiplying the input vector by a 48×16 matrix. The generated output data may be filled in the ROI region, and all other regions may be filled with a value of 0.

2. When the size of the partition block is N×2 or 2×N and LFNST is applied to the top-left M×2 or 2×M region (M≤N), a matrix sampled according to the N value may be applied.

In the case of M=8, for a partition block of N=8, that is, an 8×2 or 2×8 block, an 8×16 matrix obtained by sampling the top 8 rows from a 16×16 matrix may be applied instead of a 16×16 matrix in the case of a forward transform, and in the case of an inverse transform, instead of a 16×16 matrix, a 16×8 matrix obtained by sampling left 8 columns from the 16×16 matrix may be applied.

When N is greater than 8, 16 output data generated after applying the 16×16 matrix to the top-left 8×2 or 2×8 block in the case of a forward transform are disposed in the top-left 8×2 or 2×8 block, and the remaining regions may be filled with a value of 0. In the case of an inverse transform, 16 coefficients located in the top-left 8×2 or 2×8 block are disposed in the scanning order to form an input vector, and then 16 output data may be generated by multiplying the 16×16 matrix. The generated output data may be disposed in the top-left 8×2 or 2×8 block, and all remaining regions may be filled with a value of 0.

3. When the size of the partition block is N×1 or 1×N and LFNST is applied to the top-left M×1 or 1×M region (M≤N), a matrix sampled according to the N value may be applied.

When M=16, for a partition block of N=16, that is, a 16×1 or 1×16 block, instead of a 16×16 matrix, an 8×16 matrix obtained by sampling the top 8 rows from a 16×16 matrix may be applied in the case of a forward transform, and in the case of an inverse transform, instead of a 16×16 matrix, a 16×8 matrix obtained by sampling the left 8 columns from the 16×16 matrix may be applied.

When N is greater than 16, 16 output data generated after applying the 16×16 matrix to the top-left 16×1 or 1×16 block in the case of a forward transform may be disposed in the top-left 16×1 or 1×16 block, and the remaining regions may be filled with a value of 0. In the case of an inverse transform, 16 coefficients located in the top-left 16×1 or 1×16 block may be disposed in scanning order to form an input vector, and then 16 output data may be generated by multiplying the 16×16 matrix. The generated output data may be disposed in the top-left 16×1 or 1×16 block, and all remaining regions may be filled with a value of 0.

As another example, in order to maintain the number of multiplications per sample (or per coefficient, per position) to a certain value or less, the number of multiplications per sample (or per coefficient, per position) based on the ISP coding unit size rather than the size of the ISP partition block may be maintained to 8 or less. When there is only one block satisfying the condition to which LFNST is applied among the ISP partition blocks, the complexity calculation for the worst case of LFNST may be applied based on the corresponding coding unit size rather than the size of the partition block. For example, a luma coding block for one coding unit (CU) is divided (or partitioned) to four partition blocks each having a size of 4×4. And, herein, among the four partition blocks, if a non-zero transform coefficient does not exist for two partition blocks, each of the remaining two partition blocks may be configured to have 16 transform coefficients, instead of 8 transform coefficients, generated therein (based on the encoder).

Hereinafter, a method for signaling an LFNST index in case of an ISP mode will be described.

As described above, an LFNST index may have a value of 0, 1, 2, wherein 0 indicates that LFNST is not applied, and wherein 1 and 2 respectively indicate each one of two LFNST kernel matrices that are included in a selected LFNST set. LFNST is applied based on an LFNST kernel matrix that is selected by the LFNST index. In the current VVC standard, a method according to which an LFNST is transmitted will be described as follows.

1. An LFNST index may be transmitted once for each coding unit (CU), and, in case of a dual-tree, an LFNST index may be separately signaled for each of a luma block and a chroma block.
2. When an LFNST index is not signaled, the LFNST index is inferred as 0, which is a default value. Cases where the LFNST index value is inferred as 0 will be described below.
   A. When the mode corresponds to a mode in which transform is not applied (e.g., transform skip, BDPCM, lossless coding, and so on)
   B. When a primary transform is not DCT-2 (DST7 or DCT8), i.e., when a horizontal transform or a vertical transform is not DCT-2
   C. When a horizontal length or vertical length of a luma block of a coding unit exceeds a maximum luma transform size that is available for transform, e.g., when a maximum luma transform size that is available for transform is equal to 64, and when the size of a luma block of a coding block is equal to 128×16, LFNST cannot be applied.

In case of a dual-tree, it is determined whether or not the maximum luma transform size is exceeded for each of a coding unit for a luma component and a coding unit for a chroma component. That is, it is checked whether or not the maximum luma transform size that is available for transform is exceeded for a luma block, and it is checked whether or not horizontal/vertical lengths and a maximum luma transform size that is available for transform of a corresponding luma block for a color format are exceeded for a chroma block. For example, when the color format is 4:2:0, each of the horizontal/vertical lengths of the corresponding luma block becomes 2 times the lengths of the corresponding chroma block, and the transform size of the corresponding luma block becomes 2 times the size of the corresponding chroma block. As another example, when the color format is 4:4:4, the horizontal/vertical lengths and transform size of the corresponding luma block are the same as the corresponding chroma block.

A 64-length transform or 32-length transform means a transform being applied to a horizontal or vertical length of 64 or 32, respectively. And, a "transform size" may mean the corresponding length of 64 or 32.

In case of a single-tree, after checking whether or not the horizontal length or vertical length for a luma block exceeds the maximum luma transform block size that is available for transform, when the length exceeds the transform block size, LFNST index signaling may be skipped (or omitted).

D. An LFNST index may be transmitted only when both the horizontal length and the vertical length of a coding unit is equal to 4 or more.

In case of a dual-tree, an LFNST index may be signaled only when both the horizontal length and the vertical length for the corresponding component (i.e., luma component or chroma component) is equal to 4 or more.

In case of a single-tree, an LFNST index may be signaled when both the horizontal length and the vertical length for the luma component is equal to 4 or more.

E. When a last non-zero coefficient position is not a DC position (top-left position in a block), if the block is a dual-tree type luma block and the last non-zero coefficient position is not a DC position, an LFNST index is transmitted. If the block is a dual-tree type chroma block and at least one of a last non-zero coefficient position for Cb and a last non-zero coefficient position for Cr is not a DC position, a corresponding LFNST index is transmitted.

In case of a single-tree type, for any one of a luma component, a Cb component, and a Cr component, if a corresponding last non-zero coefficient position is not a DC position, an LFNST index is transmitted.

Herein, when a coded block flag (CBF) value, which indicates the presence or absence of a transform coefficient for one transform block, is equal to 0, in order to determine whether or not to perform LFNST index signaling, the last non-zero coefficient position for the corresponding transform block is not checked. That is, when the corresponding CBF value is equal to 0, since transform is not applied to the corresponding block, when checking the conditions for LFNST index signaling, the last non-zero coefficient position may not be considered.

For example, 1) in case of a dual-tree type and a luma component, if a corresponding CBF value is equal to 0, an LFNST index is not signaled, 2) in case of a dual-tree type and a chroma component, if a CBF value for Cb is equal to 0 and a CBF value for Cr is equal to 1, only the position of the last non-zero coefficient position for Cr is checked so as to transmit the corresponding LFNST index, and 3) in case of a single-tree type, only the last non-zero coefficient position(s) for the luma component, Cb component, or Cr component each having a CBF value of 1 is/are checked.

F. When it is verified that a transform coefficient exists in a position other than a position where an LFNST transform coefficient may exist, LFNST index signaling may be skipped (or omitted). In case of a 4×4 transform block and an 8×8 transform block, according to a transform coefficient scanning order of a VVC standard, the LFNST transform coefficient may exist in 8 positions starting from a DC position, and all of the remaining positions may be filled with 0s. Additionally, in a case where the transform block is not a 4×4 transform block and an 8×8 transform block, according to a transform coefficient scanning order of a VVC standard, the LFNST transform coefficient may exist in 16 positions starting from a DC position, and all of the remaining positions may be filled with 0s.

Therefore, after carrying out residual coding, when a non-zero transform coefficient exists in a region that should only be filled with the 0 value, LFNST index signaling may be skipped (or omitted).

Meanwhile, the ISP mode may be applied only to a luma block or may be applied to both luma block and chroma block. As described above, when ISP prediction is applied, prediction is carried out after dividing (or partitioning) a corresponding coding unit to 2 or 4 partition blocks, and the transform may also be applied to each of the corresponding partition blocks. Therefore, even when determining the conditions for signaling an LFNST index by coding units, it should be considered that the LFNST may be applied to each of the corresponding partition blocks. Additionally, when the ISP prediction mode is applied only to a specific component (e.g., luma block), the LFNST index should be signaled based on the fact that the coding unit is divided into partition blocks only for the corresponding component. LFNST index signaling methods that are available for the ISP mode will be described below.

1. An LFNST index may be transmitted once for each coding unit (CU), and, in case of a dual-tree, an LFNST index may be separately signaled for each of a luma block and a chroma block.
2. When an LFNST index is not signaled, the LFNST index is inferred as 0, which is a default value. Cases where the LFNST index value is inferred as 0 will be described below.
   A. When the mode corresponds to a mode in which transform is not applied (e.g., transform skip, BDPCM, lossless coding, and so on)
   B. When a horizontal length or vertical length of a luma block of a coding unit exceeds a maximum luma transform size that is available for transform, e.g., when a maximum luma transform size that is available for transform is equal to 64, and when the size of a luma block of a coding block is equal to 128×16, LFNST cannot be applied Whether or not to perform signaling of an LFNST index may be determined based on a size of a partition block instead of a coding unit. That is, when the horizontal length or vertical length of a partition block for the corresponding luma block exceeds the maximum luma transform size that is available for transform, the LFNST index signaling may be skipped (or omitted), and the LFNST index value may be inferred as 0.

In case of a dual-tree, it is determined whether or not the maximum block transform size is exceeded for each coding unit or partition block for a luma component and for each coding unit or partition block for a chroma component. That is, by comparing each of the horizontal length and the vertical length of the coding unit or partition block for the luma component with the maximum luma transform size, and when it is determined that at least one length is larger than the maximum luma transform size, the LFNST is not applied. And, in case of the coding unit or partitioning block for the chroma component, the horizontal/vertical lengths of a corresponding luma block for a color format are compared to the maximum luma transform size that is available for maximum transform. For example, when the color format is 4:2:0, each of the horizontal/vertical lengths of the corresponding luma block becomes two times the lengths of the corresponding chroma block, and the transform size of the corresponding luma block becomes 2 times the size of the corresponding chroma block. As another example, when the color format is 4:4:4, the horizontal/vertical lengths and transform size of the corresponding luma block are the same as the corresponding chroma block.

In case of a single-tree, after checking whether or not the horizontal length or vertical length for a luma block (coding unit or partition block) exceeds the maximum luma transform block size that is available for transform, when the length exceeds the transform block size, LFNST index signaling may be skipped (or omitted).
   C. If LFNST that is included in the current VVC standard is applied, an LFNST index may be transmitted only when both the horizontal length and the vertical length of a partition block is equal to 4 or more.

Apart from the LFNST that is included in the current VVC standard, if LFNST for a 2×M (1×M) or M×2 (M×1) block is applied, an LFNST index may be transmitted only for a case where the partition block size is equal to or larger than the 2×M (1×M) or M×2 (M×1) block. Herein, when a P×Q block is equal to or larger than an R×S block, this means that P≥R and Q≥S.

In summary, an LFNST index may be transmitted only for a case where a partition block size is equal to or larger than a minimum size to which LFNST can be applied. In case of the dual-tree, an LFNST index may be signaled only in a case where the size of a partition block for a luma or chroma component is equal to or larger than a minimum size to which LFNST can be applied. In case of the single-tree, an LFNST index may be signaled only in a case where the size of a partition block for a luma component is equal to or larger than a minimum size to which LFNST can be applied.

In the present specification, when an M×N block is equal to or larger than a K×L block, this means that M is equal to or larger than K and that N is equal to or larger than L. When an M×N block is larger than a K×L block, this means that M is equal to or larger than K and that N is equal to or larger than L, while M is larger than K or N is larger than L. When an M×N block is smaller than or equal to a K×L block, this means that M is less than or equal to K and that N is less than or equal to L. And, when an M×N block is smaller than a K×L block, this means that M is less than or equal to K and that N is less than or equal to L, while M is less than K or N is less than L.
   D. When a last non-zero coefficient position is not a DC position (top-left position in a block), if the block is a dual-tree type luma block and a corresponding last non-zero coefficient position for even one of all partition blocks is not a DC position, an LFNST index may be transmitted. If the block is a dual-tree type chroma block and even one of a last non-zero coefficient position of all partition blocks for Cb (when the ISP mode is not applied to the chroma component, it is given that the number of partition blocks is equal to 1) and a last non-zero coefficient position of all partition blocks for Cr (when the ISP mode is not applied to the chroma component, it is given that the number of partition blocks is equal to 1) is not a DC position, a corresponding LFNST index may be transmitted.

In case of a single-tree type, for any one of a luma component, a Cb component, and a Cr component, if a corresponding last non-zero coefficient position for even one of all partition blocks is not a DC position, an LFNST index may be transmitted.

Herein, when a coded block flag (CBF) value, which indicates the presence or absence of a transform coefficient for each partition block, is equal to 0, in order to determine whether or not to perform LFNST index signaling, the last non-zero coefficient position for the corresponding partition block is not checked. That is, when the corresponding CBF value is equal to 0, since transform is not applied to the corresponding block, when checking the conditions for LFNST index signaling, the last non-zero coefficient position for the corresponding partition block is not considered.

For example, 1) in case of a dual-tree type and a luma component, if a corresponding CBF value for each partition block is equal to 0, the corresponding partition block is excluded when determining whether or not to perform LFNST index signaling, 2) in case of a dual-tree type and a chroma component, if a CBF value for Cb is equal to 0 and a CBF value for Cr is equal to 1 for each partition block, only the position of the last non-zero coefficient position for Cr is checked, so as to determine whether or not to perform the corresponding LFNST index signaling, and 3) in case of a single-tree type, only the last non-zero coefficient position(s) for the luma component, Cb component, or Cr component each having a CBF value of 1 for all partition blocks are checked, so as to determine whether or not to perform the LFNST index signaling.

In case of the ISP mode, image information may be configured so that the last non-zero coefficient position is not checked, and the corresponding embodiments will be described below.

i. In case of the ISP mode, checking of the last non-zero coefficient position for both luma block and chroma block is skipped, and LFNST index signaling may be authorized. That is, even if the last non-zero coefficient position for all partition blocks is the DC position or has a corresponding CBF value of 0, the corresponding LFNST index signaling may be authorized.

ii. In case of the ISP mode, checking of the last non-zero coefficient position for only the luma block is skipped, and, for the chroma block, checking of the last non-zero coefficient position according to the above-described method may be performed. For example, in case of the dual-tree type and the luma block, checking of the last non-zero coefficient position is not performed, and the LFNST index signaling may be authorized. And, in case of the dual-tree type and the chroma block, the presence or absence of a DC position corresponding to the last non-zero coefficient position is checked according to the above-described method, so as to determine whether or not to perform signaling of the corresponding LFNST index.

iii. In case of the ISP mode and the single-tree type, the method number i and the method number ii may be applied. That is, in case of applying the method number i to the ISP mode and the single-tree type, checking of the last non-zero coefficient position for both the luma block and the chroma block may be skipped, and the LFNST index signaling may be authorized. Alternatively, by applying the method number ii, checking of the last non-zero coefficient position for the partition blocks of the luma component may be skipped, and checking of the last non-zero coefficient position for the partition blocks of the chroma component (when the ISP mode is not applied to the chroma component, it may be given that the number of partition blocks is equal to 1) may be performed according to the above-described method, so as to determine whether or not to perform the corresponding LFNST index signaling.

E. When it is verified that a transform coefficient exists in a position other than a position where an LFNST transform coefficient may exist even for one partition block among all of the partition blocks, the LFNST index signaling may be skipped (or omitted).

For example, in case of a 4×4 partition block and an 8×8 partition block, according to a transform coefficient scanning order of a VVC standard, the LFNST transform coefficient may exist in 8 positions starting from a DC position, and all of the remaining positions may be filled with 0s. Additionally, in a case where the partition block is equal to or greater than 4×4, and in case the partition block is not a 4×4 partition block and an 8×8 partition block, according to a transform coefficient scanning order of a VVC standard, the LFNST transform coefficient may exist in 16 positions starting from a DC position, and all of the remaining positions may be filled with 0s.

Therefore, after carrying out residual coding, when a non-zero transform coefficient exists in a region that should only be filled with the 0 value, LFNST index signaling may be skipped (or omitted).

If LFNST can be applied even for a case where the partition block size is equal to 2×M (1×M) or M×2 (M×1), a region where the LFNST transform coefficient can be positioned may be designated as described below. A region outside of the region where the LFNST transform coefficient can be positioned may be filled with 0s. And, when it is assumed that LFNST has been applied, if a non-zero transform coefficient exists in the region that should be filled with 0s, the LFNST index signaling may be skipped.

i. When LFNST can be applied to a 2×M or M×2 block, and when M=8, only 8 LFNST transform coefficients may be generated for a 2×8 or 8×2 partition block. When the transform coefficients are arranged in a scanning order that is shown in FIG. 20, 8 transform coefficients are arranged in the scanning order starting from the DC position, and the remaining 8 positions may be filled with 0s.

16 LFNST transform coefficients may be generated for a 2×N or N×2 (N>8) partition block. When the transform coefficients are arranged in the scanning order that is shown in FIG. 20, 16 transform coefficients are arranged in the scanning order starting from the DC position, and the remaining region may be filled with 0s. That is, in the 2×N or N×2 (N>8) partition block, a region excluding the top-left 2×8 or 8×2 block may be filled with 0s. Instead of 8 LFNST transform coefficients, 16 coefficient blocks may also be generated for a 2×8 or 8×2 partition block, and, in this case, there is no region that needs to be filled with 0s. As described above, when the LFNST is applied, when a non-zero transform coefficient is detected to exist in a region that is designated to be filled with 0s even in one partition block, the LFNST index signaling may be skipped, and the LFNST index may be inferred as 0.

ii. When LFNST can be applied to a 1×M or M×1 block, and when M=16, only 8 LFNST transform coefficients may be generated for a 1×16 or 16×1 partition block. When the transform coefficients are arranged in a left-to-right or top-to-bottom scanning order, 8 transform coefficients are arranged in the corresponding scanning order starting from the DC position, and the remaining 8 positions may be filled with 0s.

16 LFNST transform coefficients may be generated for a 1×N or N×1 (N>16) partition block. When the transform coefficients are arranged in the left-to-right or top-to-bottom scanning order, 16 transform coefficients are arranged in the corresponding scanning order starting from the DC position, and the remaining region may be filled with 0s. That is, in the 1×N or N×1 (N>16) partition block, a region excluding the top-left 1×16 or 16×1 block may be filled with 0s.

Instead of 8 LFNST transform coefficients, 16 coefficient blocks may also be generated for a 1×16 or 16×1 partition block, and, in this case, there is no region that needs to be filled with 0s. As described above, when the LFNST is applied, when a non-zero transform coefficient is detected to exist in a region that is designated to be filled with 0s even in one partition block, the LFNST index signaling may be skipped, and the LFNST index may be inferred as 0.

Meanwhile, in case of the ISP mode, in the current VVC standard, by independently (or separately) referring to the length condition for the horizontal direction and the vertical direction, DST-7 is applied, instead of DCT-2, without performing signaling for an MTS index. Depending upon whether or not the horizontal or vertical length is equal to or greater than 4 and less than or equal to 16, a primary transform kernel is determined. Therefore, in case of the ISP mode, and when LFNST may be applied, the following transform combination may be configured as described below.

1. For a case where the LFNST index is 0 (including a case where the LFNST index is inferred as 0), a condition for determining a primary transform corresponding to the ISP mode that is included in the current VVC standard may be followed. That is, by independently (or separately) checking whether or not the length condition (i.e., the condition of the length being equal to or greater than 4 and less than or equal to 16) for the horizontal direction and the vertical direction is satisfied, if the length condition is satisfied, DST-7 is applied for the primary transform, instead of DCT-2. And, if the length condition is not satisfied, DCT-2 may be applied.
2. For a case where the LFNST index is greater than 0, the following two configurations may be possible for the primary transform.
   A. DCT-2 may be applied for both the horizontal direction and vertical direction.
   B. A condition for determining a primary transform corresponding to the ISP mode that is included in the current VVC standard may be followed. That is, by independently (or separately) checking whether or not the length condition (i.e., the condition of the length being equal to or greater than 4 and less than or equal to 16) for the horizontal direction and the vertical direction is satisfied, if the length condition is satisfied, DST-7 is applied, instead of DCT-2. And, if the length condition is not satisfied, DCT-2 may be applied.

In case of the ISP mode, image information may be configured so that an LFNST index can be transmitted for each partition block, instead of being transmitted for each coding unit. In this case, the above-described LFNST index signaling method assumes that only one partition block exists within the unit through which the LFNST index is being transmitted, and whether or not to perform LFNST index signaling may be determined.

Meanwhile, an embodiment of an LFNST kernel that may be applied to a 2×N or N×2 (N>8) partition block, when in the ISP mode, will hereinafter be shown. The following LFNST kernel may be applied to a top-left 2×8 or 8×2 region in the 2×N or N×2 (N≥8) partition block. And, the corresponding LFNST kernel may be used in the LFNST that is described in the above-described embodiments.

Each of Table 8 to Table 10 shows an example in which LFNST kernels are configured of a total of 4 LFNST sets, wherein each LFNST set is configured of two LFNST kernel candidates, i.e., an LFNST kernel matrix. This is a method of selecting one set among the 4 LFNST sets, as shown in Table 2. The LFNST kernels that are proposed in Table 8 to Table 10 are defined according to the grammar of C/C++ programming languages. And, in g_lfnst_2×8_8×2[4][2][16][16], which is an array that stores LFNST kernel data, [4] indicates that the kernels are configured of a total of 4 LFNST sets, [2] indicates that each LFNST set is configured of 2 LFNST kernel candidates, and [16][16] indicates that each LFNST kernel is configured of a 16×16 matrix. Each 16×16 matrix shown in Table 8 to Table 10 represents a matrix that is used in forward LFNST transform. That is, one row becomes one transform basis vector (1×16 vector), which is then multiplied by input data that is configured of primary transform coefficients.

TABLE 8

```
const int8_t g_lfnst_2x8_8x2[4][2][16][16] = {
    {   //0
        {
            { 99,-21,-70,20,14,-7,-3,2,-18,4,10,-3,-1,0,0,2 },
            { 2,-90,48,63,-36,-6,10,-1,-15,17,2,-12,4,4,-4,0 },
            { 55,14,59,-64,-43,33,3,-8,-46,10,20,-3,-3,2,2,-1 },
            { 42,-6,19,-11,-25,9,2,3,80,-13,-75,23,25,-12,-5,3 },
            { -9,-73,5,-56,72,30,-37,5,0,9,-9,12,-6,-8,4,0 },
            { 33,28,64,16,56,-75,-23,26,-7,4,-7,2,-5,6,5,-4 },
            { -6,8,-12,-19,7,-8,11,1,0,79,-32,-76,40,20,-21,-1 },
            { 12,34,21,55,16,73,-70,-16,15,10,9,-22,0,2,-2,6 },
            { -11,12,-5,17,8,6,-8,-11,-74,-7,-51,37,65,-39,-11,15 },
            { -12,-8,-21,-16,-51,-18,-74,80,-8,-16,0,-11,13,8,-6,0 },
            { -5,10,-9,6,-19,-3,-9,16,3,86,-7,43,-42,-52,42,4 },
            { 4,-3,9,-6,-8,8,11,35,10,69,4,46,-56,-39,56 },
            { 4,10,9,19,27,53,59,91,-6,2,-1,10,4,11,-3,-12 },
            { -1,1,-3,1,-4,-3,-13,-12,12,37,30,69,36,51,-39,-58 },
            { -3,3,-2,2,-3,1,-1,2,-13,13,-26,25,-55,39,-71,72 },
            { -2,-2,-1,-1,0,0,1,-1,5,8,10,21,39,64,75,66 },
        },
        {
            { 100,39,-56,-36,-3,3,0,1,-15,-5,7,4,0,-1,1,2 },
            { 20,-85,-57,50,50,4,-11,1,-8,9,8,-1,-4,-4,-2,0 },
            { -68,36,-77,-39,41,27,4,-1,21,-5,4,2,-6,-6,0,0 },
            { 20,-1,-6,4,-5,-5,4,7,94,43,-56,-43,-4,9,2,0 },
            { -1,70,-5,76,37,-54,-34,1,3,-14,0,-1,1,3,3,1 },
            { 22,10,57,-22,81,52,-40,-28,3,15,0,-2,-10,-4,4,0 },
            { 5,-14,0,-6,9,7,-14,-3,13,-71,-69,43,60,11,-15,-3 },
            { -7,-26,7,-67,30,-87,-35,33,-11,6,-8,-7,-7,5,9,1 },
            { -11,9,-11,3,5,11,7,-14,-70,20,-50,-66,25,50,12,-12 },
            { 10,10,21,5,55,-9,99,49,-5,6,-5,13,11,-2,-7,-3 },
            { -6,9,-8,-1,-5,-13,-9,-23,-17,84,-14,46,52,-37,-39,-12 },
            { -4,9,0,12,-14,44,-44,103,-17,16,-14,3,5,-16,8,16 },
            { -3,1,-3,4,-2,-7,15,-23,-28,-3,-64,10,-50,-68,36,47 },
            { -2,0,-4,4,-2,2,2,-5,7,33,-2,66,-3,64,81,12 },
            { 0,-3,3,-5,5,-4,5,-9,11,-1,35,-32,72,-15,29,87 },
            { 2,-2,1,0,0,0,1,1,7,-9,10,-18,37,-55,75,-77 },
        }
    },
    {   //1
        {
            { -112,34,23,-2,5,0,2,0,44,-11,-9,0,-2,0,0,0 },
            { 23,96,-70,6,-12,1,-4,1,18,-33,11,2,1,1,0,1 },
            { -21,42,25,-49,14,-11,6,-3,-100,-7,23,9,6,0,2,0 },
            { 46,29,62,-73,2,-6,-1,-2,49,-12,-37,19,-3,1,0,1 },
            { 12,31,63,62,-77,6,-16,-1,-20,-10,-15,-16,16,4,4,2 },
            { -5,-42,1,-16,-25,28,3,1,3,-106,37,20,6,2,-3,2 },
            { 16,7,28,50,67,-73,1,-8,2,-48,5,-14,-14,17,3,2 },
            { -8,-6,-22,17,21,22,-25,2,-33,-28,-100,44,-1,-2,7,2 },
            { -10,-16,-27,-15,-51,-71,73,-11,-4,-4,-35,8,18,16,-11,-1 },
            { 10,15,16,24,29,57,80,-63,-1,-2,-4,0,-1,-16,-18,8 },
            { -1,-7,-11,-26,12,11,-5,-3,-5,-23,-33,-106,46,-7,13,4 },
            { -7,-10,-12,-15,-20,-20,-52,-107,1,3,3,-1,-19,7,11,20 },
            { -2,1,-2,-10,-15,18,14,15,-12,-7,-15,-40,-101,54,-10,3 },
            { 0,-1,0,-1,-14,-17,12,3,-4,-10,-5,-11,-52,-101,47,-19 },
            { -1,-1,0,-1,-3,-14,-17,12,-5,-4,-5,-9,-11,-48,-97,61 },
            { 0,0,1,2,0,2,16,18,3,5,5,8,2,8,62,108 },
        },
        {
            { 123,-10,-22,-8,-4,-3,-2,-1,-22,4,2,1,1,0,0,0 },
            { -6,-118,28,30,3,5,4,1,-22,17,2,-4,0,0,-1,-1 },
            { 20,-24,-4,5,1,0,0,1,122,0,-22,-5,-4,-2,-3,0 },
            { -21,-22,-117,6,39,6,1,5,-4,5,11,-2,-4,-2,0,0 },
            { 0,24,1,23,0,-4,0,-1,-1,120,-10,-25,-3,-4,-3,-2 },
            { -10,-26,-3,-118,-18,23,9,3,1,28,-5,0,0,-2,1,0 },
            { 8,4,32,-15,77,6,-14,-5,17,10,89,7,-21,-3,-1,-3 },
            { 4,2,19,-16,89,-10,-20,-1,-14,-3,-83,6,14,0,1,2 },
            { 6,10,4,20,6,123,4,-22,-1,-1,-12,5,3,-4,-1,1 },
            { 4,5,7,-3,21,2,74,8,-4,-20,-1,-98,-6,14,0,-1 },
            { -3,-4,-3,-6,-14,9,-100,-2,-3,-13,1,-74,-12,8,5,1 },
            { 3,4,6,5,3,20,-8,124,1,1,4,4,18,0,-1,1 },
            { -1,-1,-1,-2,4,-3,-6,-18,8,2,3,-14,123,-1,-13,-1 },
            { 0,0,-2,1,1,3,-2,-1,-3,8,1,15,3,126,9,-4 },
            { 0,1,0,-2,-1,0,-4,1,-4,-3,-4,0,-12,9,-124,-28 },
            { 0,0,0,0,0,0,0,-1,0,2,2,0,-3,6,-28,125 },
        }
    },
```

TABLE 8-continued

```
    {  //2
        {
            { 112,-10,-39,-1,-1,-2,-1,0,-45,10,15,-1,1,0,0,0 },
            { -9,-112,2,41,9,4,1,2,4,39,-13,-16,-1,-1,-1,-1 },
            { 36,-8,110,-10,-34,-4,-3,-2,-15,-3,-29,20,10,1,2,0 },
            { -7,-39,-7,-110,0,31,10,4,5,12,10,24,-23,-11,-2,-1 },
            { -17,-4,32,-3,91,-2,-18,-5,-67,-20,24,-3,-21,20,7,-1 },
            { -44,-7,-9,10,-67,8,15,1,-86,-1,40,7,14,-16,-3,-3 },
            { -2,35,24,-8,0,-9,-5,-4,3,104,39,-43,-16,2,3,-3 },
            { 6,18,5,25,4,113,9,-17,-6,3,-22,-17,-20,-20,23,7 },
            { 12,-9,16,32,-5,16,-28,-7,41,-10,86,60,-27,-12,3,-3 },
            { 13,-8,22,2,0,-8,89,12,17,-39,39,-53,-30,-6,-16,16 },
            { 1,-14,-1,-14,-43,3,-66,1,6,-38,10,-65,-39,44,21,-11 },
            { 3,-10,7,-15,9,28,3,-49,17,-8,38,-22,94,41,-8,2 },
            { 2,6,5,5,6,35,-5,102,2,4,9,1,23,31,-44,-32 },
            { -3,3,-10,9,-13,3,47,-11,-2,17,-10,41,-28,97,34,-15 },
            { 0,4,-2,6,-6,8,-6,-52,-6,2,-15,3,-34,14,-105,-28 },
            { 3,-1,3,-2,7,-7,16,-14,4,-8,2,-9,6,-29,29,-118 },
        },
        {
            { 103,7,-63,-5,4,0,-2,0,-35,6,21,-3,0,0,0,0 },
            { 2,-100,-12,68,10,-2,-1,1,-2,-29,-14,-22,5,1,-1,-1 },
            { 56,-8,89,9,-60,-5,-2,-1,-16,2,-21,21,18,-3,0,-1 },
            { -11,58,5,87,10,-49,-11,-3,-31,-17,21,-12,25,15,-4,-2 },
            { 31,34,-15,15,-1,-18,1,3,90,22,-63,-29,13,4,-1,3 },
            { 28,-11,38,-5,95,0,-41,0,5,-37,-22,26,-9,24,5,-3 },
            { 10,15,44,-10,18,2,-13,-3,3,66,47,-63,-49,22,12,-3 },
            { -1,30,2,32,8,100,7,-29,-26,-5,-35,-23,4,-8,30,7 },
            { 11,7,-1,46,-6,24,-13,-9,53,5,49,64,-44,-41,11,3 },
            { -18,8,-17,-11,-8,9,-88,-8,-13,62,-9,31,45,-1,2,-24 },
            { -3,-10,-20,5,-53,0,-59,5,7,-54,-9,-22,-50,46,31,-18 },
            { -8,13,-5,3,7,-35,-6,37,-42,22,-56,8,-58,-58,32,14 },
            { 2,-13,4,-17,0,-30,-31,-82,6,-24,10,-35,14,-57,19,40 },
            { -5,0,-10,-2,0,-28,41,-67,-8,29,-18,45,-15,54,52,-8 },
            { 2,-7,3,-7,4,-1,5,51,15,-4,29,-4,50,1,97,26 },
            { -5,2,-6,3,-10,8,-17,9,-5,-14,-4,-18,-9,41,-26,113 },
        }
    },
    {  //3
        {
            { -87,77,-22,6,-4,3,-2,1,38,-28,2,2,-1,-1,1,1 }
            { -54,-29,89,-48,17,-8,5,-2,14,23,-35,9,2,-3,2,-1 },
            { 51,70,5,-76,32,-11,2,-3,-21,-19,-15,28,-2,-3,2,0 },
            { -30,-45,-67,-28,78,-24,8,-1,6,14,14,25,-20,-2,-3,-2 },
            { 0,-38,-27,-64,-41,66,-17,5,36,-32,12,14,28,-14,-5,3 },
            { -38,16,-26,-22,-25,31,-3,1,-85,65,-2,-4,18,-6,-2,1 },
            { 8,14,19,32,64,66,-67,13,3,10,-4,-3,-2,-38,7,6 },
            { 18,6,-34,16,-17,4,3,-3,42,47,-95,35,0,-1,-4,3 },
            { -3,-6,-12,-18,-25,-62,-77,58,1,1,-10,-18,7,-6,40,-3 },
            { -17,-17,9,22,-22,6,-24,2,-46,-47,-13,84,-50,13,2,4 },
            { 12,15,7,-21,-19,17,-20,5,34,55,42,-1,-81,44,-8,3 },
            { -5,-8,-10,-12,-4,-18,-55,-95,-8,-14,-20,-35,-9,9,-23,33 },
            { 5,9,9,7,-24,-27,-2,-46,20,32,45,47,7,-77,31,-3 },
            { 3,5,10,10,7,-24,-25,19,10,20,29,44,56,25,-78,36 },
            { 1,3,3,7,10,8,-25,-35,6,9,11,24,44,65,37,-77 },
            { 1,1,3,4,8,12,14,-4,3,5,8,12,23,40,75,89 },
        },
        {
            { -112,22,27,1,0,1,1,0,50,-7,-12,-1,-1,0,0,0 },
            { -15,-112,22,32,8,0,0,1,8,44,-5,-12,-3,-1,0,-1 },
            { 25,11,113,-15,-26,-7,0,0,-17,-4,-38,1,9,3,1,0 },
            { 7,34,10,114,5,-22,-9,-1,-8,-9,2,-35,-7,7,2,1 },
            { 48,-11,-12,7,-25,-5,-4,1,104,-29,-37,2,4,3,-1,1 },
            { -17,-7,-21,8,-117,-6,20,6,-18,6,15,-9,27,10,-4,-1 },
            { -2,-21,14,27,-4,91,10,-11,-9,-68,22,26,7,-19,-12,3 },
            { 12,36,-2,-4,-4,77,-14,-9,18,82,-18,-33,4,-16,-8,0 },
            { -13,-5,-23,1,-14,15,-99,-27,-26,-5,-57,2,19,-9,16,13 },
            { -11,-5,-29,13,19,-1,64,16,-30,-12,-89,15,32,7,-11,-7 },
            { 4,14,5,32,-6,-13,-10,13,9,43,9,107,15,-31,-6,-3 },
            { 0,-1,1,2,-3,-21,30,-120,1,4,-2,12,-9,-5,-13,15 },
            { -3,-1,-8,3,-28,7,12,11,-12,-2,-31,15,-112,-21,28,7 },
            { -1,-3,-1,-6,-1,-26,6,12,-7,-10,-33,13,-114,-26,21 },
            { 1,0,2,3,5,3,24,-2,4,1,9,1,31,-13,111,47 },
            { 0,0,-1,0,-1,-2,1,-18,1,-4,1,-7,7,-29,43,-115 },
        }
    }
};
```

TABLE 9

```
const int8_t g_lfnst_2x8_8x2[4][2][16][16] = {
    {  //0
        {
            { 101,-15,-70,13,14,-6,-2,2,-20,3,11,-1,-1,-1,0,2 },
            { 6,96,-28,-74,8,15,-3,-1,8,-19,0,13,-2,-4,3,0 },
            { 52,-10,72,-45,-53,23,8,-7,-50,11,17,-2,-1,4,0,-1 },
            { -43,9,-22,7,23,-2,-3,-4,-81,5,77,-15,-25,8,5,-2 },
            { 9,66,3,68,-65,-40,29,0,-3,-8,8,-16,7,11,-4,-1 },
            { 30,29,62,14,69,-30,38,19,-9,-1,-5,7,-8,4,7,-3 },
            { 0,13,-4,-19,12,-4,6,1,13,86,-13,-84,8,27,-9,-4 },
            { 18,25,20,47,10,80,-46,-27,37,4,30,-13,-31,-2,9,6 },
            { 8,-20,3,-26,-15,-34,26,21,61,-7,52,-5,-73,17,22,-10 },
            { 9,9,17,11,46,7,91,-63,2,20,-2,23,-10,-18,5,2 },
            { 7,-11,9,-7,24,7,16,-26,7,-78,7,-51,26,63,-30,-14 },
            { 5,0,12,-4,12,0,13,32,33,8,68,4,60,-37,-52,37 },
            { 3,10,7,20,21,52,47,94,-13,-1,-15,9,-6,24,6,-26 },
            { 1,-2,5,-2,5,3,17,18,-14,-39,-23,-63,-26,-57,27,69 },
            { 2,-3,2,-2,2,-1,2,-2,11,-11,23,-26,53,-42,77,-66 },
            { 2,2,1,0,-1,-2,-2,0,-6,-11,-12,-23,-38,-63,-73,-70 },
        },
        {
            { 104,29,-61,-27,2,3,-2,-2,-14,-3,7,3,-1,-1,1,3 },
            { 14,-92,-44,60,42,0,-12,1,-6,10,5,-3,-2,-3,-3,0 },
            { -63,33,-78,-31,58,17,-4,-1,22,-5,3,3,-6,-6,1,0 },
            { 17,-4,-8,3,-14,-5,7,9,98,35,-60,-34,3,6,-1,1 },
            { 6,66,6,78,32,-60,-31,4,5,-2,-4,-2,3,5,2,1 },
            { -28,3,-62,33,-83,-31,48,15,-9,-8,16,-5,3,1,-3,1 },
            { -1,15,8,1,8,-5,12,-2,-11,82,55,-54,-52,-1,15,0 },
            { 5,31,-1,59,-14,97,8,-43,12,-4,10,1,2,-5,-5,1 },
            { -10,9,-9,0,11,8,14,-15,-65,23,-62,-54,46,41,0,-13 },
            { 13,8,20,11,50,-1,106,27,3,5,-2,26,11,-12,-10,-1 },
            { -6,8,-8,-1,-11,-13,-17,-25,-10,77,-11,57,44,-54,-29,1 },
            { 4,-11,-1,-13,8,-42,29,-112,15,-18,6,-2,-12,10,-2,-10 },
            { -3,2,-3,7,-4,0,8,-10,-30,-7,-63,5,-60,-56,48,45 },
            { -2,2,-7,7,-6,5,-1,3,-2,30,-20,69,-35,67,47,-47 },
            { -1,-4,0,-2,3,-2,3,-8,13,12,27,10,55,28,72,79 },
            { -2,2,-1,0,0,0,-1,-1,-8,11,-12,21,-37,55,-74,75 },
        }
    },
    {  //1
        {
            { 117,-22,-24,-1,-8,0,-3,0,-38,8,8,0,2,0,0,0 }
            { -18,-102,58,-6,14,1,5,-1,-33,30,-3,-1,-1,-1,0,-1 },
            { 25,-45,-12,25,-6,11,-4,3,109,10,-29,-5,-8,-1,-3,0 },
            { -35,-37,-87,64,7,9,3,2,-24,7,35,-14,1,-2,-1,-1 },
            { 5,14,53,84,-73,6,-16,-1,-14,-11,-3,-19,12,3,2,1 },
            { -11,-33,-17,-49,-69,53,15,5,2,-63,18,16,13,-2,-5,2 },
            { 11,-18,17,28,55,-29,-8,-3,1,-104,2,4,-5,9,3,3 },
            { -11,-6,-29,6,-5,8,-9,2,-33,-9,-115,24,10,4,6,2 },
            { 5,14,16,12,43,100,-57,4,-5,4,7,11,-11,-17,3,2 },
            { -9,-14,-13,-22,-24,-43,-101,48,2,2,12,7,-4,10,15,-3 },
            { 0,1,5,25,-10,-12,10,0,2,11,18,116,-37,-2,-13,-2 },
            { 4,8,9,11,12,13,43,117,-3,0,-3,-3,2,7,-5,-9 },
            { 2,0,3,7,15,-9,-5,2,12,6,10,33,115,-39,2,-3 },
            { 0,-1,-1,-1,-10,-16,6,8,-3,-10,-6,-11,-35,-116,29,-13 },
            { 1,0,1,2,0,9,16,-5,5,4,7,11,3,29,117,-34 },
            { 0,0,0,0,0,1,-7,-9,-1,-4,-3,-4,0,5,-35,-122 },
        },
        {
            { -124,12,18,5,4,2,2,1,21,-5,-3,-1,-1,0,0,0 },
            { 13,116,-27,-33,0,-4,-4,-1,37,-11,-5,2,-1,-1,0,0 },
            { 18,-38,3,11,0,2,0,2,118,-2,-25,-4,-5,-2,-3,0 },
            { 18,27,117,-1,-26,-1,-3,-6,2,31,-7,-3,0,1,0,-1 }
            { -7,7,-32,15,8,-1,-1,1,2,120,-10,-20,-2,-5,-1,-2 },
            { 6,22,-2,123,-5,-14,-7,-3,-5,-17,2,0,0,0,-1,0 },
            { 4,2,12,2,40,3,-4,-2,24,9,117,-4,-14,-5,-5,-3 },
            { -6,-4,-22,0,-116,25,11,3,8,4,39,-8,-5,2,0,-3 },
            { 4,6,2,12,18,122,-24,-15,-3,-1,-10,9,-1,-4,-1,2 },
            { -2,-2,-2,3,-7,-8,4,-3,5,20,3,125,-1,-9,-6,-2 },
            { 5,7,4,8,14,19,124,-16,0,0,-2,-3,2,-1,0,0 },
            { -3,-4,-6,-5,-5,-15,-11,-121,-1,-2,4,-4,-36,3,0,-6 },
            { 1,2,2,1,0,3,6,36,-7,-2,-12,1,-121,8,9,2 },
            { 0,-1,1,-1,-4,-3,0,0,-3,-6,4,-9,-8,-127,8,-1 },
            { 0,-1,0,1,2,0,-1,-3,4,3,5,6,8,6,127,5 },
            { 1,1,0,0,2,2,0,6,-1,-3,-3,-1,1,1,5,-128 },
        }
    },
```

TABLE 9-continued

```
    {  //2
        {
            { -111,12,42,0,0,2,1,0,42,-10,-15,2,-1,0,0,0 },
            { -9,-112,5,42,9,1,0,2,5,38,-14,-16,-1,0,-1,-1 },
            { -39,6,-110,9,33,5,4,2,16,5,28,-21,-10,-2,-2,0 },
            { 5,41,6,109,2,-33,-10,-3,-6,-10,-10,-24,25,12,1,0 },
            { 1,-1,31,-8,110,-2,-24,-5,-28,-19,8,-8,-26,26,9,0 },
            { -44,-9,6,7,-27,1,9,-1,-102,-4,53,7,3,-6,-1,-3 },
            { -1,-34,-25,10,2,7,7,2,-8,-103,-36,45,18,-4,-6,4 },
            { -2,-17,-3,-26,1,-111,-5,17,15,-5,29,16,18,19,-28,-7 },
            { 13,-8,15,35,-6,21,-28,-7,45,-11,83,58,-31,-11,4,-3 },
            { -14,7,-21,-4,2,6,-85,-8,-18,40,-32,57,39,9,11,-20 },
            { 0,-13,-5,-12,-47,0,-68,6,2,-38,2,-59,-41,45,20,-13 },
            { 4,-11,8,-16,5,33,3,-42,19,-13,42,-30,90,42,-9,-2 },
            { -2,-6,-4,-8,-3,-36,-9,-98,0,-7,-4,-8,-9,-46,47,27 },
            { -3,2,-11,7,-12,-5,49,-26,-2,16,-12,41,-25,90,45,-6 },
            { 0,-4,2,-6,5,-7,2,62,6,-4,16,-4,36,-15,99,29 },
            { -3,1,-3,0,-7,5,-19,6,-4,8,-1,9,-5,26,-30,119 },
        },
        {
            { 106,6,-57,-5,2,0,-2,0,-37,8,20,-3,0,0,1,0 },
            { 2,-105,-11,59,8,3,0,1,-2,31,-17,-21,4,1,0,-1 },
            { 51,-8,91,7,-60,-3,0,-1,-14,2,-25,23,18,-5,1,0 },
            { -10,52,2,95,0,-45,-7,-3,-28,-9,15,-20,28,11,-3,-1 },
            { 30,31,-17,12,-7,-12,1,2,95,34,-54,-27,11,1,-2,2 },
            { 30,-6,34,7,92,-10,-34,0,10,-47,-31,25,-7,26,4,-1 },
            { 9,13,51,-8,31,1,-18,-3,2,72,54,-45,-41,18,7,-4 },
            { -5,26,4,4,9,78,6,-18,-44,0,-57,-55,9,9,10,26,5 },
            { 6,15,-3,53,0,70,-13,-24,31,5,30,58,-26,-37,19,3 },
            { -17,12,-8,-17,28,-5,-36,0,-29,74,-24,49,60,-23,-8,-12 },
            { -11,-4,-22,-2,-47,-3,-98,4,-2,-7,-12,-1,-27,39,26,-28 },
            { -5,12,-4,9,4,-39,9,31,-30,15,-47,9,-77,-56,29,16 },
            { -4,11,-8,15,-3,12,52,35,-8,28,-16,47,-26,81,-3,-35 },
            { -3,-7,-7,-10,-2,-38,23,-99,-2,11,-7,18,-5,24,57,10 },
            { 2,-6,3,-5,6,-1,10,57,14,-5,24,-3,42,-1,102,3 },
            { -5,1,-5,2,-9,6,-16,15,-3,13,0,16,1,39,-8,117 },
        }
    },
    {  //3
        {
            { 97,-67,11,-3,3,-3,1,-1,-42,24,2,-1,1,0,1,-1 },
            { 53,60,-83,29,-14,8,-5,1,-16,-31,30,-2,0,2,-2,2 },
            { 38,73,50,-70,16,-8,2,-3,-20,-19,-25,21,3,-3,3,0 },
            { 17,29,69,73,-60,4,-5,1,-4,-9,-12,-33,9,8,-1,2 },
            { 3,21,13,59,91,-50,2,-4,-10,12,-7,-5,-33,1,7,-2 },
            { -42,21,-9,-7,-17,-6,12,-1,-99,57,13,-13,9,4,0,-1 },
            { 3,-6,-18,-15,-46,-101,41,-3,16,-3,-12,1,-9,35,6,-5 },
            { 19,25,-31,4,-7,12,-10,4,38,82,-76,-7,9,-8,1,3 },
            { -7,-8,-6,-11,-11,-40,-106,36,-13,-12,-8,-11,2,-13,33,8 },
            { 15,17,13,-31,13,-8,2,12,39,37,69,-81,10,-1,5,-5 },
            { -7,-14,-17,-3,29,-7,19,-5,-18,-45,-48,-62,78,-7,-4,0 },
            { -2,-2,-4,-11,-6,-5,36,-112,-1,-2,-4,-25,-23,4,-23,25 },
            { 3,7,9,18,-4,-35,-2,-30,14,21,35,50,71,-67,-1,1 },
            { -2,-3,-6,-5,-17,4,33,-12,-6,-14,-14,-27,-47,-83,66,-12 },
            { 1,2,1,5,7,17,-9,-37,5,6,6,13,28,52,82,-64 }
            { 1,0,2,3,6,9,17,1,3,4,7,8,15,25,60,107 },
        },
        {
            { -110,37,23,0,0,1,1,0,46,-12,-11,0,0,0,-1,0 },
            { 25,105,-50,-19,-6,-3,-1,0,-8,-40,12,10,1,1,0,1 },
            { 28,31,102,-43,-27,-3,2,-1,-19,-8,-34,7,11,1,1,0 },
            { 14,30,31,111,-10,-20,-7,-1,-8,-10,-2,-33,-6,8,2,1 },
            { -41,18,9,-4,36,0,1,0,-103,35,32,-5,-6,-3,3,-1 },
            { 21,10,20,-1,114,-10,-16,-4,26,-10,-21,10,-25,-10,5,1 },
            { -6,-25,21,17,5,66,-3,-6,-18,-86,39,33,3,-13,-8,2 },
            { 12,29,-2,13,4,101,-1,-1,14,14,57,-22,-18,9,-22,-10,3 },
            { -16,-12,-30,14,-6,-1,-56,-6,-39,-18,-90,30,27,-8,10,8 },
            { 2,0,10,-19,-15,0,-109,-8,13,6,43,-31,-17,-10,16,12 },
            { 4,13,10,25,-18,-16,-11,-9,13,43,24,103,-18,-34,-2,0 },
            { -2,-4,-3,-5,-5,-12,12,-124,-3,-6,-3,-8,-14,4,-13,12 },
            { -3,-3,-6,-5,-23,19,12,12,-12,-9,-29,-1,-114,6,32,2 },
            { -1,-3,-3,-4,-7,-21,21,7,-4,-13,-5,-31,-1,-115,-1,31 },
            { -1,-1,-2,-4,-4,-7,-18,15,-6,-2,-11,-5,-31,0,-120,-12 },
            { 0,-1,-2,-1,-3,-3,-6,-13,-1,-5,-3,-9,-1,-31,13,-122 },
        }
    }
};
```

TABLE 10

```
const int8_t g_lfnst_2x8_8x2[ 4 ][ 2 ][ 16 ][ 16 ] = {
    {  //0
        {
            { 103,-12,-70,9,13,-6,-2,-2,-21,3,11,0,-1,-1,0,2 },
            { 7,96,-18,-77,-3,16,0,-2,-2,-20,3,14,-1,-3,3,0 },
            { 49,-21,78,-37,-51,20,8,-6,-51,11,16,-2,0,4,0,-2 },
            { 44,-7,24,-8,-20,0,2,5,82,-2,-76,11,23,-6,-4,2 },
            { 13,66,10,71,-59,-45,23,2,-5,-7,7,-18,8,13,-4,-1 },
            { 27,25,60,10,77,-53,-42,17,-11,-8,-3,13,-11,2,9,-3 },
            { -4,-19,-2,16,-17,-2,0,0,-20,-89,0,81,11,-23,1,3 },
            { 19,19,20,45,4,77,-34,-26,41,-9,41,2,-41,-9,13,6 },
            { 5,-24,1,-30,-18,-49,30,26,52,-15,51,6,-67,11,20,-9 },
            { -8,-10,-16,-11,-42,-3,-95,51,0,-25,2,-32,7,24,-2,-3 },
            { -8,10,-10,7,-28,-10,-26,31,-9,71,-6,54,-20,-64,25,16 },
            { -5,0,-12,3,-12,-3,-10,-40,-31,-10,-67,-6,-66,25,57,-24 },
            { 2,10,5,19,17,50,42,95,-16,-3,-21,6,-13,24,11,-27 },
            { 1,-2,6,-3,7,1,18,20,-12,-38,-16,-61,-18,-62,18,74 },
            { 3,-3,2,-2,3,-2,-2,10,-10,22,-27,52,-43,79,-65 },
            { 2,2,1,0,-2,-2,-4,-1,-7,-12,-13,-23,-38,-62,-72,-71 },
        },
        {
            { 106,23,-62,-21,4,2,-3,2,-15,-1,7,2,-1,-1,1,3 },
            { -11,97,35,-63,-37,1,7,12,0,7,-11,-5,3,1,3,3,0 },
            { 57,-28,79,28,-67,-12,9,0,-23,5,-2,-3,7,6,-1,0 },
            { 2,61,14,73,37,-55,-31,1,-30,-23,16,8,2,3,3,0 },
            { 16,16,-9,33,-12,-30,0,12,94,27,-55,-29,5,6,-1,2 },
            { 33,-8,65,-35,78,21,-47,-8,17,11,-24,5,-2,-1,4,-1 },
            { -2,14,8,-3,13,-9,14,0,-12,88,50,-56,-44,1,12,-2 },
            { 6,32,2,55,-8,99,-2,-44,16,1,12,-4,-1,-4,-3,2 },
            { -9,10,-10,1,13,8,17,-16,-61,24,-70,-46,54,30,-5,-10 },
            { 14,7,20,13,48,1,109,15,9,-2,1,30,6,-11,-8,0 },
            { -6,9,-7,2,-12,-11,-17,-18,-7,72,-7,66,40,-59,-24,5 },
            { 3,-11,-3,-14,3,-42,17,-115,14,-13,4,-1,-12,7,-2,-9 },
            { 3,-2,-4,-8,5,-2,-7,6,29,6,61,-3,-68,53,-50,-40 },
            { 2,-3,8,-8,7,-6,1,-3,4,-29,21,-65,35,-69,-38,57 },
            { -2,-4,0,-2,2,-2,3,-8,12,12,24,13,49,34,79,74 },
            { 2,-2,1,0,0,0,2,2,8,-12,13,-21,37,-55,73,-76 },
        }
    },
    {  //1
        {
            { 118,-19,-24,-1,-8,0,-3,0,-36,7,7,0,2,0,0,0 },
            { -17,-105,52,-5,14,2,6,-1,-36,29,0,-1,0,-2,0,-1 },
            { 24,-46,-13,16,-2,10,-2,3,110,10,-27,-4,-8,-1,-3,0 },
            { -33,-35,-100,44,19,9,6,3,-19,4,33,-9,-1,-2,-2,-1 },
            { 2,0,-29,-88,82,-13,10,0,9,10,-6,20,-12,-4,0,-1 },
            { -12,-25,-23,-69,-74,49,19,5,2,-35,18,16,12,-4,-5,1 },
            { 7,-25,12,18,34,-11,-6,-3,-1,-117,-3,8,1,8,3,3 },
            { -11,-5,-31,3,-13,2,-3,2,-32,-1,-117,15,13,5,5,3 },
            { -4,-13,-13,-14,-37,-108,44,5,7,-4,3,-16,9,17,-1,-3 },
            { -9,-12,-11,-20,-18,-32,-111,38,0,2,10,5,-3,6,15,-1 },
            { 0,0,-2,-24,11,16,-9,-5,-1,-9,-12,-119,28,1,11,2 },
            { 4,6,9,8,13,14,32,121,-3,-1,-2,-5,6,8,-2,-7 },
            { -2,0,-2,-6,-15,6,5,3,-11,-7,-10,-26,-119,29,-3,4 },
            { 0,-1,0,2,-7,-15,5,10,-3,-9,-6,-7,-26,-120,26,-8 },
            { -1,-1,0,0,-2,0,-8,-15,5,-4,-3,-6,-10,0,-26,-122,20 },
            { 0,0,0,0,0,-3,5,7,1,4,4,3,2,-4,21,126 },
        },
        {
            { 124,-15,-16,-5,-4,-2,-2,-1,-22,6,4,1,1,0,0,0 },
            { -17,-114,26,22,0,5,4,1,-42,10,6,-2,1,1,0,0 },
            { 18,-42,7,12,0,2,0,1,116,0,-24,-4,-5,-1,-3,0 },
            { -2,16,6,17,-1,-2,-2,-1,0,124,-11,-20,-2,-5,-1,-3 },
            { -18,-25,-121,-6,25,2,3,5,1,10,1,-2,0,-2,0,0 },
            { -5,-19,15,-123,7,8,9,3,4,19,-5,3,-1,0,0,-1 },
            { 3,1,11,1,47,-4,-3,-23,8,115,-4,-14,-5,-4,-2 },
            { 6,4,20,6,113,-28,-10,-3,-10,-5,-46,5,0,-2,1,2 },
            { 3,5,5,3,6,21,118,-39,-13,-2,1,-7,9,-4,-4,0,1 },
            { -3,-4,-2,-12,-7,-17,-84,9,-3,-14,-1,-92,-3,5,4,1 },
            { -4,-7,-3,-4,-14,-31,-86,12,3,14,4,85,-2,-1,-3,-2 },
            { 3,4,6,5,8,15,7,120,2,1,5,-1,37,-1,3,6 },
            { 0,2,0,2,-3,2,8,37,-7,-2,-11,1,-121,9,6,1 },
            { 0,1,-1,1,5,3,1,-3,3,6,4,3,8,127,-6,5 },
            { 0,-1,0,1,0,-1,0,-5,4,3,4,4,5,6,127,-2 },
            { -1,-1,0,0,-2,-2,-1,-6,1,3,2,2,-2,-5,2,127 },
        }
    }
```

TABLE 10-continued

```
{   //2
  {
    { -111,11,41,0,0,2,1,0,43,-10,-15,2,-2,0,0,0 },
    { 9,112,-4,-41,-9,-1,0,-2,-6,-39,13,16,1,0,1,1 },
    { 39,-7,110,-9,-30,-5,-4,-2,-15,-5,-29,21,10,3,2,0 },
    { 6,40,7,109,4,-33,-10,-3,-6,-12,-11,-25,25,12,2,1 },
    { 1,-1,29,-8,110,2,-22,-5,-28,-20,9,-9,-27,25,9,1 },
    { -45,-8,8,7,-28,-1,7,-2,-102,0,53,4,3,-5,0,-4 },
    { -3,-32,-25,13,0,24,10,0,-14,-99,-40,43,18,-7,-2,4 },
    { 2,22,4,21,-3,106,9,-14,-16,20,-29,-30,-17,-19,28,7 },
    { 13,-7,15,37,-9,31,-30,-8,42,-14,81,52,-35,-9,9,-4 },
    { -13,6,-22,-5,-3,5,-93,-8,-18,35,-35,48,27,14,19,-20 },
    { -1,15,3,15,45,3,53,-3,-4,45,-2,70,41,-44,-20,9 },
    { -3,9,-7,16,-6,-34,-2,35,-18,8,-40,23,-94,-47,8,3 },
    { -1,-7,-3,-8,-2,-34,-1,-102,2,-6,-2,-6,-5,-39,48,30 },
    { 3,-3,11,-9,12,3,-52,25,3,-17,14,-40,32,-92,-33,11 },
    { 0,4,-1,5,-5,10,-10,-61,-6,3,-14,0,-31,9,-103,-22 },
    { -4,1,-3,1,-8,5,-18,11,-5,8,-1,10,-4,27,-25,120 },
  },
  {
    { 107,4,-54,-4,1,0,-3,0,-39,9,20,-3,0,0,1,0 },
    { 0,-107,-10,54,8,6,1,1,-2,32,-18,-20,3,0,0,-1 },
    { -47,7,-92,-9,62,4,-1,1,15,-3,26,-22,-20,5,0,0 },
    { -34,-6,14,29,7,-6,-2,-3,-100,-36,51,14,3,3,1,-1 },
    { 1,-57,8,-92,12,43,2,2,-14,-21,-3,36,-26,-6,8,3,1 },
    { -29,0,-25,-25,-82,16,29,1,-12,59,41,-24,-1,-23,-4,-1 },
    { -12,-9,-59,14,-52,-2,18,2,3,-67,-45,34,38,-17,-8,2 },
    { -7,25,2,-7,8,58,12,-10,-48,1,-68,-66,11,12,21,5 },
    { -4,-20,1,-51,-2,-87,12,25,-19,-8,-18,-48,18,34,-24,-2 },
    { 18,-12,13,17,-26,12,35,0,30,-67,32,-53,-59,18,10,12 },
    { -10,-3,-17,-2,-44,-1,-100,3,-2,-6,-8,-6,-28,40,28,-27 },
    { -5,12,-6,11,-1,-39,10,33,-25,15,-45,16,-81,-54,24,11 },
    { -3,9,-8,14,-5,14,51,35,-6,23,-13,45,-22,87,1,-34 },
    { 4,6,7,9,3,35,-24,99,2,-10,7,-17,7,-23,-58,-14 },
    { -1,6,-3,6,-6,4,-7,-58,-11,4,-21,1,-43,4,-100,-16 },
    { 4,-2,5,-3,9,-6,17,-12,3,-11,2,-15,5,-36,18,-117 },
  }
},
{  //3
  {
    { 103,-58,4,-2,3,-2,1,-1,-45,20,4,-1,1,0,1,-1 },
    { -46,-76,75,-19,12,-8,4,-1,16,36,-26,-1,0,-2,2,-2 },
    { 30,67,67,-66,14,-9,2,-3,-17,-17,-30,19,3,-2,3,0 },
    { -15,-25,-65,-86,48,1,6,-1,3,8,12,34,-5,-8,0,-2 },
    { -2,-17,-4,-49,-103,41,0,4,6,-13,6,3,33,2,-6,1 },
    { -44,20,-3,-5,-14,-11,14,-1,-102,51,19,-14,6,5,0,-1 },
    { 6,-1,-20,-11,-40,-107,28,1,20,6,-19,-2,-9,33,9,-4 },
    { 18,30,-26,-2,-5,23,-11,4,33,93,-59,-19,10,-11,1,3 },
    { -9,-10,-9,-7,-6,-28,-111,25,-20,-15,-22,-7,5,-15,29,10 },
    { -12,-15,-22,30,-6,13,18,-14,-35,-29,-87,64,6,2,-7,2 },
    { -4,-12,-16,-17,27,2,21,-15,-12,-41,-39,-92,50,8,-3,2 },
    { 1,0,1,8,11,2,29,116,-1,-4,-3,9,31,-3,20,-22 },
    { 2,4,5,16,10,-34,-3,-28,11,12,24,34,98,-47,-11,0 },
    { -1,-2,-4,-2,-18,-7,32,-8,-3,-11,-8,-17,-36,-103,50,-5 },
    { 1,2,1,4,5,18,0,-33,4,5,7,11,20,41,99,-54 },
    { 1,0,2,2,4,6,18,4,3,3,7,8,12,17,51,113 },
  },
  {
    { -110,39,20,0,0,1,1,0,46,-13,-10,0,0,0,-1,0 },
    { -26,-100,59,9,6,4,2,0,5,41,-15,-8,0,-2,0,-1 },
    { 28,41,94,-48,-31,-3,3,-1,-19,-12,-33,8,13,2,1,0 },
    { -35,29,20,32,34,-8,0,-1,-100,28,26,-14,-8,0,3,-1 },
    { 29,19,35,105,-6,-17,-7,0,29,-21,-17,-28,-7,7,0,1 },
    { 19,8,18,-17,113,-13,-14,-3,24,-12,-20,17,-25,-10,5,1 },
    { -6,-27,20,13,6,67,-5,-4,-20,-87,37,29,4,-14,-8,2 },
    { 12,29,-2,10,10,100,-6,-13,14,57,-22,-16,8,-24,-10,3 },
    { 16,12,31,-17,7,3,49,2,36,16,91,-39,-26,9,-7,-6 },
    { 1,1,10,-17,-14,-4,-113,1,10,6,37,-28,-14,-9,19,11 },
    { -5,-12,-14,-25,19,13,6,5,-14,-40,-32,-103,20,31,1,0 },
    { -2,-4,-2,-3,-6,-13,1,-125,-2,-6,0,-7,-10,-1,-15,14 },
    { -3,-3,-6,-6,-23,20,11,6,-12,-8,-28,-2,-114,14,31,2 },
    { -1,-3,-3,-4,-9,-20,21,9,-4,-12,-6,-30,-6,-115,13,27 },
    { -1,-1,-1,-5,-5,-10,-16,18,-6,-2,-9,-6,-32,-10,-120,-5 },
    { 0,0,2,1,4,2,8,13,1,5,3,7,3,27,-8,124 },
  }
}
};
```

The following drawings are provided to describe specific examples of the present disclosure. Since the specific designations of devices or the designations of specific signals/messages/fields illustrated in the drawings are provided for illustration, technical features of the present disclosure are not limited to specific designations used in the following drawings.

Figure 19:
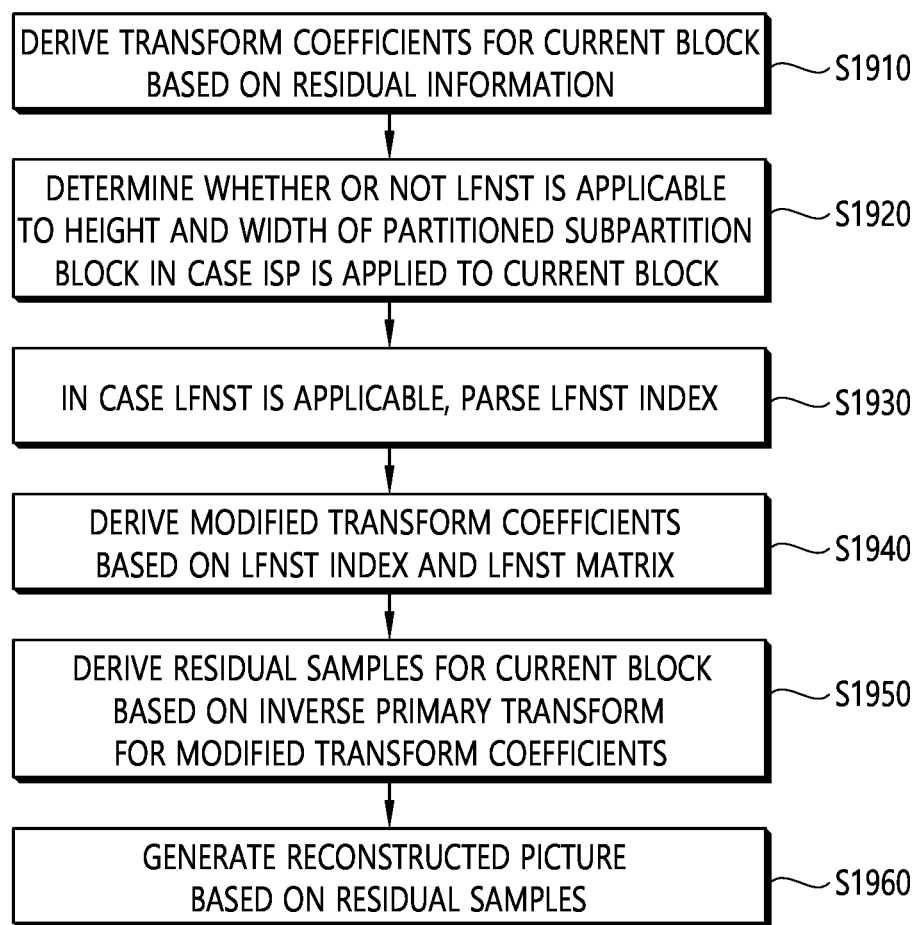
FIG. 19 is a flowchart illustrating a method of decoding an image according to an embodiment.

FIG. 19 is a flowchart illustrating an operation of a video decoding apparatus according to an embodiment of this document.

Each step disclosed in FIG. 19 is based on some of the contents described above in FIGS. 3 to 18. Accordingly, detailed descriptions overlapping with those described above in FIGS. 3 to 18 will be omitted or simplified.

The decoding apparatus 200 according to the present embodiment may receive residual information from a bitstream.

More specifically, the decoding apparatus 200 may decode information on quantized transform coefficients for the target block from the bitstream and may derive the quantized transform coefficients for the current block based on the information on the quantized transform coefficients for the current block. The information on the quantized transform coefficients for the target block may be included in a sequence parameter set (SPS) or a slice header and may include at least one of information on whether a reduced transform (RST) is applied, information on the simplification factor, information on a minimum transform size in which the reduced transform is applied, information on a maximum transform size in which the reduced transform is applied, a reduced inverse transform size, and information on a transform index indicating any one of transform kernel matrices included in a transform set.

Additionally, the decoding apparatus may further receive information on an intra prediction mode for a current block and information on whether or not ISP is applied to the current block. By receiving and parsing flag information indicating whether or not an ISP code or ISP mode is to be applied, the decoding apparatus may derive whether or not the current block is divided (or split or partitioned) into a predetermined number of subpartition transform blocks. Herein, the current block may be a coding block. Moreover, the decoding apparatus may derive sizes and number of divided subpartition blocks through flag information indicating along which direction the current block is to be divided (or partitioned).

The decoding apparatus 200 may derive residual information for the current block, i.e., derive transform coefficients by performing dequantization on quantized transform coefficients (S1910).

The derived transform coefficients may be arranged (or aligned) in accordance with a reversed diagonal scanning order in 4×4 block units, and transform coefficients inside a 4×4 block may also be arranged in accordance with a reversed diagonal scanning order. That is, transform coefficients that are processed with dequantization may be arranged in accordance with a reversed scanning order that is applied in video codec, such as VVC or HEVC.

The decoding apparatus may derive modified transform coefficients by applying LFNST to the transform coefficients.

Unlike a primary transform that separately transforms coefficients being the transform targets along a vertical or horizontal direction, LFNST is a non-separable transform that applies transform without separating the coefficients along a specific direction. Such non-separable transmit may be a low-frequency non-separable transform that applies forward transform only in a low-frequency region and not the entire block region.

LFNST index information is received as syntax information, and syntax information may be received as a binarized bin string including 0 and 1.

A syntax element of the LFNST index according to the present embodiment may indicate whether or not inverse LFNST or inverse non-separable transform is being applied and any one of transform kernel matrices being included in a transform set. And, when the transform set includes two transform kernel matrices, 3 different syntax element values may exist in the transform index.

That is, according to the embodiment, syntax element values for an LFNST index may include 0, which indicates a case where inverse LFNST is not applied to a target block, 1, which indicates a first transform kernel matrix of the two transform kernel matrices, and 2, which indicates a second transform kernel matrix of the two transform kernel matrices.

The intra prediction mode information and LFNST index information may be signaled at a coding unit level.

Meanwhile, the decoding apparatus may determine whether or not the LFNST is applicable to a height and width of a partitioned subpartition block in case ISP is applied to the current block (S1920), and, only when the LFNST is applicable, the decoding apparatus may parse the LFNST index (S1930).

The decoding apparatus may determine whether or not the LFNST is applicable to a height and width of a partitioned subpartition block. In this case, when the height and width of the subpartition block are equal to 4 or more, the decoding apparatus may parse the LFNST index.

Additionally, the decoding apparatus may determine whether or not the LFNST is applicable, based on a tree-type and color format of the current block.

According to an embodiment, in case the tree-type of the current block is a dual-tree chroma, when a height and width corresponding to a chroma component block of the current block are equal to 4 or more, the decoding apparatus may parse the LFNST index.

Additionally, according to the embodiment, in case the tree-type of the current block is a single-tree or dual-tree luma, when a height and width corresponding to a luma component block of the current block are equal to 4 or more, the decoding apparatus may parse the LFNST index.

Additionally, in case the tree-type of the current block is a dual-tree luma or single-tree, when a height and width of the subpartition block for a luma component block of the current block are equal to 4 or more, the decoding apparatus may parse the LFNST index.

For example, if the tree-type of the current block is a dual-tree chroma, ISP may not be applied, and, in this case, when the height and width corresponding to the chroma component block of the current block are equal to 4 or more, the decoding apparatus may parse the LFNST index.

Conversely, if the tree-type of the current block is a dual-tree luma or single-tree instead of the dual-tree chroma, depending upon whether or not ISP is being applied to the current block, when the height and width of the subpartition block for the luma component block of the current block or the height and width of the current block are equal to 4 or more, the decoding apparatus may parse the LFNST index.

According to the embodiment, the current block is a coding unit, and when a width and height of the coding unit are equal to or less than a maximum luma transform size that is available for transform, the decoding apparatus may parse the LFNST index.

Thereafter, the decoding apparatus may derive modified transform coefficients from the transform coefficient based on the LFNST index and an LFNST matrix for LFNST (S1940).

The decoding apparatus may determine an LFNST set including the LFNST matrix based on the intra prediction mode derived from intra prediction mode information, and select any one of the plurality of LFNST matrices based on the LFNST set and the LFNST index.

In this case, the same LFNST set and the same LFNST index may be applied to the sub-partition transform block divided from the current block. That is, because the same intra prediction mode is applied to the sub-partition transform blocks, the LFNST set determined based on the intra prediction mode may be equally applied to all sub-partition transform blocks. Further, because the LFNST index is signaled at a coding unit level, the same LFNST matrix may be applied to the sub-partition transform block divided from the current block.

As described above, the transform set may be determined according to the intra prediction mode of the transform block to be transformed, and inverse LFNST may be performed based on any one of transform kernel matrices, that is, LFNST matrices, included in the transform set indicated by the LFNST index. A matrix applied to the inverse LFNST may be referred to as an inverse LFNST matrix or an LFNST matrix, and such a matrix may have any name as long as it has a transpose relationship with the matrix used for the forward LFNST.

In one example, the inverse LFNST matrix may be a non-square matrix in which the number of columns is smaller than the number of rows.

A predetermined number of transform coefficients, which are output data of LFNST may be derived based on the size of the current block or a sub-partition transform block. For example, when the height and width of the current block or the sub-partition transform block are 8 or more, 48 transform coefficients may be derived, as illustrated in the left of FIG. 6, and when the width and height of the sub-partition transform block are not 8 or more, that is, when the width or height of the sub-partition transform block is 4 or more and less than 8, 16 transform coefficients may be derived, as illustrated in the right side of FIG. 6.

As illustrated in FIG. 6, 48 transform coefficients may be arranged in the top-left, top-right, and lower left 4×4 regions of the top-left 8×8 region of the sub-partition transform block, and 16 transform coefficients may be arranged in the top-left 4×4 region of the sub-partition transform block.

The 48 transform coefficients and 16 transform coefficients may be arranged in a vertical or horizontal direction according to an intra prediction mode of the sub-partition transform block. For example, when the intra prediction mode is a horizontal direction (modes 2 to 34 in FIG. 4) based on a diagonal direction (mode 34 in FIG. 4), the transform coefficients may be arranged in a horizontal direction, that is, in row-first direction order, as illustrated in (a) of FIG. 6, and when the intra prediction mode is a vertical direction (modes 35 to 66 in FIG. 4) based on a diagonal direction, the transform coefficients may be arranged in a horizontal direction, that is, in column-first direction order, as illustrated in (b) of FIG. 6.

The decoding apparatus may derive residual samples for the current block based on inverse primary transform for the modified transform coefficients (S1950).

At this point, a general separable transform may be used as the inverse primary transform, and the above-described MTS may also be used.

Subsequently, the decoding apparatus 200 may generate reconstructed samples based on residual samples for the current block and prediction samples for the current block (S1960).

The following drawings are provided to describe specific examples of the present disclosure. Since the specific designations of devices or the designations of specific signals/messages/fields illustrated in the drawings are provided for illustration, technical features of the present disclosure are not limited to specific designations used in the following drawings.

FIG. 20 is a flowchart illustrating an operation of a video encoding apparatus according to an embodiment of this document.

Each step disclosed in FIG. 20 is based on some of the contents described above in FIGS. 3 to 18. Accordingly, detailed descriptions overlapping with those described above in FIGS. 1 and 3 to 18 will be omitted or simplified.

The encoding apparatus 100 according to an embodiment may derive a prediction sample for the current block based on the intra prediction mode applied to the current block (S2010).

The encoding apparatus may perform prediction per sub-partition transform block, when ISP is being applied to the current block.

The encoding apparatus may determine whether to apply ISP coding or an ISP mode to the current block, that is, the coding block, determine a direction in which the current block will be divided according to the determination result, and derive the size and number of divided sub-blocks.

For example, when the size (width×height) of the current block is 8×4, as illustrated in FIG. 14, the current block may be vertically divided and divided into two sub-blocks, and when the size (width×height) of the current block is 4×8, the current block may be horizontally divided and divided into two sub-blocks. Alternatively, as illustrated in FIG. 15, when the size (width×height) of the current block is greater than 4×8 or 8×4, that is, when the size of the current block is 1) 4×N or N×4 (N>16) or 2) M×N(M≥8, N≥8), the current block may be divided into 4 sub-blocks in a horizontal or vertical direction.

The same intra prediction mode may be applied to the sub-partition transform block divided from the current block, and the encoding apparatus may derive a prediction sample for each sub-partition transform block. That is, the encoding apparatus sequentially performs intra prediction, for example, horizontally or vertically, from left to right, or from top to bottom according to a division form of the sub-partition transform blocks. For the leftmost or uppermost subblock, a reconstructed pixel of an already coded coding block is referred to, as in a conventional intra prediction method. Further, for each side of the subsequent internal sub-partition transform block, when it is not adjacent to the previous sub-partition transform block, in order to derive reference pixels adjacent to the corresponding side, a reconstructed pixel of an already coded adjacent coding block is referred to, as in a conventional intra prediction method.

The encoding apparatus 100 may derive residual samples of the current block based on prediction samples (S2020).

Further, the encoding apparatus 100 may derive transform coefficients for the current block based on a primary transform of the residual sample (S2030).

The primary transform may be performed through a plurality of transform kernels, and in this case, a transform kernel may be selected based on the intra prediction mode.

The encoding apparatus 100 may determine whether or not to perform a secondary transform, or non-separable transform, more specifically, LFNST, for the transform coefficients of the current block, and may derive modified transform coefficients by applying LFNST to the transform coefficients.

Unlike a primary transform that separately transforms coefficients being the transform targets along a vertical or horizontal direction, LFNST is a non-separable transform that applies transform without separating the coefficients along a specific direction. Such non-separable transmit may be a low-frequency non-separable transform that applies transform only in a low-frequency region and not the entire target block, which is the transform target.

The encoding apparatus may determine whether or not the LFNST is applicable to a height and width of a partitioned subpartition block in case ISP is applied to the current block (S2040).

The encoding apparatus may determine whether or not the LFNST is applicable to a height and width of a partitioned subpartition block. In this case, when the height and width of the subpartition block are equal to 4 or more, the encoding apparatus may encode the LFNST index.

Additionally, the encoding apparatus may determine whether or not the LFNST is applicable, based on a tree-type and color format of the current block.

According to an embodiment, in case the tree-type of the current block is a dual-tree chroma, when a height and width corresponding to a chroma component block of the current block are equal to 4 or more, the encoding apparatus may determine that LFNST can be applied.

Additionally, according to the embodiment, in case the tree-type of the current block is a single-tree or dual-tree luma, when a height and width corresponding to a luma component block of the current block are equal to 4 or more, the encoding apparatus may determine that LFNST can be applied.

For example, if the tree-type of the current block is a dual-tree chroma, ISP may not be applied, and, in this case, when the height and width corresponding to the chroma component block of the current block are equal to 4 or more, the encoding apparatus may determine that LFNST can be applied.

Conversely, if the tree-type of the current block is a dual-tree luma or single-tree instead of the dual-tree chroma, depending upon whether or not ISP is being applied to the current block, when the height and width of the subpartition block for the luma component block of the current block or the height and width of the current block are equal to 4 or more, the encoding apparatus may determine that LFNST can be applied.

Additionally, according to the embodiment, the current block is a coding unit, and when a width and height of the coding unit are equal to or less than a maximum luma transform size that is available for transform, the encoding apparatus may determine that LFNST can be applied.

When it is determined to perform LFNST, the encoding apparatus 100 may derive a modified transform coefficient for the current block or the sub-partition transform block based on an LFNST set mapped to the intra prediction mode and an LFNST matrix included in the LFNST set (S2050).

The encoding apparatus 100 may determine the LFNST set based on a mapping relationship according to the intra prediction mode applied to the current block, and perform an LFNST, that is, a non-separable transform based on one of two LFNST matrices included in the LFNST set.

In this case, the same LFNST set and the same LFNST index may be applied to the sub-partition transform block divided from the current block. That is, because the same intra prediction mode is applied to the sub-partition transform blocks, the LFNST set determined based on the intra prediction mode may also be equally applied to all sub-partition transform blocks. Further, because the LFNST index is encoded in units of a coding unit, the same LFNST matrix may be applied to the sub-partition transform block divided from the current block.

As described above, a transform set may be determined according to an intra prediction mode of a transform block to be transformed. A matrix applied to LFNST has a transpose relationship with a matrix used for an inverse LFNST.

In one example, the LFNST matrix may be a non-square matrix in which the number of rows is smaller than that of columns.

A region in which transform coefficients used as input data of LFNST are located may be derived based on the size of a sub-partition transform block. For example, when the height and width of the sub-partition transform block are 8 or more, the region is top-left, top-right, and bottom-left 4×4 regions of the top-left 8×8 region of the sub-partition transform block, as illustrated in the left of FIG. 6, and when the height and width of the sub-partition transform block are not equal to or greater than 8, the region may be the top-left 4×4 region of the current block, as illustrated in the right side of FIG. 6.

In order to carry out a multiplication operation with an LFNST matrix, the transform coefficients of the aforementioned region may be read along a vertical or horizontal direction according to an intra prediction mode of a subpartition transform block, thereby configuring a one-dimensional vector.

48 modified transform coefficients or 16 modified transform coefficients may be read in a vertical or horizontal direction according to the intra prediction mode of the sub-partition transform block and arranged in one dimension. For example, when the intra prediction mode is a horizontal direction (modes 2 to 34 in FIG. 9) based on a diagonal direction (mode 34 in FIG. 9), the transform coefficients may be arranged in a horizontal direction, that is, in row-first direction order, as illustrated in (a) of FIG. 6, and when the intra prediction mode is a vertical direction (modes 35 to 66 in FIG. 9) based on a diagonal direction, the transform coefficients may be arranged in a horizontal direction, that is, in column-first direction order, as illustrated in (b) of FIG. 6.

In one embodiment, the encoding apparatus may include steps of determining whether the encoding apparatus is in a condition to apply LFNST, generating and encoding an LFNST index based on the determination, selecting a transform kernel matrix, and applying the LFNST to the residual samples based on the selected transform kernel matrix and/or a simplification factor when the encoding apparatus is in a condition to apply LFNST. In this case, a size of the simplification transform kernel matrix may be determined based on a simplification factor.

The encoding apparatus may derive quantized transform coefficients by performing quantization based on the modified transform coefficients of the current block, and the encoding apparatus may, then, encode information on the quantized transform coefficients, and, in case LFNST is applicable (i.e., in case LFNST can be applied), an LFNST index indicating an LFNST matrix (S2060).

The encoding apparatus may generate residual information including information on quantized transform coefficients. The residual information may include the above-described transform related information/syntax element. The encoding apparatus may encode image/video information including residual information and output the encoded image/video information in the form of a bitstream.

More specifically, the encoding apparatus 100 may generate information about the quantized transform coefficients and encode the information about the generated quantized transform coefficients.

The syntax element of the LFNST index according to the present embodiment may indicate whether (inverse) LFNST is applied and any one of the LFNST matrices included in the LFNST set, and when the LFNST set includes two transform kernel matrices, there may be three values of the syntax element of the LFNST index.

According to an embodiment, when a division tree structure for the current block is a dual tree type, an LFNST index may be encoded for each of a luma block and a chroma block.

According to an embodiment, the syntax element value for the transform index may be derived as 0 indicating a case in which (inverse) LFNST is not applied to the current block, 1 indicating a first LFNST matrix among LFNST matrices, and 2 indicating a second LFNST matrix among LFNST matrices.

In the present disclosure, at least one of quantization/dequantization and/or transform/inverse transform may be omitted. When quantization/dequantization is omitted, a quantized transform coefficient may be referred to as a transform coefficient. When transform/inverse transform is omitted, the transform coefficient may be referred to as a coefficient or a residual coefficient, or may still be referred to as a transform coefficient for consistency of expression.

In addition, in the present disclosure, a quantized transform coefficient and a transform coefficient may be referred to as a transform coefficient and a scaled transform coefficient, respectively. In this case, residual information may include information on a transform coefficient(s), and the information on the transform coefficient(s) may be signaled through a residual coding syntax. Transform coefficients may be derived based on the residual information (or information on the transform coefficient(s)), and scaled transform coefficients may be derived through inverse transform (scaling) of the transform coefficients. Residual samples may be derived based on the inverse transform (transform) of the scaled transform coefficients. These details may also be applied/expressed in other parts of the present disclosure.

In the above-described embodiments, the methods are explained on the basis of flowcharts by means of a series of steps or blocks, but the present disclosure is not limited to the order of steps, and a certain step may be performed in order or step different from that described above, or concurrently with another step. Further, it may be understood by a person having ordinary skill in the art that the steps shown in a flowchart are not exclusive, and that another step may be incorporated or one or more steps of the flowchart may be removed without affecting the scope of the present disclosure.

The above-described methods according to the present disclosure may be implemented as a software form, and an encoding apparatus and/or decoding apparatus according to the disclosure may be included in a device for image processing, such as, a TV, a computer, a smartphone, a set-top box, a display device or the like.

When embodiments in the present disclosure are embodied by software, the above-described methods may be embodied as modules (processes, functions or the like) to perform the above-described functions. The modules may be stored in a memory and may be executed by a processor. The memory may be inside or outside the processor and may be connected to the processor in various well-known manners. The processor may include an application-specific integrated circuit (ASIC), other chipset, logic circuit, and/or a data processing device. The memory may include a read-only memory (ROM), a random access memory (RAM), a flash memory, a memory card, a storage medium, and/or other storage device. That is, embodiments described in the present disclosure may be embodied and performed on a processor, a microprocessor, a controller or a chip. For example, function units shown in each drawing may be embodied and performed on a computer, a processor, a microprocessor, a controller or a chip.

Further, the decoding apparatus and the encoding apparatus to which the present disclosure is applied, may be included in a multimedia broadcasting transceiver, a mobile communication terminal, a home cinema video device, a digital cinema video device, a surveillance camera, a video chat device, a real time communication device such as video communication, a mobile streaming device, a storage medium, a camcorder, a video on demand (VOD) service providing device, an over the top (OTT) video device, an Internet streaming service providing device, a three-dimensional (3D) video device, a video telephony video device, and a medical video device, and may be used to process a video signal or a data signal. For example, the over the top (OTT) video device may include a game console, a Blu-ray player, an Internet access TV, a Home theater system, a smartphone, a Tablet PC, a digital video recorder (DVR) and the like.

In addition, the processing method to which the present disclosure is applied, may be produced in the form of a program executed by a computer, and be stored in a computer-readable storage medium. Multimedia data having a data structure according to the present disclosure may also be stored in a computer-readable storage medium. The computer-readable storage medium includes all kinds of storage devices and distributed storage devices in which computer-readable data are stored. The computer-readable storage medium may include, for example, a Blu-ray Disc (BD), a universal serial bus (USB), a ROM, a PROM, an EPROM, an EEPROM, a RAM, a CD-ROM, a magnetic tape, a floppy disk, and an optical data storage device. Further, the computer-readable storage medium includes media embodied in the form of a carrier wave (for example, transmission over the Internet). In addition, a bitstream generated by the encoding method may be stored in a computer-readable storage medium or transmitted through a wired or wireless communication network. Additionally, the embodiments of the present disclosure may be embodied as a computer program product by program codes, and the program codes may be executed on a computer by the embodiments of the present disclosure. The program codes may be stored on a computer-readable carrier.

Figure 21:
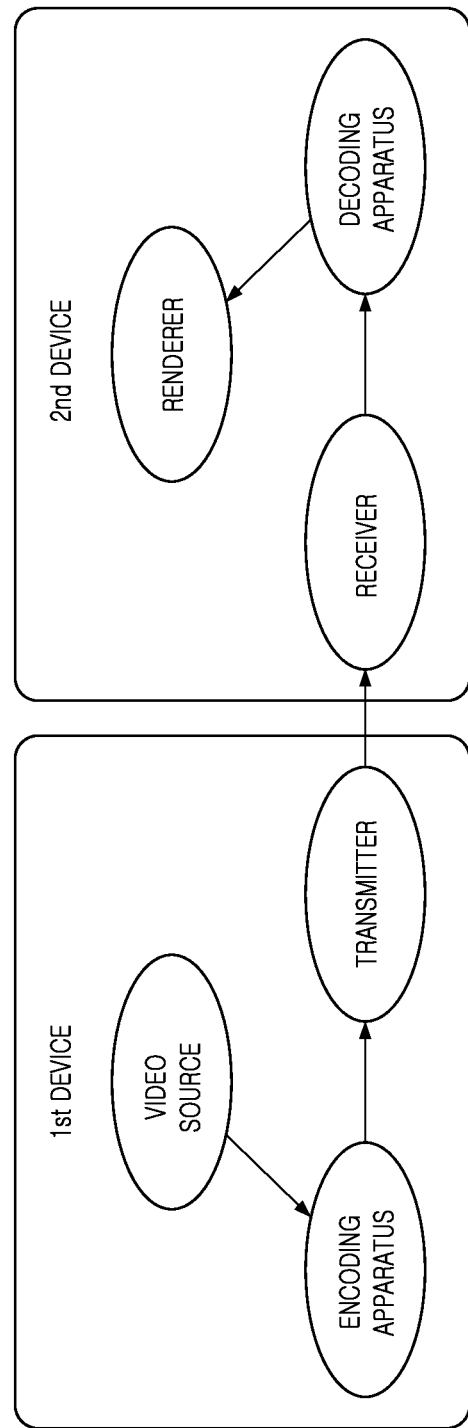
FIG. 21 schematically illustrates an example of a video/image coding system to which the present disclosure is applicable.

FIG. 21 schematically illustrates an example of a video/image coding system to which the present disclosure is applicable.

Referring to FIG. 21, the video/image coding system may include a first device (source device) and a second device (receive device). The source device may deliver encoded video/image information or data in the form of a file or streaming to the receive device via a digital storage medium or network.

The source device may include a video source, an encoding apparatus, and a transmitter. The receive device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may obtain a video/image through a process of capturing, synthesizing, or generating a video/image. The video source may include a video/image capture device and/or a video/image generating device. The video/image capture device may include, for example, one or more cameras, video/image archives including previously captured video/images, or the like. The video/image generating device may include, for example, a computer, a tablet and a smartphone, and may (electronically) generate a video/image. For example, a virtual video/image may be generated through a computer or the like. In this case, the video/image capturing process may be replaced by a process of generating related data.

The encoding apparatus may encode an input video/image. The encoding apparatus may perform a series of procedures such as prediction, transform, and quantization for compression and coding efficiency. The encoded data (encoded video/image information) may be output in the form of a bitstream.

The transmitter may transmit the encoded video/image information or data output in the form of a bitstream to the receiver of the receive device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format, and may include an element for transmission through a broadcast/communication network. The receiver may receive/extract the bitstream and transmit the received/extracted bitstream to the decoding apparatus.

The decoding apparatus may decode a video/image by performing a series of procedures such as dequantization, inverse transform, prediction, and the like corresponding to the operation of the encoding apparatus.

The renderer may render the decoded video/image. The rendered video/image may be displayed through the display.

Figure 22:
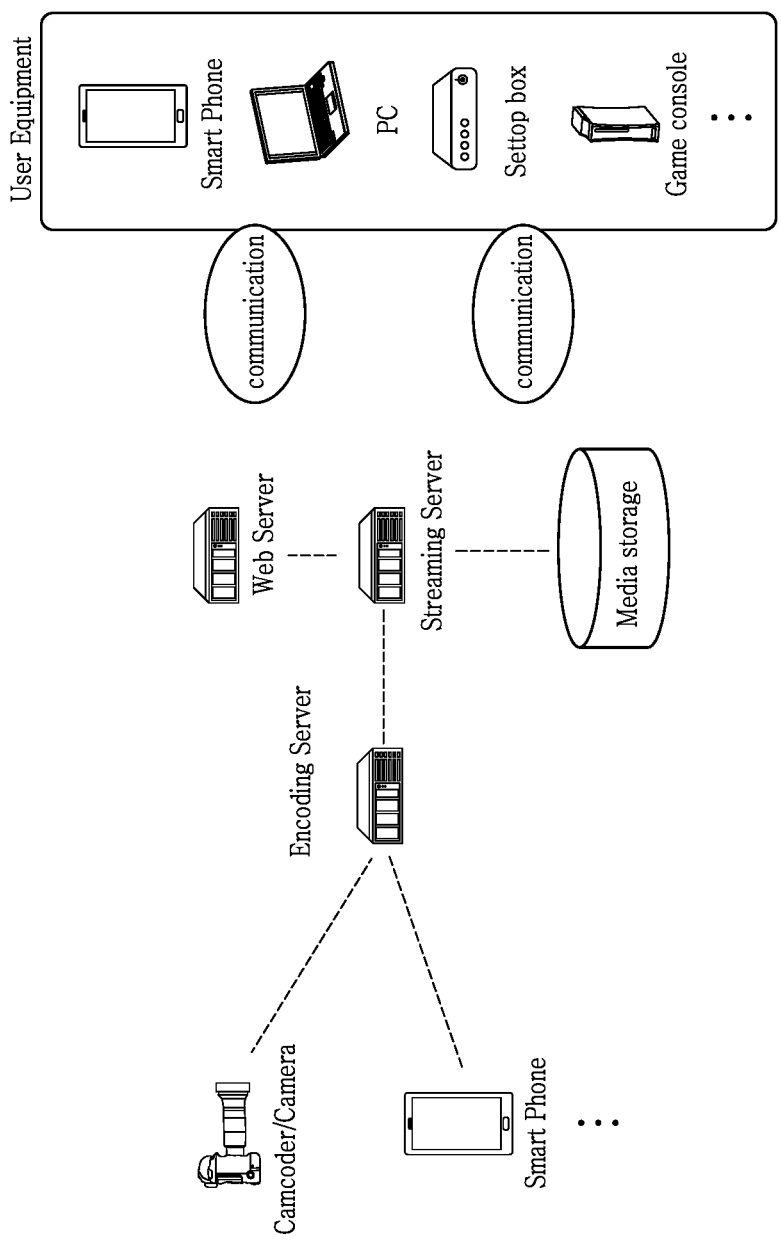
FIG. 22 is a diagram illustrating a structure of a content streaming system to which this document is applied.

FIG. 22 illustrates the structure of a content streaming system to which the present disclosure is applied.

Further, the contents streaming system to which the present disclosure is applied may largely include an encoding server, a streaming server, a web server, a media storage, a user equipment, and a multimedia input device.

The encoding server functions to compress to digital data the contents input from the multimedia input devices, such as the smart phone, the camera, the camcorder and the like, to generate a bitstream, and to transmit it to the streaming server. As another example, in a case where the multimedia input device, such as, the smart phone, the camera, the camcorder or the like, directly generates a bitstream, the encoding server may be omitted. The bitstream may be generated by an encoding method or a bitstream generation method to which the present disclosure is applied. And the streaming server may store the bitstream temporarily during a process to transmit or receive the bitstream.

The streaming server transmits multimedia data to the user equipment on the basis of a user's request through the web server, which functions as an instrument that informs a user of what service there is. When the user requests a service which the user wants, the web server transfers the request to the streaming server, and the streaming server transmits multimedia data to the user. In this regard, the contents streaming system may include a separate control server, and in this case, the control server functions to control commands/responses between respective equipments in the content streaming system.

The streaming server may receive contents from the media storage and/or the encoding server. For example, in a case the contents are received from the encoding server, the contents may be received in real time. In this case, the streaming server may store the bitstream for a predetermined period of time to provide the streaming service smoothly.

For example, the user equipment may include a mobile phone, a smart phone, a laptop computer, a digital broadcasting terminal, a personal digital assistant (PDA), a portable multimedia player (PMP), a navigation, a slate PC, a tablet PC, an ultrabook, a wearable device (e.g., a watch-type terminal (smart watch), a glass-type terminal (smart glass), a head mounted display (HMD)), a digital TV, a desktop computer, a digital signage or the like. Each of servers in the contents streaming system may be operated as a distributed server, and in this case, data received by each server may be processed in distributed manner.

Claims disclosed herein can be combined in a various way. For example, technical features of method claims of the present disclosure can be combined to be implemented or performed in an apparatus, and technical features of apparatus claims can be combined to be implemented or performed in a method. Further, technical features of method claims and apparatus claims can be combined to be implemented or performed in an apparatus, and technical features of method claims and apparatus claims can be combined to be implemented or performed in a method.

What is claimed is:

1. An image decoding method performed by a decoding apparatus, the method comprising:
   obtaining residual information from a bitstream;
   deriving quantized transform coefficients for a current block based on the residual information;
   deriving transform coefficients for the current block by performing dequantization on the quantized transform coefficients;
   deriving modified transform coefficients by applying a low-frequency non-separable transform (LFNST) to the transform coefficients;
   deriving residual samples for the current block by applying an inverse primary transform to the modified transform coefficients; and
   generating a reconstructed picture based on the residual samples,
   wherein the deriving the modified transform coefficients comprises:
   determining a height and a width of a subpartition block based on an intra sub partitions (ISP) being applied to the current block;
   parsing an LFNST index based on the height and the width of the subpartition block; and
   deriving the modified transform coefficients by applying the LFNST based on an LFNST matrix related to the LFNST index to the transform coefficients,
   wherein the LFNST matrix is derived based on the LFNST index in an LFNST set, and the LFNST set is derived based on an intra prediction mode of the current block, and
   wherein in case a tree-type of the current block is a dual-tree luma or single-tree, based on the height and the width of the subpartition block corresponding to a luma component block for the current block being equal to 4 or more, the LFNST index is parsed.

2. An image encoding method performed by an encoding apparatus, the method comprising:
   deriving prediction samples for a current block;
   deriving residual samples for the current block based on the prediction samples;
   deriving transform coefficients for the current block by applying a primary transform to the residual samples;
   deriving modified transform coefficients by applying an low-frequency non-separable transform (LFNST) based on an LFNST matrix to the transform coefficients;
   deriving quantized transform coefficients by performing quantization on the modified transform coefficients; and
   encoding residual information on the quantized transform coefficients, and an LFNST index related to the LFNST matrix to output a bitstream,
   wherein the deriving the modified transform coefficients comprises:
   determining a height and a width of a subpartition block based on an intra sub partitions (ISP) being applied to the current block,
   wherein the LFNST index is encoded based on the height and the width of the subpartition block, and
   wherein the LFNST matrix is included in an LFNST set, and the LFNST set is derived based on an intra prediction mode of the current block, and
   wherein in case a tree-type of the current block is a dual-tree luma or single-tree, based on the height and the width of the subpartition block corresponding to a luma component block for the current block being equal to 4 or more, the LFNST index is encoded.

3. A transmission method of data for an image, the method comprising:
   obtaining a bitstream for the image, wherein the bitstream is generated based on deriving prediction samples for a current block, deriving residual samples for the current block based on the prediction samples, deriving transform coefficients for the current block by applying a primary transform to the residual samples, deriving modified transform coefficients by applying an low-frequency non-separable transform (LFNST) based on an LFNST matrix to the transform coefficients, deriving quantized transform coefficients by performing quantization on the modified transform coefficients, and encoding residual information on the quantized transform coefficients, and an LFNST index related to the LFNST matrix; and
   transmitting the data comprising the bitstream,
   wherein the deriving the modified transform coefficients comprises:
   determining a height and a width of a subpartition block based on an intra sub partitions (ISP) being applied to the current block,
   wherein the LFNST index is encoded based on the height and the width of the subpartition block, and
   wherein the LFNST matrix is included in an LFNST set, and the LFNST set is derived based on an intra prediction mode of the current block, and
   wherein in case a tree-type of the current block is a dual-tree luma or single-tree, based on the height and the width of the subpartition block corresponding to a luma component block for the current block being equal to 4 or more, the LFNST index is encoded.

* * * * *